United States Patent
O'Neill et al.

(10) Patent No.: US 9,644,334 B2
(45) Date of Patent: May 9, 2017

(54) METHODS OF AND SYSTEMS FOR CONTROLLING WATER FLOW, BREAKING WATER WAVES AND REDUCING SURFACE EROSION ALONG RIVERS, STREAMS, WATERWAYS AND COASTAL REGIONS

(71) Applicants: Raymond O'Neill, Spring Lake Heights, NJ (US); Dennis Carr, Atkinson, NH (US)

(72) Inventors: Raymond O'Neill, Spring Lake Heights, NJ (US); Dennis Carr, Atkinson, NH (US)

(73) Assignees: Stable Concrete Structures, Inc., Anniston, AL (US); Concrete Systems, Inc., Hudson, NH (US)

( * ) Notice: Subject to any disclaimer, the term of this patent is extended or adjusted under 35 U.S.C. 154(b) by 102 days.

(21) Appl. No.: 13/969,699

(22) Filed: Aug. 19, 2013

(65) Prior Publication Data
US 2015/0050086 A1    Feb. 19, 2015

(51) Int. Cl.
 *E02B 3/06*       (2006.01)
 *E02B 3/12*       (2006.01)

(52) U.S. Cl.
 CPC ................................ *E02B 3/129* (2013.01)

(58) Field of Classification Search
 CPC ............. E02B 3/04; E02B 3/06; E02B 3/129
 USPC ........ 405/16, 17, 19, 20, 29; 404/40, 41, 42, 404/43, 44, 52
 See application file for complete search history.

(56) References Cited

U.S. PATENT DOCUMENTS

| 472,590 | A | * | 4/1892 | Simpson | ................ E01C 5/00 404/41 |
|---|---|---|---|---|---|
| 848,697 | A | | 4/1907 | Silva et al. | |
| 877,874 | A | | 1/1908 | Tsanoff | |
| 1,380,598 | A | | 6/1921 | Schenk | |
| 1,419,713 | A | | 6/1922 | Bevier | |
| 1,467,929 | A | | 9/1923 | Ey | |
| 1,471,951 | A | | 10/1923 | Evans | |
| 1,569,057 | A | | 1/1926 | White et al. | |
| 1,569,257 | A | | 1/1926 | Francis | |

(Continued)

FOREIGN PATENT DOCUMENTS

| EP | 1165894 B1 | 2/2003 |
|---|---|---|
| GB | 560222 | 3/1944 |

(Continued)

OTHER PUBLICATIONS

Band and Shore Protection: California Highway Practice, Appendix B and C, pp. 293-298, State of California, Department of Public Works, 1970.

(Continued)

*Primary Examiner* — Benjamin Fiorello
*Assistant Examiner* — Edwin Toledo-Duran
(74) *Attorney, Agent, or Firm* — Thomas J. Perkowski, Esq., PC

(57) ABSTRACT

Improved breakwater construction blocks and interlocking shear key blocks for use in constructing diverse systems and works, in broad fields of use including, but not limited to, coastal engineering: river, stream and torrent control, bulkhead designed projects, scour control, check dams, permeable and impermeable groins-both river and ocean structures and other hydraulic works including marinas.

20 Claims, 82 Drawing Sheets

FIRST EMBODIMENT

(56) References Cited

U.S. PATENT DOCUMENTS

| | | | |
|---|---|---|---|
| 1,572,305 A | 2/1926 | Nelson | |
| 1,584,920 A | 5/1926 | Cochran | |
| 1,695,327 A | 12/1928 | Goldston | |
| 1,716,509 A | 6/1929 | Smith | |
| 1,777,660 A | 10/1930 | Dahl | |
| 1,844,484 A | 2/1932 | Smith | |
| 1,875,668 A | 9/1932 | Sheldon | |
| 1,893,003 A | 1/1933 | Schlueter | |
| 1,987,150 A | 1/1935 | Mason | |
| 2,193,847 A | 3/1940 | Strong | |
| 2,271,066 A | 1/1942 | Ehrenhaft | |
| 2,334,804 A | 11/1943 | Atterbury | |
| 2,395,216 A | 2/1946 | Fitzpatrick | |
| 2,408,585 A | 10/1946 | Smith | |
| 2,437,754 A | 3/1948 | Rehfeld | |
| 2,474,786 A | 6/1949 | Humphrey | |
| 2,502,757 A | 4/1950 | David | |
| 2,523,349 A | 9/1950 | Wissinger | |
| 2,531,576 A | 11/1950 | James et al. | |
| 2,582,161 A | 1/1952 | Norman | |
| 2,624,928 A | 1/1953 | Long | |
| 2,648,889 A | 8/1953 | Youtz | |
| 2,677,240 A | 5/1954 | Pierre | |
| 2,682,235 A | 6/1954 | Buckminster | |
| 2,766,592 A * | 10/1956 | Danel | E02B 3/129 405/29 |
| 2,803,113 A | 8/1957 | Hoad | |
| 2,835,112 A | 5/1958 | Pierre | |
| 2,874,442 A | 2/1959 | Henderson | |
| 2,909,037 A | 10/1959 | Palmer | |
| 3,011,316 A | 12/1961 | Wilson | |
| 3,176,468 A | 4/1965 | Takada et al. | |
| 3,222,830 A | 12/1965 | Ivany | |
| 3,277,556 A | 10/1966 | Holland et al. | |
| 3,347,048 A | 10/1967 | Brown et al. | |
| 3,368,357 A | 2/1968 | Takamori | |
| 3,379,017 A | 4/1968 | Kusatake | |
| 3,380,253 A | 4/1968 | Vita | |
| 3,386,252 A | 6/1968 | Nelson | |
| 3,456,446 A * | 7/1969 | Kusatake | E02B 3/129 405/29 |
| 3,488,964 A | 1/1970 | Tamotsu | |
| 3,614,866 A | 10/1971 | Taisuke et al. | |
| 3,694,128 A | 9/1972 | Foxen | |
| 3,694,531 A | 9/1972 | Glass | |
| 3,717,967 A | 2/1973 | Wood | |
| 3,759,043 A | 9/1973 | Tokunaga | |
| 3,894,397 A | 7/1975 | Fair | |
| 4,018,018 A | 4/1977 | Kosuge | |
| 4,050,254 A | 9/1977 | Meheen et al. | |
| 4,067,196 A | 1/1978 | Schraudenbach | |
| 4,073,145 A | 2/1978 | Fair | |
| 4,089,179 A | 5/1978 | Trautman | |
| 4,167,599 A | 9/1979 | Nissinen | |
| 4,219,513 A | 8/1980 | Miller | |
| 4,269,537 A * | 5/1981 | O'Neill | E02B 3/14 405/29 |
| 4,272,050 A | 6/1981 | Valle | |
| 4,289,293 A | 9/1981 | Cashion | |
| 4,341,491 A | 7/1982 | Neumann | |
| 4,347,017 A * | 8/1982 | Chevallier | E02B 3/129 405/29 |
| 4,352,593 A | 10/1982 | Iskra et al. | |
| 4,370,075 A * | 1/1983 | Scales | E02B 3/14 404/41 |
| 4,372,705 A * | 2/1983 | Atkinson | E02B 3/14 404/40 |
| 4,389,036 A | 6/1983 | Abou-Ezzeddine | |
| 4,398,529 A | 8/1983 | Schoenfelder | |
| 4,417,842 A | 11/1983 | Landry | |
| 4,465,398 A | 8/1984 | Knudsen | |
| 4,470,728 A | 9/1984 | Broadbent | |
| 4,566,238 A | 1/1986 | Janopaul | |
| 4,594,023 A * | 6/1986 | O'Neill | E02B 3/06 405/29 |
| 4,594,206 A | 6/1986 | Grafton | |
| 4,606,878 A | 8/1986 | Day et al. | |
| 4,633,639 A | 1/1987 | Deimen | |
| 4,655,646 A | 4/1987 | Babcock et al. | |
| 4,657,433 A | 4/1987 | Holmberg | |
| 4,666,334 A | 5/1987 | Karaus | |
| 4,673,159 A | 6/1987 | Schmidgall | |
| 4,684,294 A | 8/1987 | O'Neill | |
| 4,703,602 A | 11/1987 | Pardo | |
| 4,813,812 A | 3/1989 | Hasegawa et al. | |
| 4,820,079 A | 4/1989 | Wheeler | |
| 4,856,934 A | 8/1989 | Nelson | |
| 4,856,935 A | 8/1989 | Haras | |
| 4,875,803 A | 10/1989 | Scales | |
| 4,884,921 A | 12/1989 | Smith | |
| 4,914,876 A | 4/1990 | Forsberg | |
| 4,929,125 A | 5/1990 | Hilfiker | |
| 4,946,308 A | 8/1990 | Chevalier | |
| 4,953,280 A | 9/1990 | Kitzmiller | |
| 4,954,012 A | 9/1990 | Wheeler | |
| 4,957,395 A | 9/1990 | Nelson | |
| 4,973,193 A | 11/1990 | Watson et al. | |
| 4,978,247 A | 12/1990 | Lenson | |
| 4,984,384 A | 1/1991 | Kaufmann | |
| 4,990,032 A | 2/1991 | Smith | |
| 5,010,707 A | 4/1991 | Nelson et al. | |
| 5,020,938 A | 6/1991 | Scales | |
| 5,024,035 A | 6/1991 | Hanson et al. | |
| 5,044,834 A | 9/1991 | Janopaul | |
| 5,081,805 A | 1/1992 | Jazzar | |
| 5,086,600 A | 2/1992 | Holland et al. | |
| 5,120,156 A | 6/1992 | Rauch | |
| 5,122,015 A | 6/1992 | Shen | |
| 5,123,780 A | 6/1992 | Martinsen | |
| 5,129,756 A | 7/1992 | Wheeler | |
| 5,131,791 A | 7/1992 | Kitziller | |
| 5,163,261 A | 11/1992 | O'Neill | |
| 5,167,843 A | 12/1992 | Guillory | |
| 5,190,403 A | 3/1993 | Atkinson | |
| 5,205,943 A | 4/1993 | Jazzar | |
| RE34,314 E * | 7/1993 | Forsberg | E02D 29/025 405/286 |
| 5,252,017 A | 10/1993 | Hodel | |
| 5,256,007 A * | 10/1993 | Allen | E01C 3/006 405/16 |
| 5,257,880 A | 11/1993 | Janopaul | |
| 5,261,194 A | 11/1993 | Roberts | |
| 5,282,700 A | 2/1994 | Rodrique | |
| 5,329,737 A | 7/1994 | Roberts et al. | |
| 5,353,569 A | 10/1994 | Rodrique | |
| 5,358,356 A | 10/1994 | Romanek et al. | |
| 5,367,845 A | 11/1994 | Hartling | |
| 5,402,609 A | 4/1995 | Kelley | |
| 5,429,450 A | 7/1995 | Meidinger | |
| 5,441,362 A | 8/1995 | Melby et al. | |
| 5,484,230 A | 1/1996 | Rudloff | |
| 5,484,236 A | 1/1996 | Gravier | |
| 5,487,623 A | 1/1996 | Anderson et al. | |
| 5,501,546 A | 3/1996 | Dorrell | |
| 5,533,839 A | 7/1996 | Shimada | |
| 5,536,112 A | 7/1996 | Oertel, II | |
| 5,544,973 A | 8/1996 | Frizell et al. | |
| 5,556,228 A | 9/1996 | Smith | |
| 5,556,230 A | 9/1996 | Turk et al. | |
| 5,560,151 A | 10/1996 | Roberts | |
| 5,570,552 A | 11/1996 | Nehring | |
| 5,575,128 A | 11/1996 | Haener | |
| 5,575,584 A | 11/1996 | Alsop | |
| 5,586,835 A | 12/1996 | Fair | |
| 5,620,280 A | 4/1997 | Melby et al. | |
| 5,623,797 A | 4/1997 | Gravier et al. | |
| 5,632,571 A | 5/1997 | Mattox | |
| 5,667,200 A | 9/1997 | Kelley | |
| 5,711,130 A | 1/1998 | Shatley | |
| 5,779,391 A | 7/1998 | Knight | |
| 5,795,105 A | 8/1998 | Guth | |
| 5,807,030 A | 9/1998 | Anderson et al. | |

(56) References Cited

U.S. PATENT DOCUMENTS

| | | |
|---|---|---|
| 5,822,939 A | 10/1998 | Haener |
| 5,823,709 A | 10/1998 | Maher et al. |
| 5,873,206 A * | 2/1999 | Roberts ............... E04B 1/3205 52/245 |
| 5,881,511 A | 3/1999 | Keller |
| 5,890,836 A * | 4/1999 | Leech .................. E02B 3/14 404/34 |
| 5,894,702 A | 4/1999 | Stenekes |
| 5,899,040 A | 5/1999 | Cerrato |
| 5,901,520 A | 5/1999 | Abdul-Baki |
| 5,906,456 A | 5/1999 | Knight |
| 5,908,265 A * | 6/1999 | Mostkoff ............. E02B 3/046 405/21 |
| 5,911,539 A | 6/1999 | Egan et al. |
| 5,934,039 A | 8/1999 | Guy |
| 5,971,658 A * | 10/1999 | Pramono ............. E02B 3/123 405/15 |
| 6,050,748 A | 4/2000 | Anderson et al. |
| 6,071,041 A | 6/2000 | Knight |
| 6,079,902 A | 6/2000 | Pettee |
| 6,105,330 A | 8/2000 | Nanayakkara |
| 6,113,318 A | 9/2000 | Guth |
| 6,115,983 A | 9/2000 | Poignard |
| 6,134,853 A | 10/2000 | Haener |
| 6,205,735 B1 | 3/2001 | Witcher |
| 6,244,009 B1 | 6/2001 | Cerrato |
| RE37,278 E | 7/2001 | Forsberg |
| 6,267,533 B1 | 7/2001 | Bourg |
| 6,293,730 B1 | 9/2001 | Lee |
| 6,322,289 B1 | 11/2001 | Nolan |
| 6,371,700 B1 | 4/2002 | Rich |
| 6,464,432 B1 | 10/2002 | Shaw |
| 6,508,041 B1 | 1/2003 | Boot |
| 6,550,208 B2 | 4/2003 | Nanayakkara |
| 6,557,818 B2 | 5/2003 | Manthei |
| 6,578,338 B1 | 6/2003 | Nanayakkara |
| 6,579,038 B1 * | 6/2003 | McAllister ........... E02B 3/14 404/38 |
| 6,641,334 B2 | 11/2003 | Woolford |
| 6,645,597 B1 | 11/2003 | Swain |
| 6,652,197 B2 | 11/2003 | Shaw |
| 6,666,619 B2 | 12/2003 | Yang |
| 6,722,094 B1 | 4/2004 | Judd et al. |
| 6,735,913 B2 | 5/2004 | Sanders et al. |
| 6,739,797 B1 | 5/2004 | Schneider |
| 6,758,020 B2 | 7/2004 | Cerrato |
| 6,827,570 B2 | 12/2004 | Sumrall et al. |
| 6,854,702 B2 | 2/2005 | Manthei et al. |
| 6,866,446 B2 | 3/2005 | McAllister et al. |
| 6,871,468 B2 | 3/2005 | Whitson |
| 6,907,704 B2 | 6/2005 | Abang et al. |
| 6,923,565 B2 | 8/2005 | Johnson |
| 7,037,037 B1 | 5/2006 | Smith et al. |
| 7,048,250 B2 | 5/2006 | Mothes |
| 7,168,892 B1 | 1/2007 | MacDonald et al. |
| 7,237,368 B2 | 7/2007 | Richardson et al. |
| 7,384,215 B2 | 6/2008 | Woolford |
| 7,448,827 B2 | 11/2008 | Li |
| 7,448,830 B2 | 11/2008 | MacDonald et al. |
| 7,461,998 B1 | 12/2008 | Parnell et al. |
| 7,497,646 B2 | 3/2009 | Price |
| 7,503,729 B2 | 3/2009 | Hammer et al. |
| 7,546,712 B2 | 6/2009 | Shaw |
| 7,546,716 B1 | 6/2009 | Asadurian |
| 7,553,109 B2 | 6/2009 | Blundell |
| 7,588,390 B2 | 9/2009 | Kelley |
| 7,618,218 B2 | 11/2009 | Newman |
| 7,645,098 B1 | 1/2010 | Rainey |
| 7,651,298 B2 | 1/2010 | Boudreaux |
| 7,694,485 B1 | 4/2010 | Siener |
| 7,785,042 B2 | 8/2010 | Scandaliato |
| 7,857,548 B2 | 12/2010 | Schroeder |
| 7,862,253 B2 | 1/2011 | van den Berge et al. |
| 7,905,070 B2 | 3/2011 | August |
| 7,971,407 B2 | 7/2011 | MacDonald |
| 8,011,152 B2 | 9/2011 | Thomassen |
| 8,015,772 B2 | 9/2011 | Jensen |
| 8,052,348 B2 | 11/2011 | Mahan |
| 8,061,095 B2 | 11/2011 | Bucheger |
| 8,123,434 B1 | 2/2012 | Smith |
| 8,123,435 B1 | 2/2012 | DeShaw et al. |
| 8,132,985 B2 | 3/2012 | Melby et al. |
| 8,171,693 B2 | 5/2012 | Banova |
| 8,201,379 B2 | 6/2012 | Bucheger |
| 8,317,502 B1 | 11/2012 | Grey |
| 8,430,603 B2 | 4/2013 | Price |
| 8,464,481 B2 | 6/2013 | Wauhop |
| 8,562,260 B2 | 10/2013 | Matys et al. |
| 8,601,758 B2 | 12/2013 | Biadora |
| 8,601,759 B2 | 12/2013 | Bucheger |
| 8,667,752 B2 | 3/2014 | Pollack |
| 8,678,704 B1 | 3/2014 | Smith et al. |
| 8,708,608 B2 | 4/2014 | Bott |
| 8,740,505 B1 | 6/2014 | Rowland |
| 8,747,027 B1 | 6/2014 | Singleton |
| 8,820,024 B1 | 9/2014 | Abdullah et al. |
| 8,851,803 B2 | 10/2014 | Bott |
| 8,863,464 B2 | 10/2014 | Balducci |
| 8,863,465 B2 | 10/2014 | Bott |
| 8,888,481 B2 | 11/2014 | O'Neill et al. |
| 8,898,983 B2 | 12/2014 | Fu |
| 8,979,427 B2 | 3/2015 | Farrell |
| 9,003,734 B2 | 4/2015 | Bott |
| 2002/0007610 A1 | 1/2002 | Abang Ali et al. |
| 2002/0023403 A1 | 2/2002 | Whitson |
| 2002/0028114 A1 | 3/2002 | Whitson |
| 2002/0043038 A1 | 4/2002 | Cerrato |
| 2002/0046529 A1 | 4/2002 | Nanayakkara |
| 2002/0182015 A1 | 12/2002 | Shaw |
| 2003/0127581 A1 | 7/2003 | Manthei et al. |
| 2003/0147705 A1 | 8/2003 | McAllister et al. |
| 2003/0230038 A1 | 12/2003 | Seavy |
| 2004/0020114 A1 | 2/2004 | Boehmer et al. |
| 2004/0020144 A1 | 2/2004 | Sanders et al. |
| 2004/0028484 A1 | 2/2004 | Woolford |
| 2004/0159065 A1 | 8/2004 | Burgess et al. |
| 2004/0161307 A1 | 8/2004 | Hammer |
| 2004/0265060 A1 | 12/2004 | Lee et al. |
| 2004/0265070 A1 | 12/2004 | Nanayakkara |
| 2005/0003132 A1 | 1/2005 | Blix et al. |
| 2005/0091940 A1 | 5/2005 | Whitson |
| 2005/0136148 A1 | 6/2005 | Martin |
| 2005/0160573 A1 | 7/2005 | Skrepnek et al. |
| 2005/0252145 A1 | 11/2005 | MacDonald et al. |
| 2005/0257481 A1 | 11/2005 | Shaw |
| 2006/0179780 A1 * | 8/2006 | Price .................... B28B 17/0018 52/604 |
| 2007/0022684 A1 | 2/2007 | Haener |
| 2007/0094991 A1 | 5/2007 | Price et al. |
| 2007/0122239 A1 | 5/2007 | MacDonald et al. |
| 2007/0151191 A1 | 7/2007 | August |
| 2007/0193133 A1 | 8/2007 | Krupnick |
| 2007/0245673 A1 | 10/2007 | Cerrato |
| 2008/0174041 A1 | 7/2008 | Firedman et al. |
| 2008/0184649 A1 | 8/2008 | Khan |
| 2008/0244995 A1 | 10/2008 | Kemp |
| 2008/0289282 A1 | 11/2008 | MacDonald |
| 2009/0090077 A1 | 4/2009 | Rodebaugh et al. |
| 2009/0110491 A1 | 4/2009 | Shaw |
| 2009/0113835 A1 | 5/2009 | Banova |
| 2009/0173872 A1 | 7/2009 | Stott et al. |
| 2009/0185870 A1 | 7/2009 | Shaw |
| 2009/0313923 A1 | 12/2009 | Bucheger |
| 2010/0111615 A1 | 5/2010 | Bott |
| 2010/0132298 A1 | 6/2010 | Rodebaugh et al. |
| 2010/0162648 A1 | 7/2010 | Thomassen |
| 2010/0162649 A1 | 7/2010 | Boot |
| 2010/0284751 A1 | 11/2010 | Price |
| 2010/0310324 A1 | 12/2010 | Bott |
| 2011/0162318 A1 | 7/2011 | Bucheger |
| 2011/0179737 A1 | 7/2011 | MacDonald |
| 2012/0020745 A1 | 1/2012 | Miller et al. |
| 2012/0020746 A1 | 1/2012 | Astolfi et al. |

(56) References Cited

U.S. PATENT DOCUMENTS

| | | |
|---|---|---|
| 2012/0063853 A1 | 3/2012 | Bott |
| 2012/0139163 A1 | 6/2012 | Garfinkel et al. |
| 2012/0195696 A1 | 8/2012 | Matys et al. |
| 2012/0199721 A1 | 8/2012 | Lerberg et al. |
| 2012/0222374 A1 | 9/2012 | Bucheger |
| 2013/0061549 A1 | 3/2013 | Biadora |
| 2013/0074436 A1 | 3/2013 | Bott |
| 2013/0074437 A1 | 3/2013 | Bott |
| 2013/0081353 A1 | 4/2013 | Jensen |
| 2013/0149037 A1 | 6/2013 | Yu et al. |
| 2013/0279979 A1 | 10/2013 | Pollack |
| 2014/0096468 A1 | 4/2014 | Balducci |
| 2014/0230357 A1 | 8/2014 | Kovitch |
| 2014/0250819 A1 | 9/2014 | Abdullah et al. |
| 2014/0260055 A1 | 9/2014 | Pfeiffer |
| 2014/0270988 A1 | 9/2014 | Riccobene et al. |
| 2015/0033660 A1 | 2/2015 | Balducci |

FOREIGN PATENT DOCUMENTS

| | | |
|---|---|---|
| GB | 1446398 | 8/1976 |
| JP | 06099420 | 1/1944 |
| JP | 11286003 | 11/1999 |
| WO | 9626324 A1 | 8/1996 |
| WO | 2015026745 A2 | 2/2015 |
| WO | 2015026745 | 10/2015 |

OTHER PUBLICATIONS

Berm Breakwaters—Design, Construction and Monitoring, by Sigurdur Einarsson, Sigurdur Sigurdarson, Gisli Viggossen, Omar B. Smarason and Julius Arnorsson, from Breakwaters '99: First International Symposium on Monitoring of Breakwaters, Conference, Sep. 8-10, 1999, University of Wisconsin, Madison Wisconsin, USA, pp. 19-27.

Coastal Engineering Technical Note, Core-Loc Concrete Armor Unit Design, CETN III-53 (Mar. 1994), US Army Engineer Waterways Experiment Station, Coastal Engineering Research Center, Vicksburg, VA, Mar. 1994, 3 Pages.

Core-Loc Concrete Armor Units, by Jeffrey A. Melby and George F. Turk, Final Technical Report CHL-97-4, Mar. 1997, US Army Corps of Engineers, Waterways Experiment Station, Vicksburg MI, USA, 45 Pages.

Design of Coastal Revetments, Seawalls, and Bulkheads: Engineer Manual, EM 1110-2-1614 Jun. 30, 1995, US Army Corps of Engineers, Engineering and Design, 40 Pages.

Design of RIPRAP Revetment, by Scott A. Brown and Eric S. Clyde, Report No. FHWA-IP-89-016 HEC-11, Office of Implementation, Federal Highway Administration, McLean VA, USA, Mar. 1989.

PCT International Search Report in PCT/US2014/051557 dated Feb. 3, 2015.

Technical Report REMR-CO-0, Case Histories of Corps Breakwater and Jetty Structures—Report 4 Pacific Ocean Division, by Francis E. Sargent, Dennis G. Markle, and Peter J. Grace, Coastal Engineering Research Center, Department of the Army, Waterways Experiment Station, Vicksburg, MI, USA, Sep. 1988, 50 Pages.

The First Core-Loc Breakwater, by Anton H. Holtzhausen, Coastal Engineering, 1998, Conference Proceeding Paper, pp. 1871-1883, 13 Pages.

International Preliminary Report on Patentability, Issued on Feb. 23, 2016 in International Patent Application No. PCT/US2014/051557, Applicant—Stable Concrete Structures, Inc.

International Search Report, Issued on Mar. 2, 2015 in International Patent Application No. PCT/US2014/051557, Applicant—Stable Concrete Structures, Inc.

ArmorFlex Design Manual, Abridged Version 2002, Design Manual for ArmorFlex(R) Articulating Concrete Blocks, by ArmorTec Erosion Control Solutions, LLC, 15 Pages.

Brochure for Armorflex(R) Concrete Block Revetment System, 2000, Armortec Erosion Control Solutions, Bowling Green, Kentucky, 4 Pages.

Detail Sheets for Armortec(R) Products, including ArmorFlex(R) Open Cell Blocks, ArmorFlex(R) Closed Cell Blocks, ArmorLoc(R) Block, ArmorWedge(R) Block, A-Jacks(R) Blocks, ArmorFlex(R) Block and Half(R), and ArmorRoad(R), Block, 2016, Contech Engineered Solutions LLC, 4 Pages.

Guidelines for XBloc Concept Designs, Sep. 2011, by Delta Marine Consultants (DMC), The Netherlands, 21 Pages.

Historical Overview of Breakwater Armour Units, 2016, by Delta Marine Consultants, The Netherlands, 1 Page.

"Report of the Massachusetts Coastal Erosion Commission—vol. 1: Findings and Recommendations", Dec. 2015, Commonwealth of Massachusetts, 138 Pages.

Feng Cai, Xianze Su, Jianhui Liu, Bing Li, and Gang Lei, "Coastal Erosion in China Under the Condition of Global Climate Change and Measures for Its Prevention", National Natural Science Foundation of Chinese Academy of Sciences, published by Elsevier Limited and Science in China Press, 2008, 12 Pages.

Product Brochure for Enviro-Block(TM) Wall Construction Technology, Inter-Block Retaining Systems, Inc., Valley Center, California, Circa 2014, 8 Pages.

\* cited by examiner

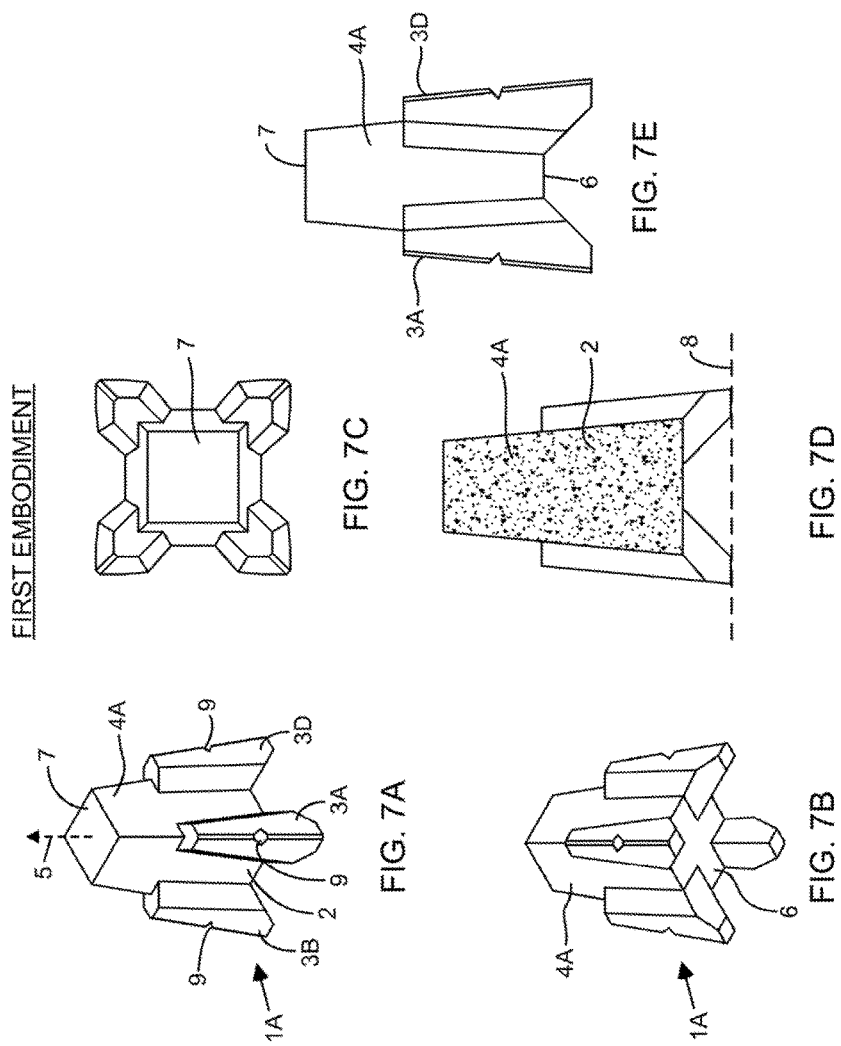

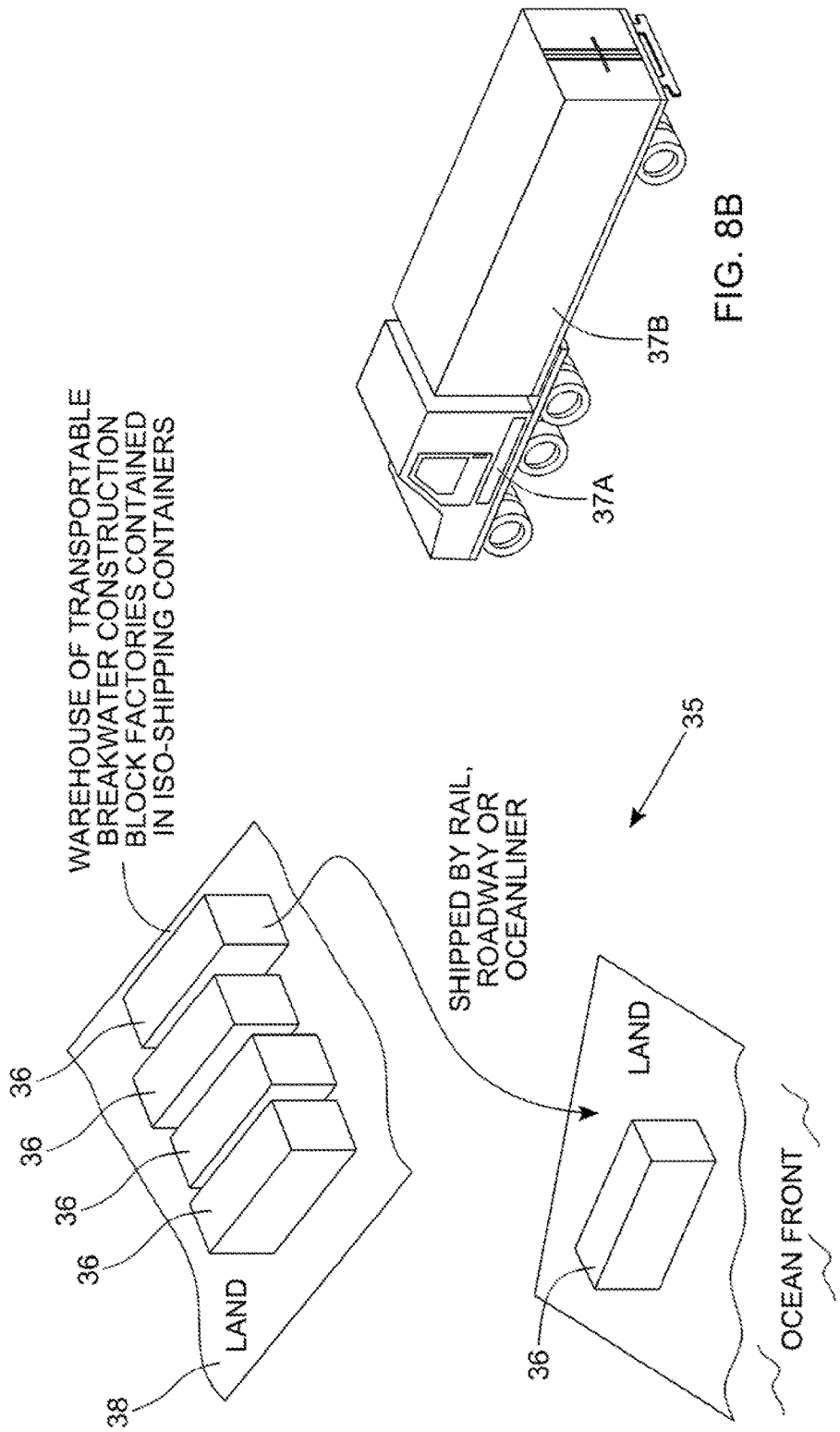

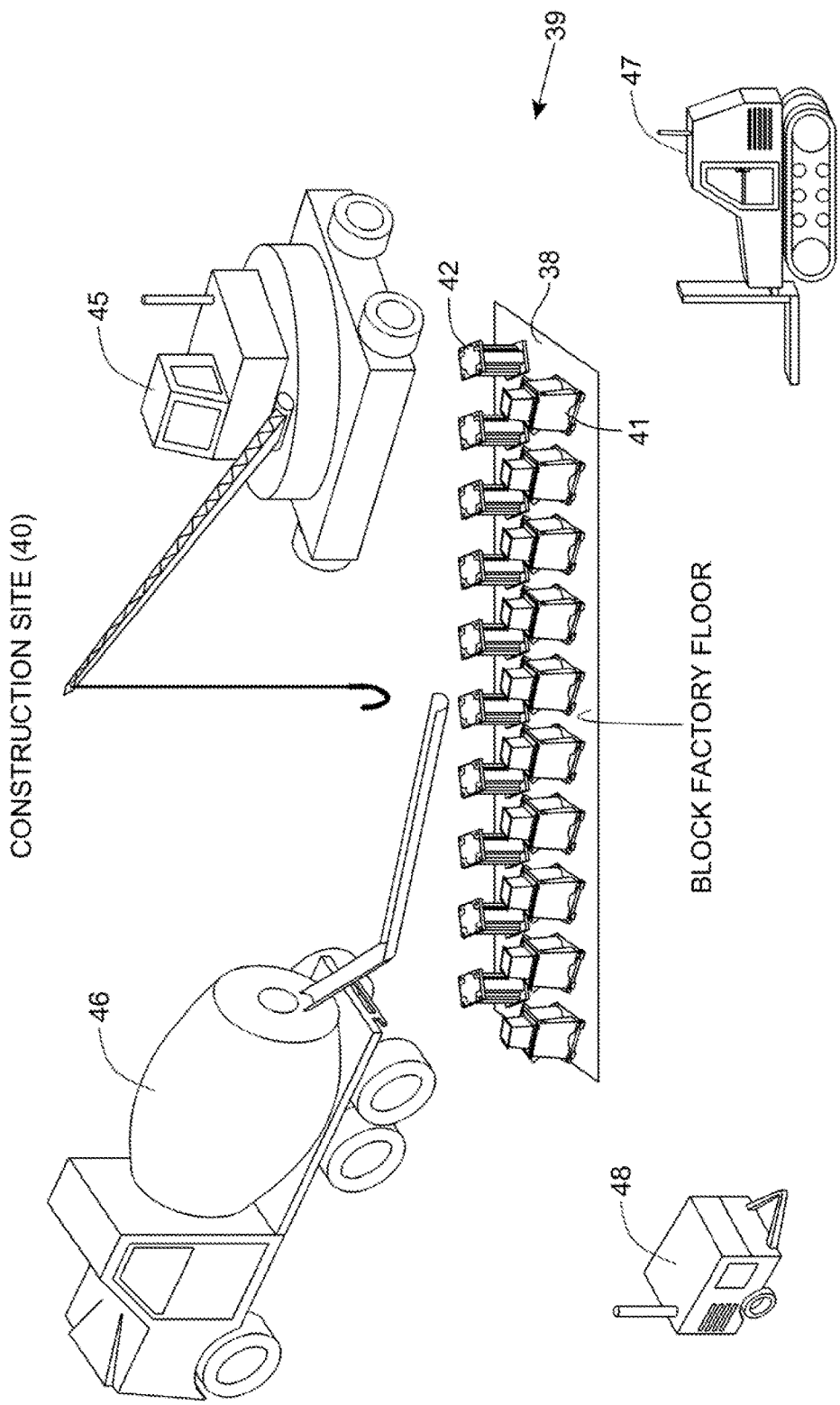

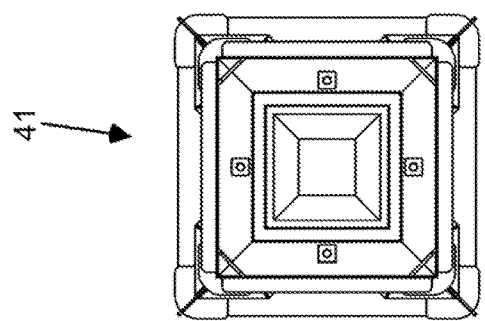
FIG. 9A3
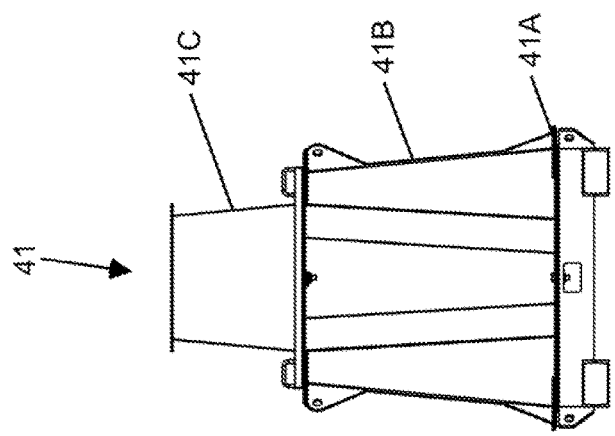
FIG. 9A2
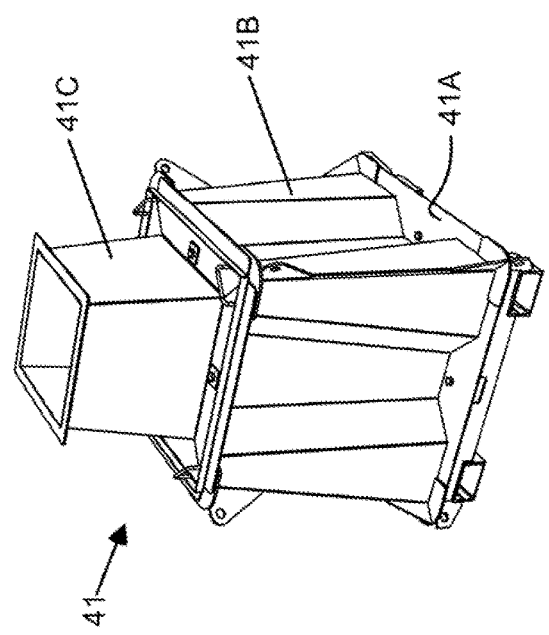
FIG. 9A1

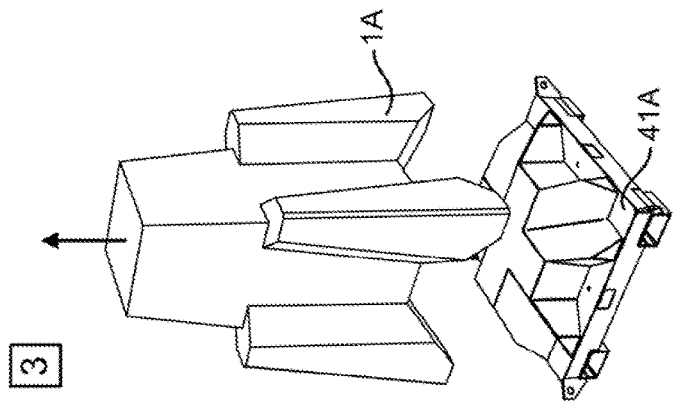
FIG. 9B3
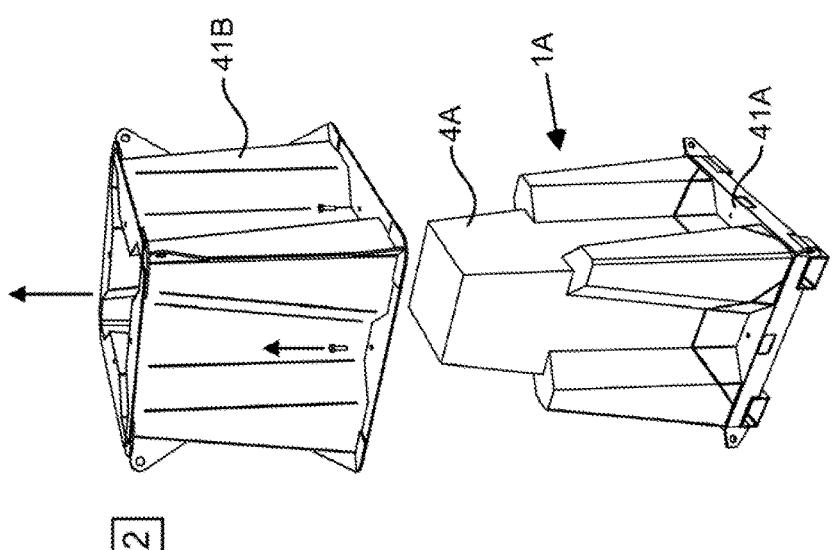
FIG. 9B2
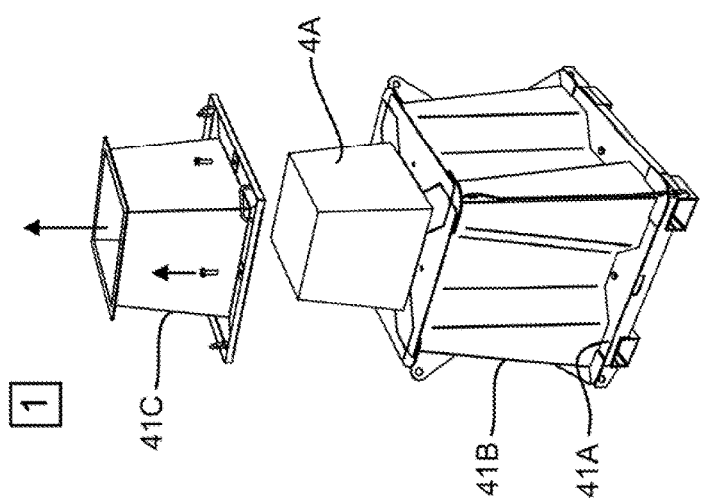
FIG. 9B1

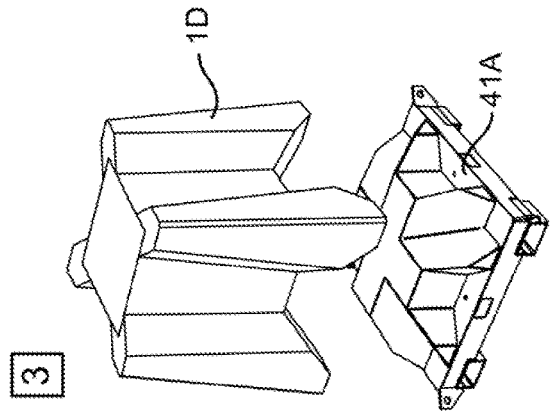
FIG. 9C3
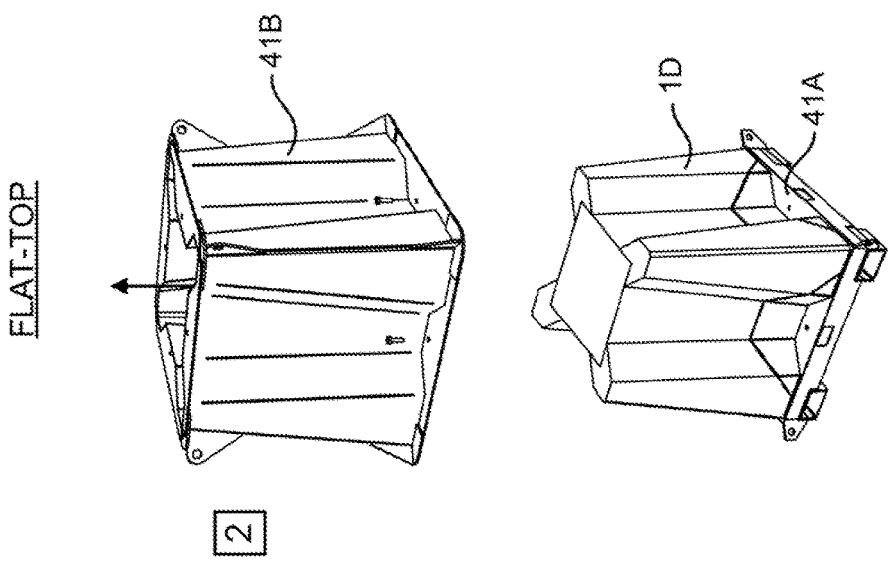
FIG. 9C2
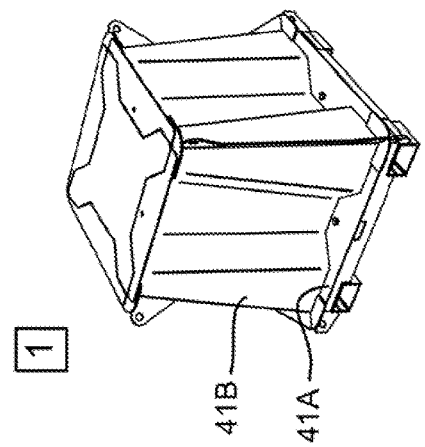
FIG. 9C1

MOLDING BLOCKS HAVING A FLOW THROUGH SIDE APERTURE
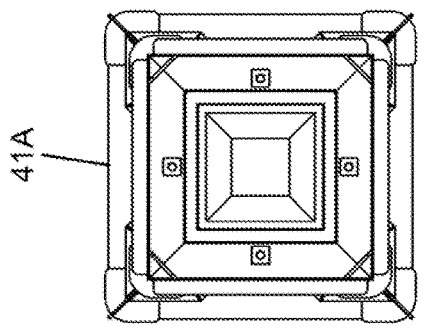
FIG. 9D3
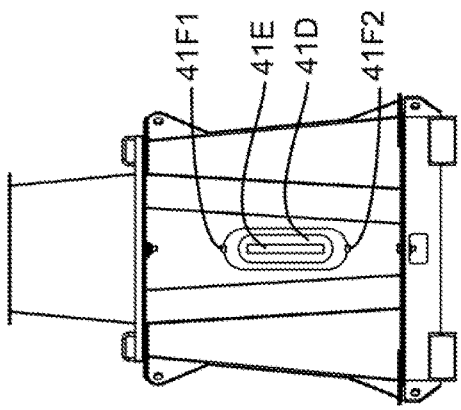
FIG. 9D2
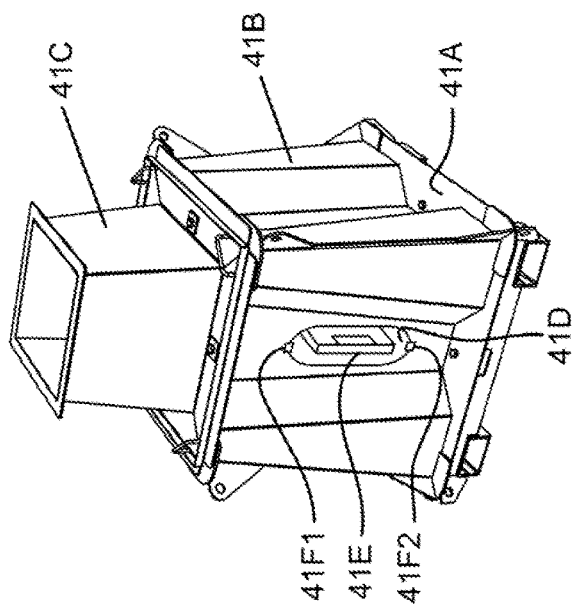
FIG. 9D1

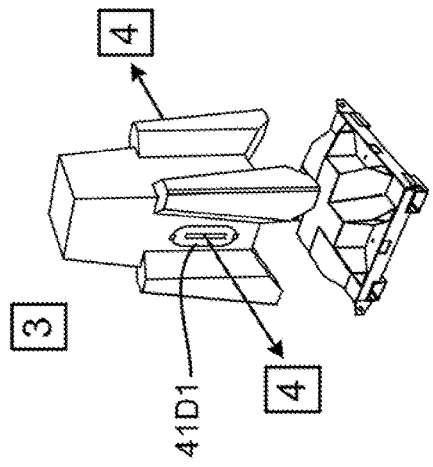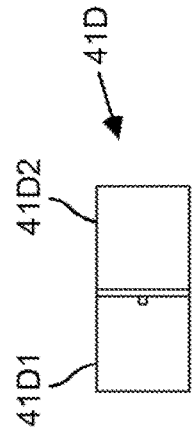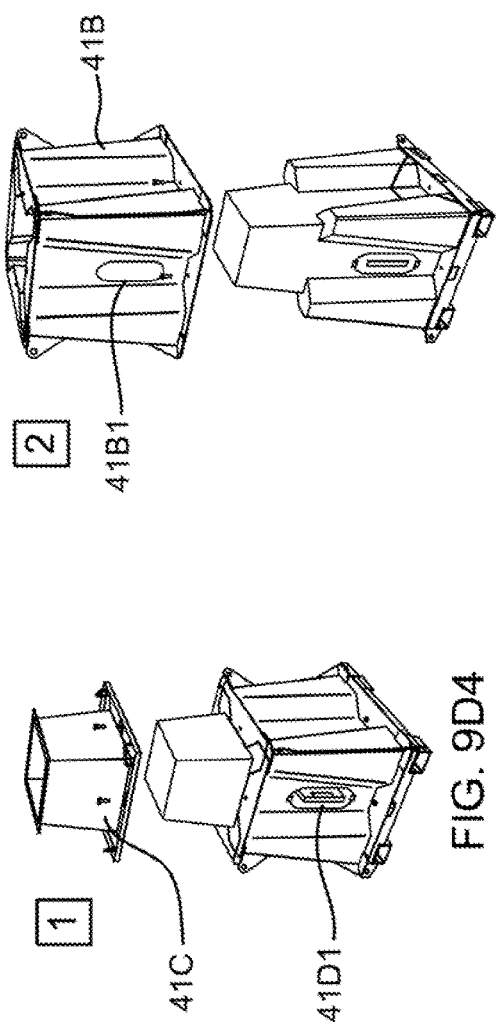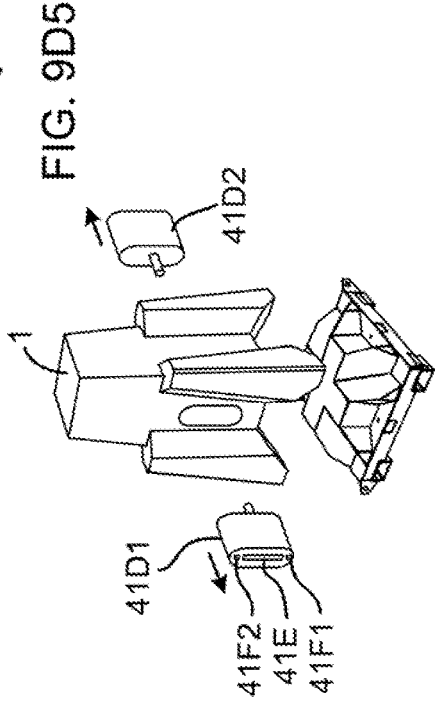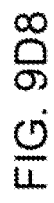
FIG. 9D4
FIG. 9D5
FIG. 9D6
FIG. 9D7
FIG. 9D8

INTERLOCKING SHEAR KEY BLOCK MOLD SUBSYSTEM

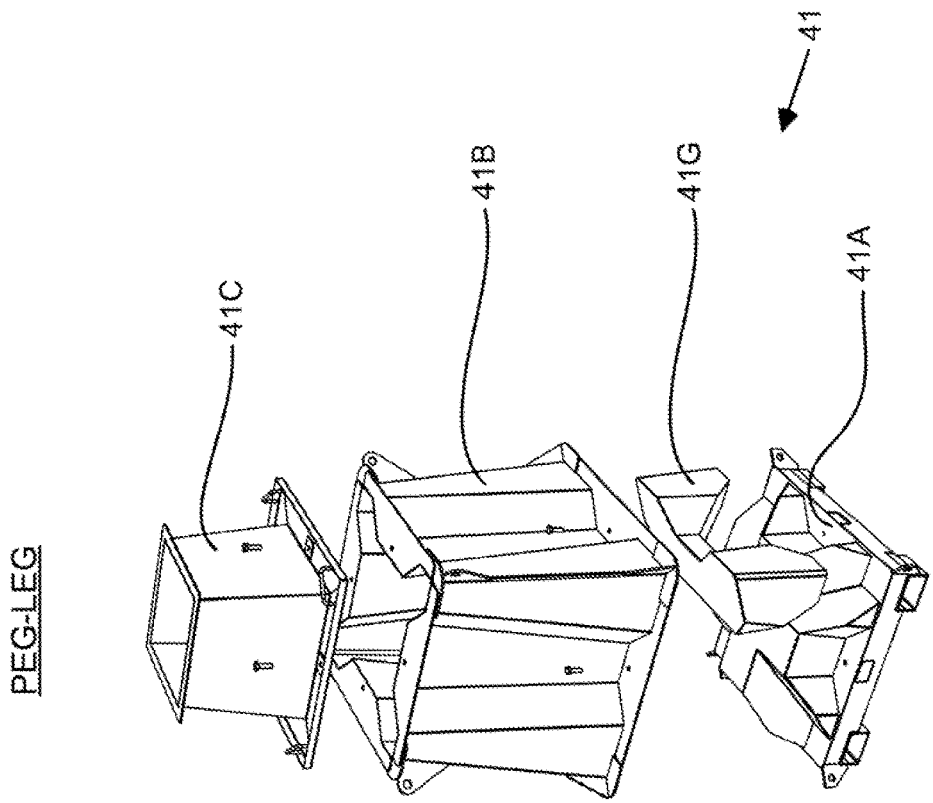

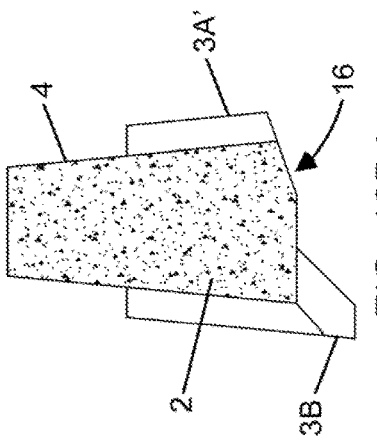
FIG. 10B4
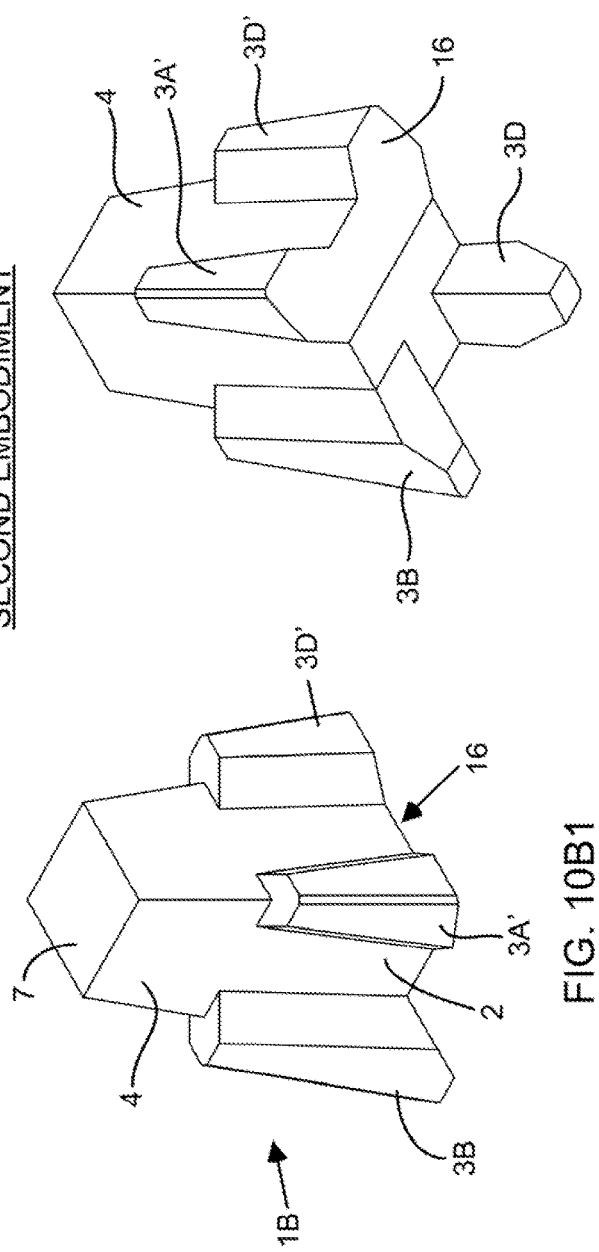
SECOND EMBODIMENT
FIG. 10B2
FIG. 10B1
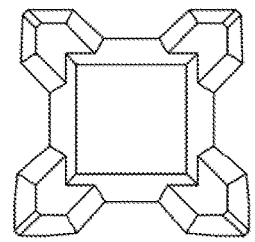
FIG. 10B3

THIRD EMBODIMENT

FOURTH EMBODIMENT

FIFTH EMBODIMENT

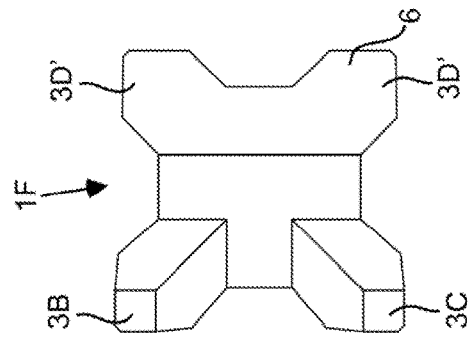
FIG. 14C
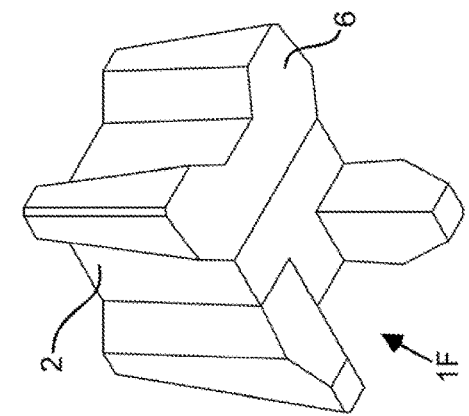
FIG. 14B SIXTH EMBODIMENT
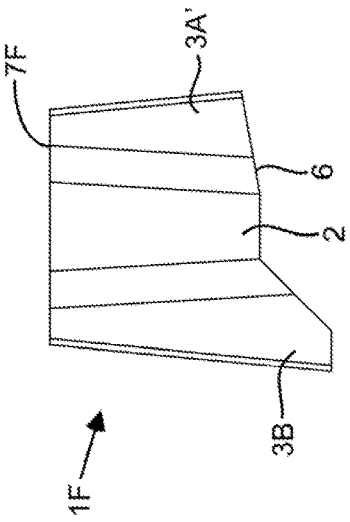
FIG. 14E
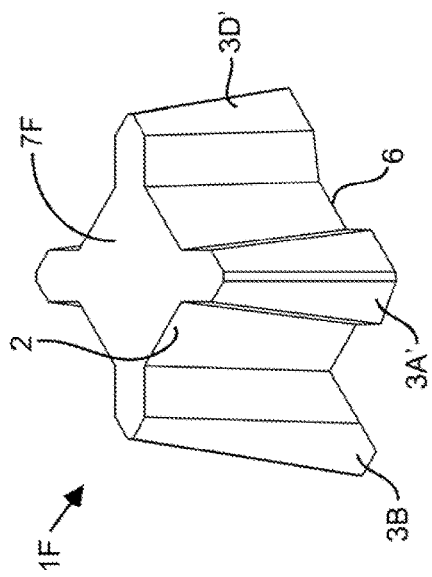
FIG. 14A
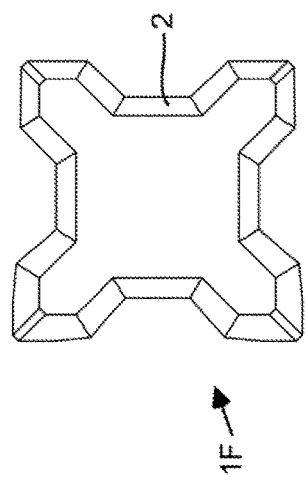
FIG. 14D

SEVENTH EMBODIMENT

EIGHTH EMBODIMENT

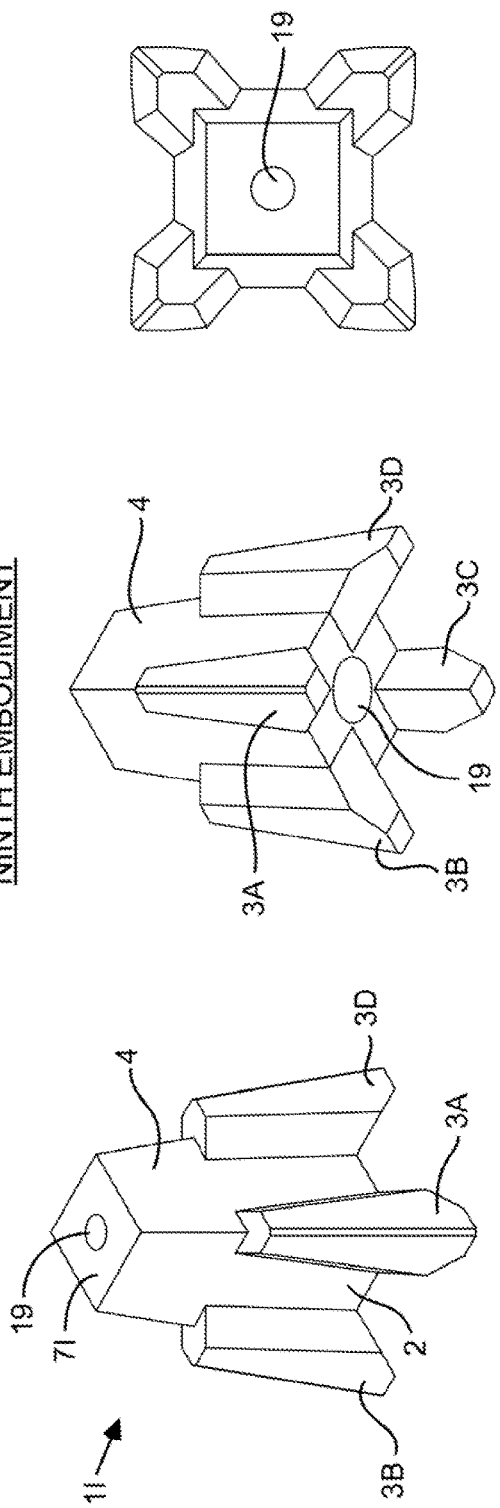

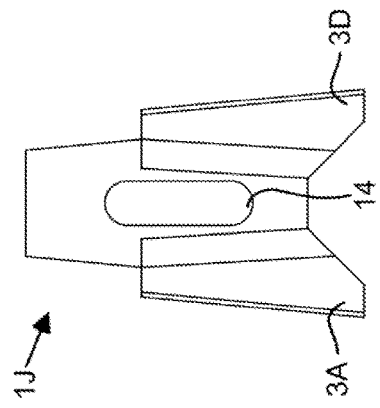
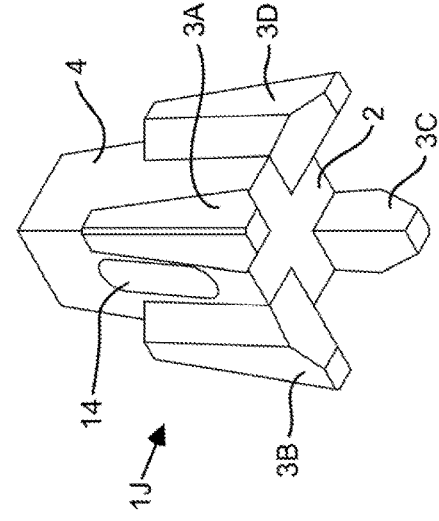
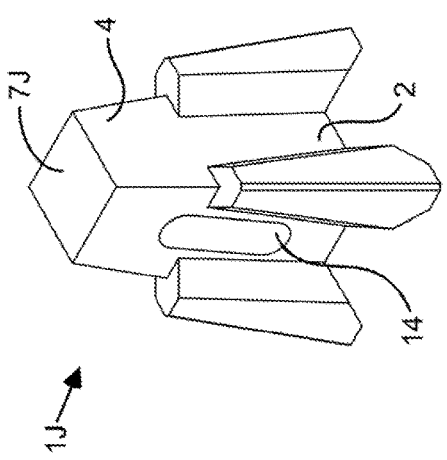
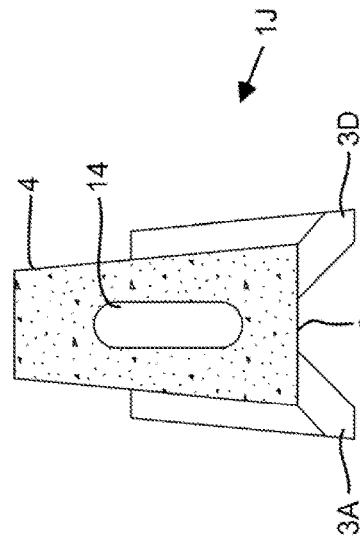
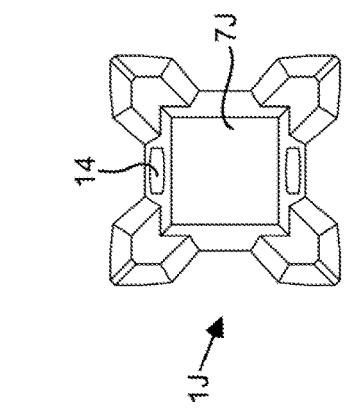

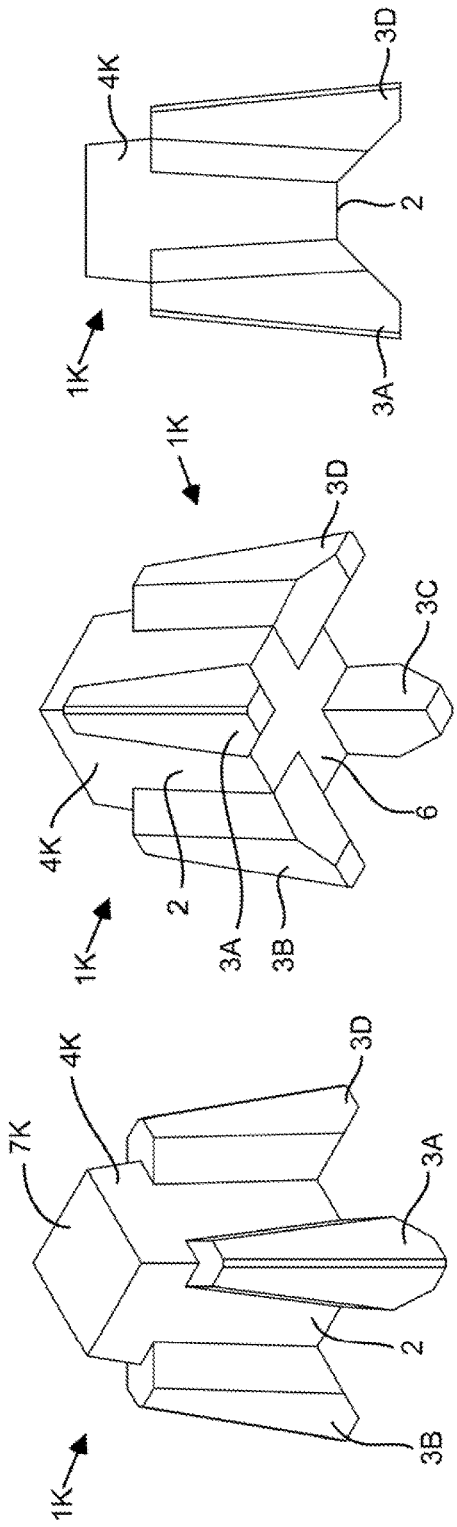

TWELFTH EMBODIMENT

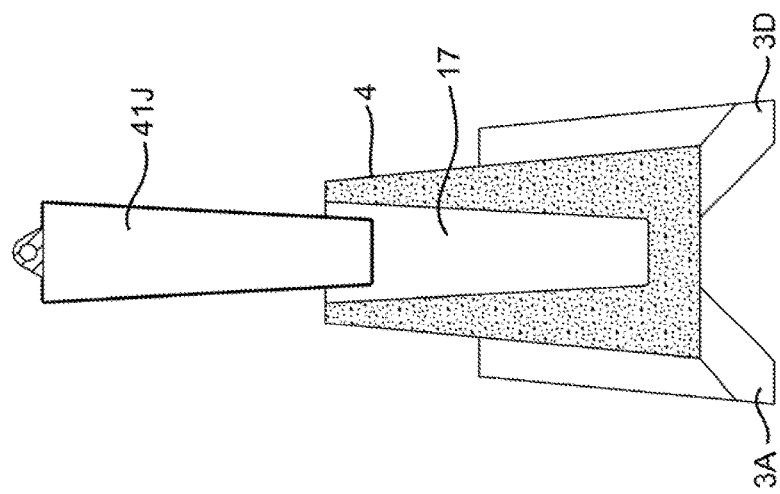
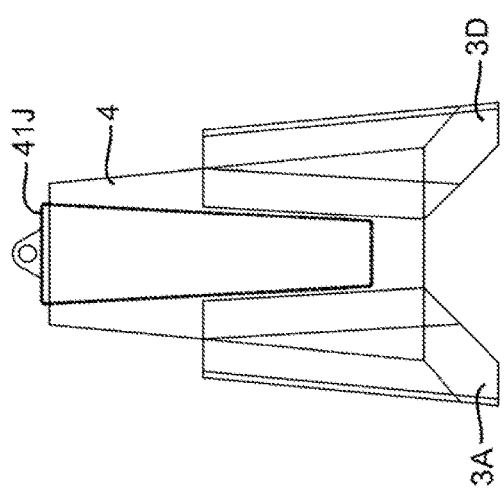
FIG. 22E
FIG. 22D

BREAKWATER CONSTRUCTION BLOCK SYSTEM

BREAKWATER CONSTRUCTION BLOCK SYSTEM

BREAKWATER CONSTRUCTION BLOCK SYSTEM

BREAKWATER CONSTRUCTION BLOCK SYSTEM

INTERLOCKING SHEAR KEYS
(TYPES A & B)

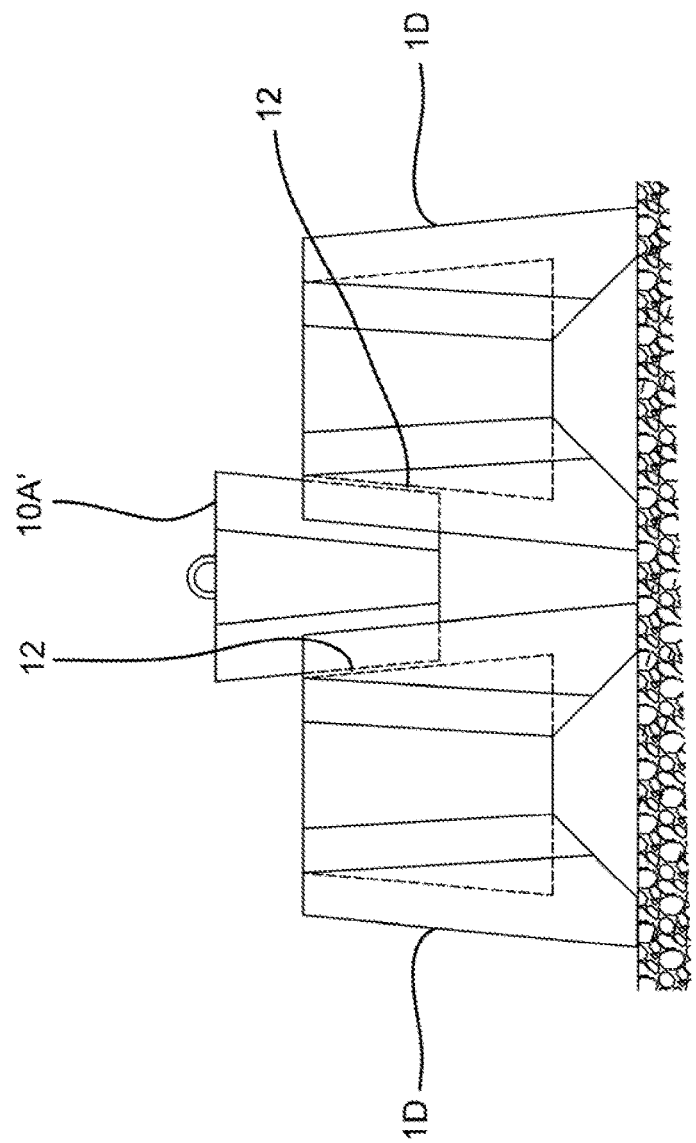

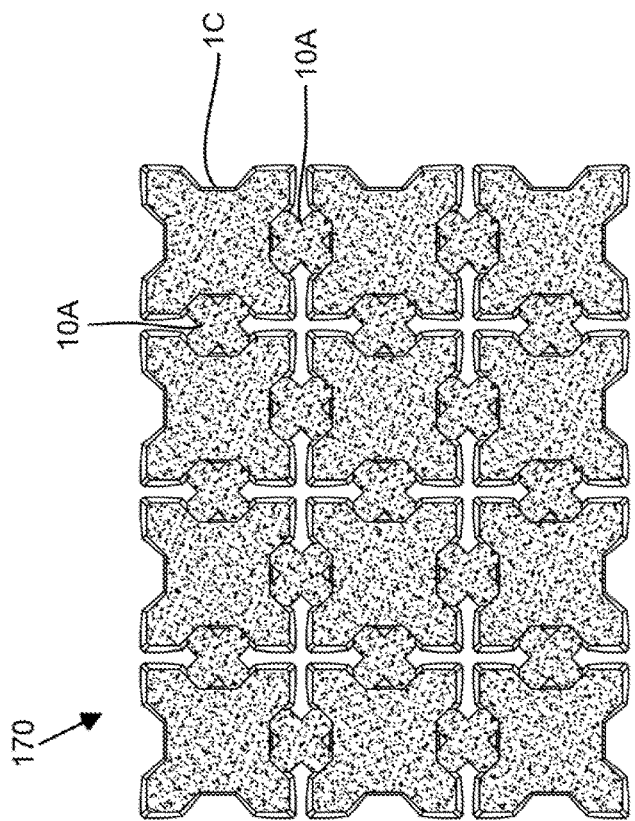
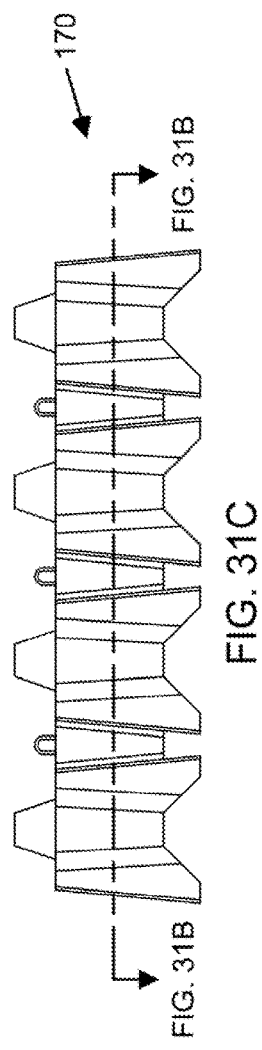
FIG. 31B
FIG. 31C

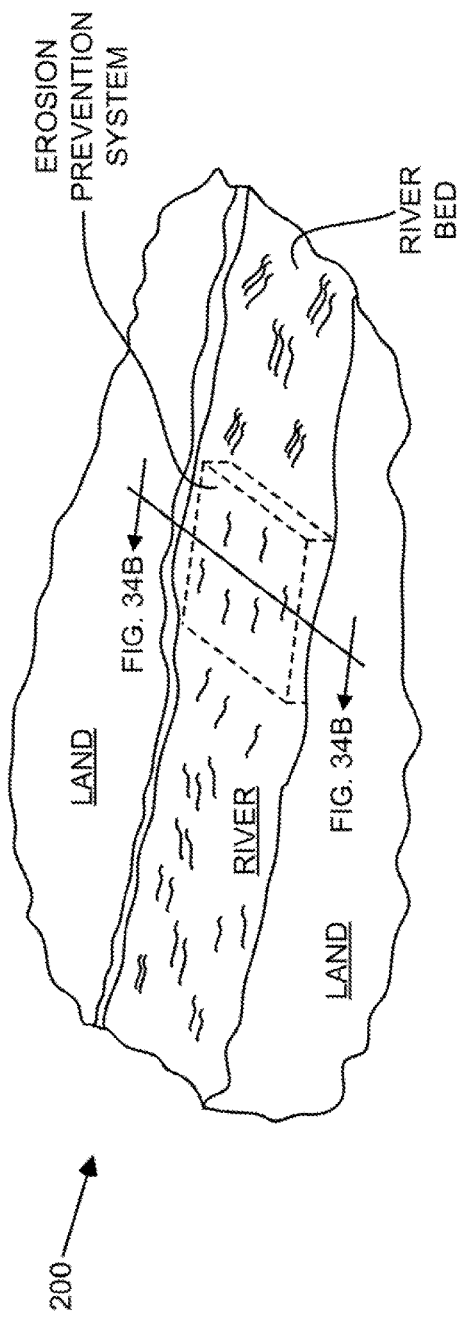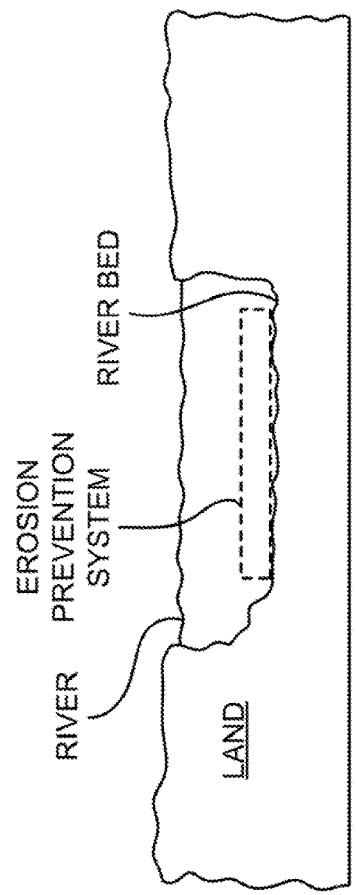

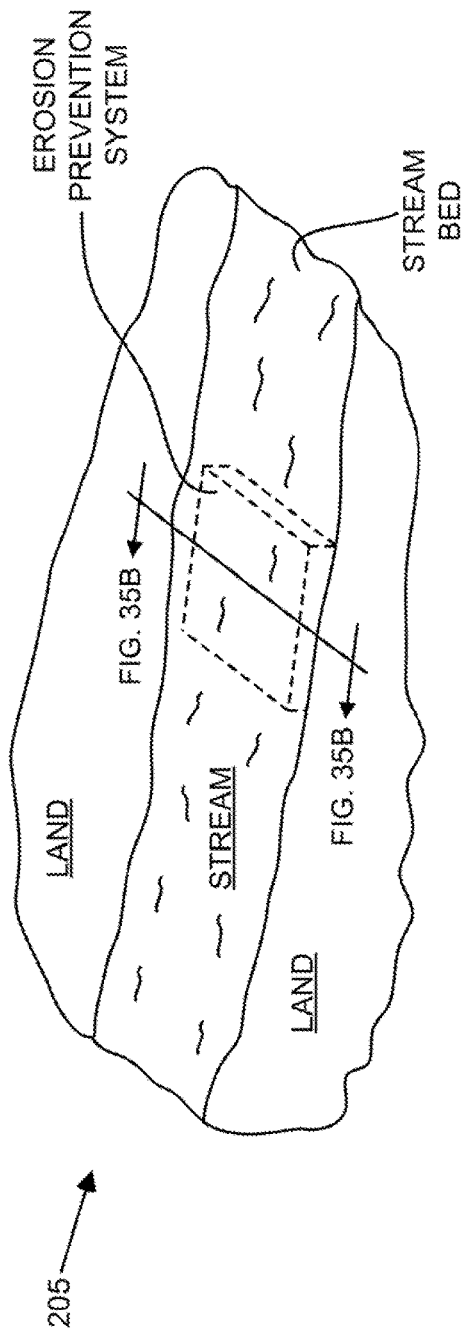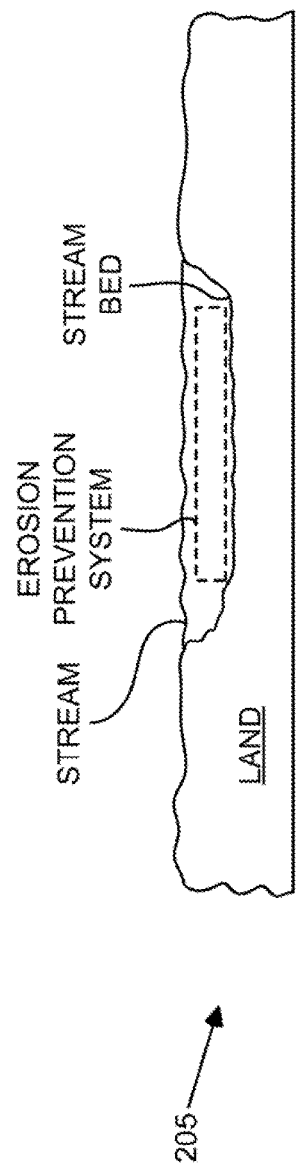
FIG. 35A
FIG. 35B

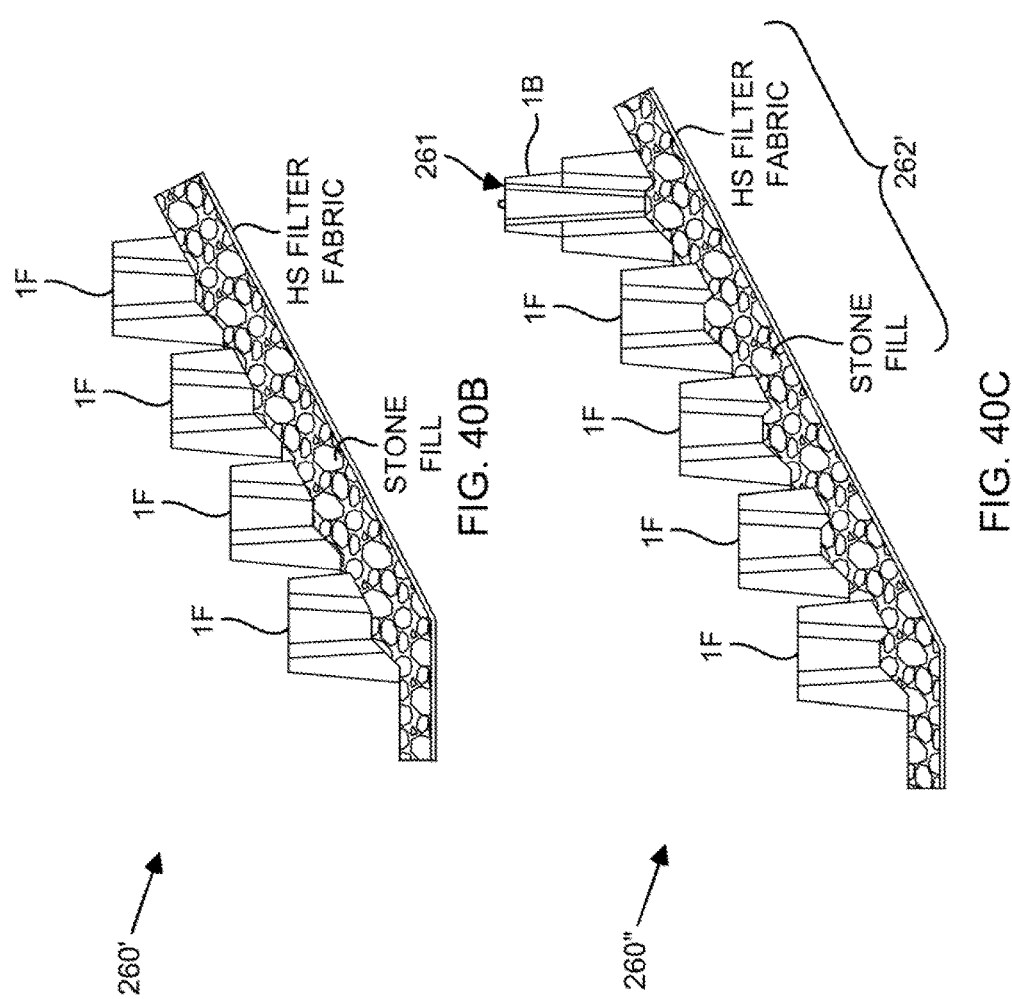

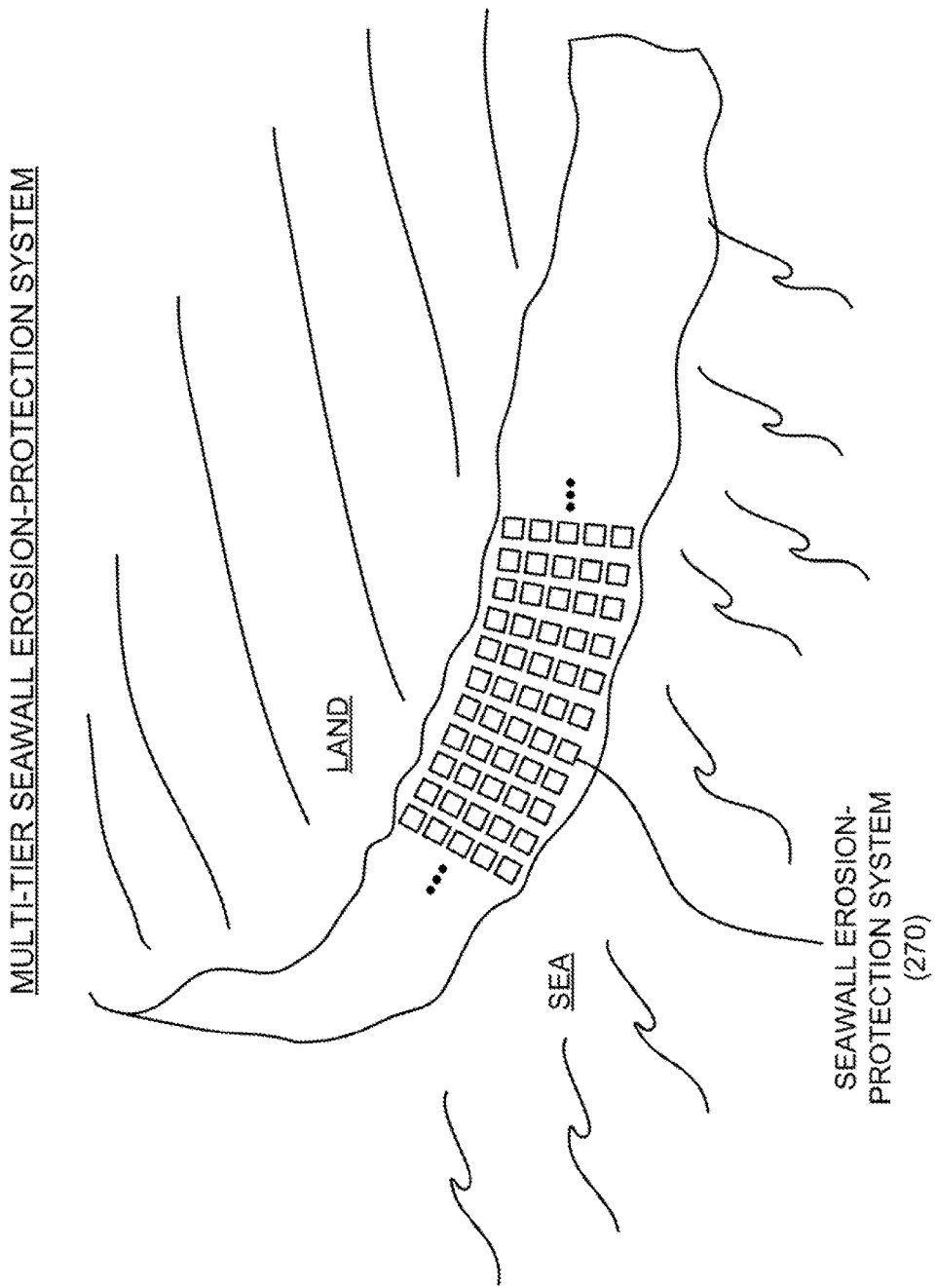

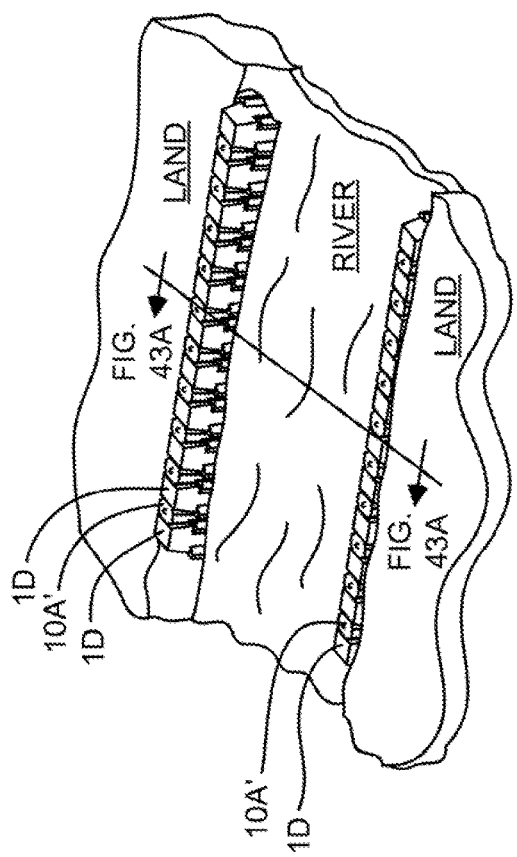
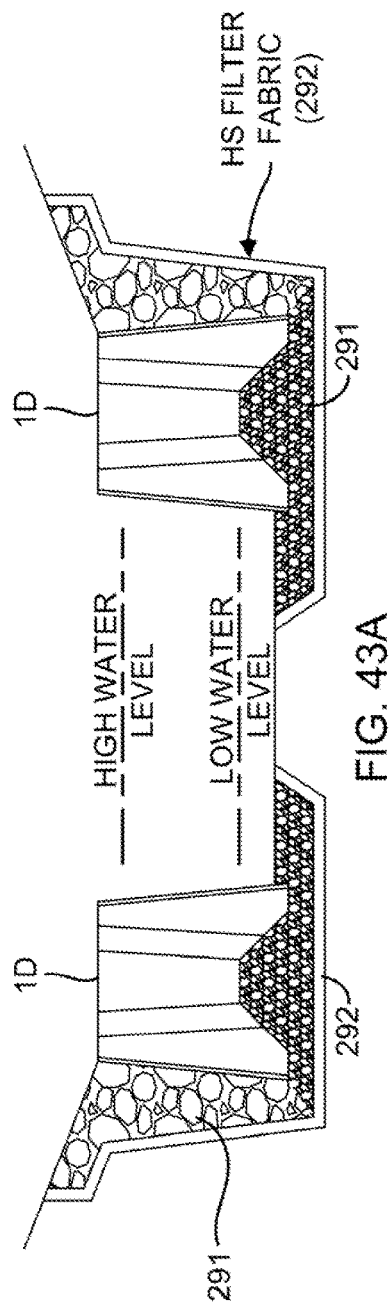
FIG. 43
FIG. 43A

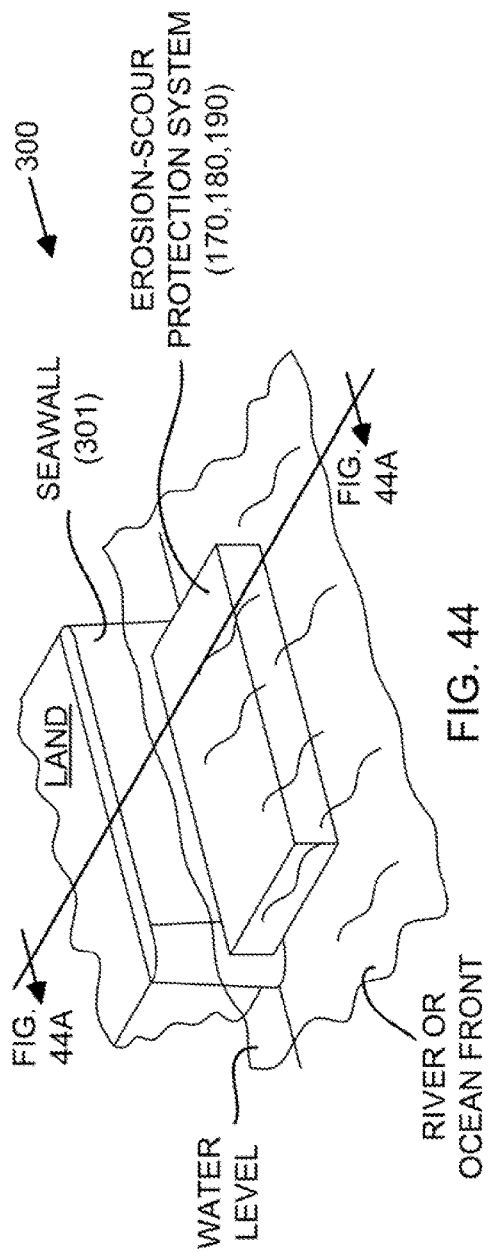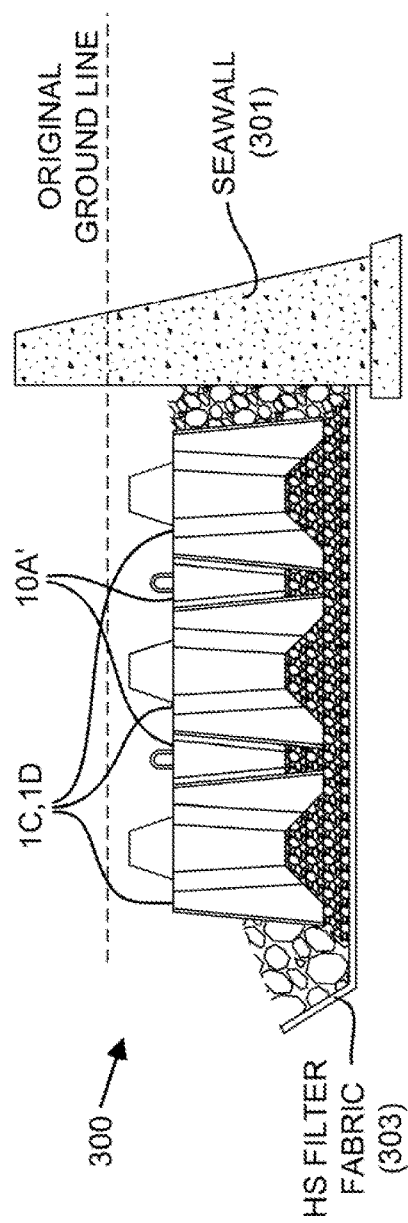
FIG. 44
FIG. 44A

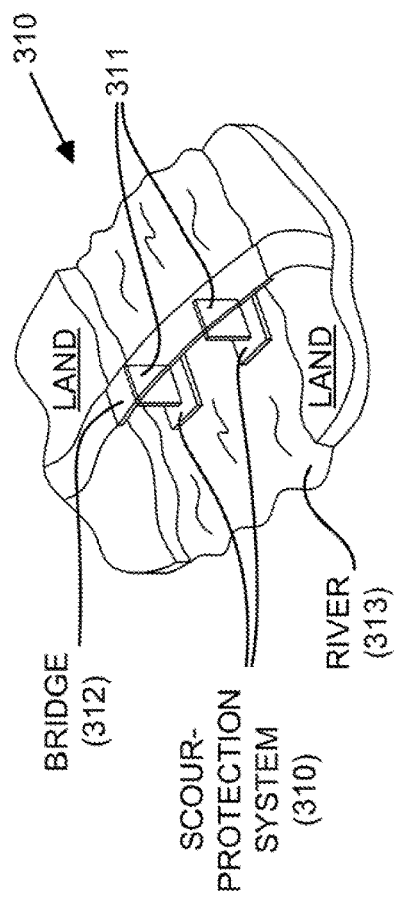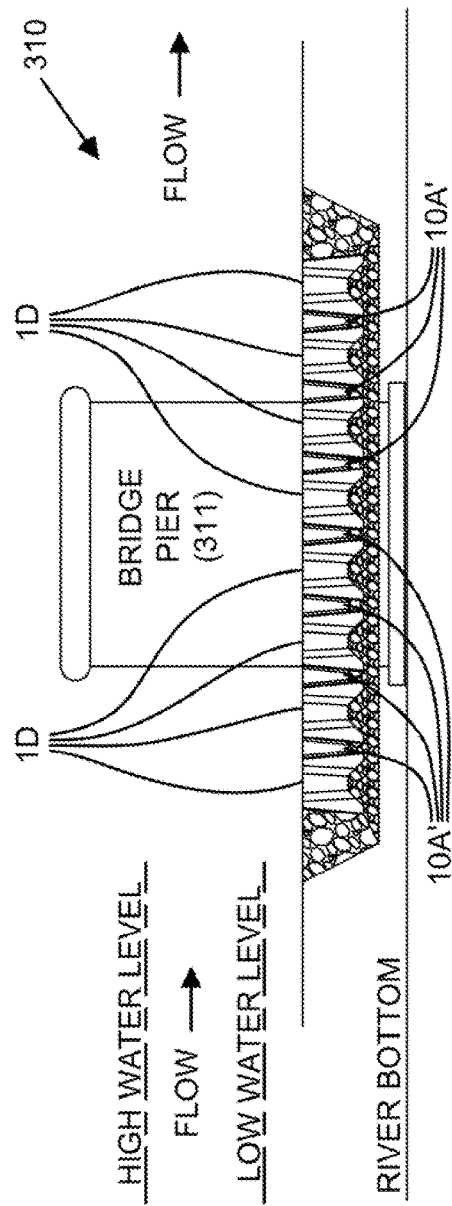
FIG. 45
FIG. 45A

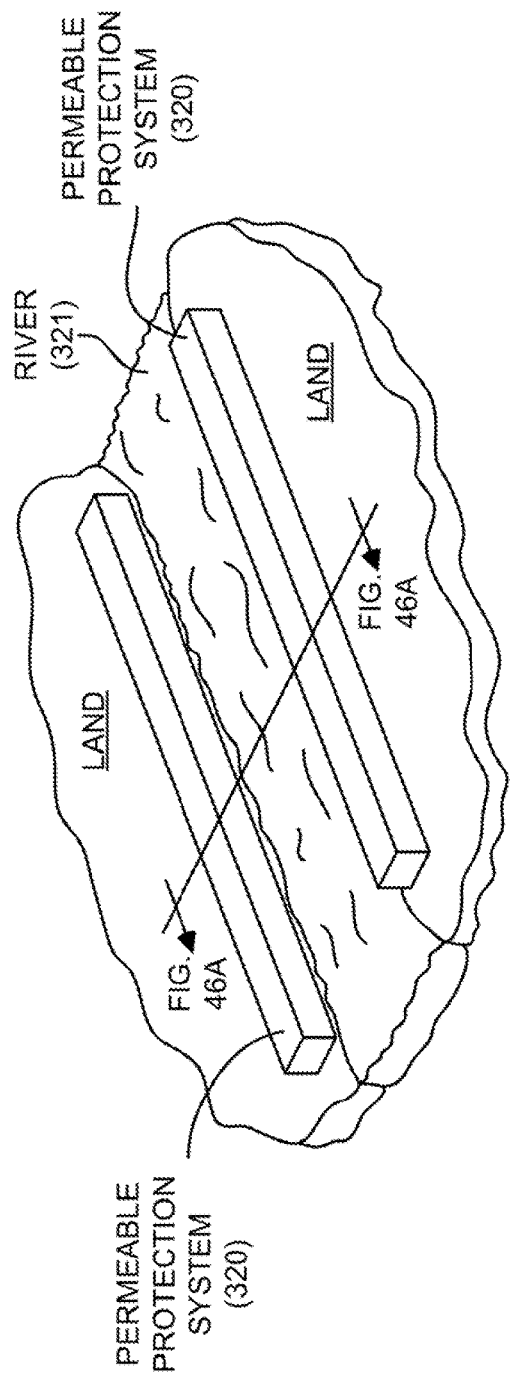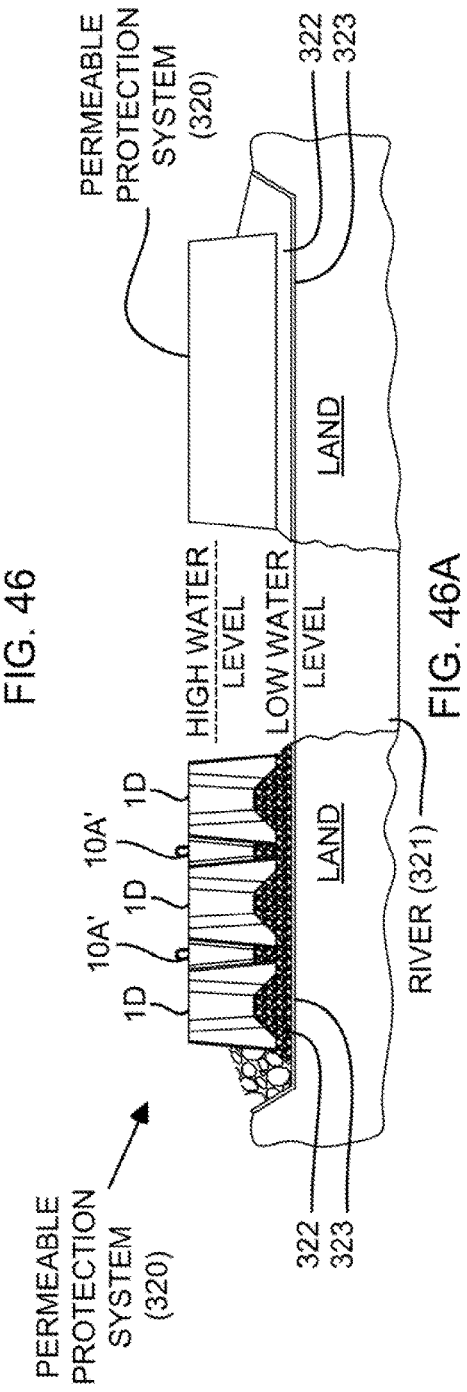

METHODS OF AND SYSTEMS FOR CONTROLLING WATER FLOW, BREAKING WATER WAVES AND REDUCING SURFACE EROSION ALONG RIVERS, STREAMS, WATERWAYS AND COASTAL REGIONS

BACKGROUND OF INVENTION

Field of Invention

The present invention relates to improved methods of and systems for controlling water flow, breaking water waves, and reducing surface erosion along river beds, streams, and coastal regions and waterways.

Brief Description of the State of Knowledge in the Art

In general, most armor block shapes have been developed by government agencies to provide solutions for erosion problems and the building of breakwaters for port development.

Since the early 1950's concrete armor shapes have been developed and used throughout the world with varying degrees of success to construct breakwaters around the world. The building of a major breakwater is an extremely costly venture that usually takes years to design and build. When erected in deep water areas, which can generate large waves, the breakwater is generally armored with large concrete armor units because of their superior stability factor over stone when subjected to severe wave attack.

One of the major drawbacks associated with using concrete armor shapes for protection of marine structures is the high cost of producing the units, which are usually cast only once every 24 hours. For a given structure requiring thousands of units, the casting operation can take months and even years to complete a given project. Therefore it is desirable that any shape proposed should preferably be simple to cast at a rapid rate.

Back in the early 1980's, Applicant developed a new and improved concrete armor shape, disclosed in U.S. Pat. No. 4,594,023, for use in the design and construction of breakwaters, flood control structures, armored revetments, jetties and for the rapid building of off-shore islands. In U.S. Pat. No. 4,594,023, Applicant proposed a construction element comprising a trapezoidal inner core supported by trapezoidal legs which space the inner core apart from any surface on which it rests, regardless of which face of the unit is disposed downward. As disclosed in FIGS. 1A, 1B and 1C, the overall shape of this prior art construction element is generally trapezoidal with specifically designed and shaped void segments cut into every plane surface for the release of water pressure to prevent uplift pressures from moving the units out of position. The void segments on each surface of the units also form legs for setting the units and also provides for a void area beneath the blocks for release of hydrostatic head pressure. The leg configuration also permits ease of installation on a rough stone surface. No matter how the units are arranged (patterned or random) the void zones permit escape of water pressure which is of prime importance for stability. When the units are placed pell-mell they form a highly stable mass permitting the release of water pressure in every direction even if one block is placed directly on top of another unit. When the units are set in a pattern, either laying down or standing erect, they form a stable mass, and as wave energy moves up an array of the blocks, it will collide with the water jets that pass through the void areas in each unit.

While the prior art construction unit disclosed in U.S. Pat. No. 4,594,023 offers structural integrity, it has suffered from a number of significant shortcomings and drawbacks. In particular, this prior art breakwater construction block has experienced serious breakage problems when subjected to eccentric movement and consolidation on a breakwater slope. In addition to presenting difficulty during the casting of the units, the four top lugs on the unit experience shearing off or breakage, and have limited the applications for this breakwater construction block design.

Therefore, there is a great need in the art for a new and improved breakwater construction block for constructing seawalls, beach erosion barriers, and systems for controlling and breaking water, and reducing surface erosion along rivers, streams and coastal regions and waterways, and also improved methods and apparatus for manufacturing the same in a flexible and cost-effective manner, while avoiding the shortcomings and drawbacks of prior art systems and methodologies.

OBJECTS AND SUMMARY OF THE PRESENT INVENTION

Accordingly, a primary object of the present invention is to provide new and improved methods of and systems for improved methods of and systems for controlling ocean waves, and reducing surface erosion along rivers, streams and coastal regions and waterways, while avoiding the shortcomings and drawbacks of prior art systems and methodologies.

Another object of the invention is to provide an improved family of breakwater construction block designs that can be produced using a single unique block molding/forming system employing a set of form attachments, form inserts and filler segments to design geometrical features into the breakwater construction block design that increases its stability factor for specific engineering projects.

Another object of the invention is to provide an improved breakwater construction block design that can be produced with various degrees of stability by reducing the height of the rear leg portions of the blocks and a portion of the bottom portion of the central core of the block, as shown by the set of truncation lines drawn above the right leg of the level unit, thereby increasing the batter of the block and automatically increasing the stability of the works.

Another object of the invention is provide the engineering community with a new and improved method of designing and implementing water control and ocean wave breaking systems using an unique system of improved breakwater construction blocks of varying sizes and shapes for resolving any water control problem encountered in the field of civil and marine engineering.

Another object of the invention is to provide the engineering community with a unique breakwater construction block molding system employing several basic molding portions, along with multiple attachments and filler segments, for molding various kinds of breakwater construction blocks and various interlocking shear key block designs, that can be readily used to design and implement effective solutions for resolving water control and soil erosion problems.

Another object of the invention is to provide an improved breakwater construction block having only a pair of legs which, without effecting the structural integrity of the basic central trapezoidal core portion of the block, and allowing for improved installation along sloped and inclined coastal regions.

Another object of the present invention is to provide a novel family of improved breakwater construction blocks which can be manufactured using a single modular-type multi-form breakwater construction block molding system that can be easily transported to the construction site where blocks can be rapidly manufactured.

Another object of the present invention is to provide a new and improved breakwater construction block molding system configured to form at least sixteen different breakwater construction blocks, each having a central trapezoidal core portion and at least one pair of leg portions that extend from the central trapezoidal core portion of the block design.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, and a tower-type portion (e.g. at least ½ the height of central trapezoidal core portion) extending axially along the central axis of the central trapezoidal core portion and beyond the trapezoidal leg portions, for the purpose of breaking up and slowing down the flow of water passing over the central trapezoidal core portion of the breakwater construction block Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, wherein a pair of the trapezoidal support legs are truncated at its bottom end, and a tower-type portion (e.g. at least ½ the height of the central trapezoidal core portion) extending axially from the central trapezoidal core portion and beyond the trapezoidal leg portions, for breaking up and slowing down the flow of water passing over the central trapezoidal core portion of the breakwater construction block.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, and a short top portion (e.g. ¼ the height of central trapezoidal core portion) extending axially from the central trapezoidal core portion and beyond the trapezoidal leg portions, for breaking up and slowing down the flow of water passing over the central trapezoidal core portion of the breakwater construction block.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, and a substantially flat top portion extending axially from the central trapezoidal core portion and on level with the top surface of the trapezoidal leg portions, for allowing water to flow freely over the central trapezoidal core portion of the breakwater construction block.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, a substantially flat top portion extending axially from the central trapezoidal core portion and on level with the top surface of the trapezoidal leg portions for allowing water to flow freely over the central trapezoidal core portion of the breakwater construction block, and a pair of transverse bores passing through the central axis of the central trapezoidal core portion, at orthogonal directions so as to allow the passage of cable or tie rods to pass through each breakwater construction block and interconnect a group of breakwater construction blocks.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, and a pair of the trapezoidal support legs being truncated at its bottom end, a substantially flat top portion extending axially from the central trapezoidal core portion and on level with the top surface of the trapezoidal leg portions for allowing water to flow freely over the central trapezoidal core portion of the breakwater construction block.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, a substantially flat top portion extending axially from the central trapezoidal core portion and on level with the top surface of the trapezoidal leg portions for allowing water to flow freely over the central trapezoidal core portion of the breakwater construction block, and an axially-disposed shaft projecting along the central axis of the central trapezoidal core portion, and capable of supporting any device while the breakwater construction block is mounted on the bottom of a streambed, riverbed or coastal shore or region, as the application may require.

Another object of the present invention is to provide a new and improved breakwater construction block having a short central trapezoidal core portion of substantially trapezoidal cross-sectional dimensions, a set of four trapezoidal support legs, each extending from one corner of the central trapezoidal core portion in a radially-extending manner, a substantially flat top portion extending axially from the central trapezoidal core portion and on level with the top surface of the trapezoidal leg portions for allowing water to flow freely over the central trapezoidal core portion of the breakwater construction block.

Another object of the present invention is to provide a new and improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, a tower-type portion (e.g. at least ⅓ of the central trapezoidal core portion) extending axially from the central trapezoidal core portion and beyond the trapezoidal leg portions, for slowing down the flow of water over the central trapezoidal core portion of the breakwater construction block, and an axially-disposed borehole extending along the central axis of the central trapezoidal core portion, providing additional porosity to the block and thus increasing its stability in the ocean, as well as for receiving an anchor pile supporting a solar energy collection system.

Another object of the present invention is to provide a new and improved breakwater construction block a central trapezoidal core portion of substantially trapezoidal cross-sectional dimensions, a set of four trapezoidal support legs, each extending from one corner of the central trapezoidal core portion in a radially-extending manner, a tall (e.g. at least ⅓ of the central trapezoidal core portion) top portion extending axially from the central trapezoidal core portion and beyond the trapezoidal leg portions for slowing down the flow of water over the central trapezoidal core portion of the breakwater construction block, and a water flowhole transversely extending along the central axis of the central trapezoidal core portion, for allowing water to flow therethrough and slow down in velocity and allowing suspended sand to settle within the breakwater construction and prevent erosion of streams, rivers and coastal regions.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, a medium-height top portion (e.g. at least ¼ of the central trapezoidal core portion) extending axially from the central trapezoidal core portion and beyond the trapezoidal leg portions, for slowing down the flow of water over the central trapezoidal core portion of the breakwater construction block and allowing suspended sand to settle within the breakwater construction, but remain permeable which allows the passage of water and sand to pass through the structure.

Another object of the present invention is to provide a new and improved breakwater construction block having a central trapezoidal core portion of substantially trapezoidal cross-sectional dimensions, a set of four trapezoidal support legs, each extending from one corner of the central trapezoidal core portion in a radially-extending manner, a tower-type portion (e.g. at least ½ of the central trapezoidal core portion) extending axially from the central trapezoidal core portion and beyond the trapezoidal leg portions, for slowing down the flow of water over the central trapezoidal core portion of the breakwater construction block and allowing suspended sand to settle within the breakwater construction.

Another object of the present invention is to provide a new and improved breakwater construction block system configured in a first arrangement for protection against erosion along beaches, streambeds and riverbeds, and constructed using one or many possible closely-nested arrangements of the breakwater construction blocks, wherein each breakwater construction block has a short tower portion for slowing down the flow of water passing thereacross and allowing suspended sand to settle within the breakwater construction.

Another object of the present invention is to provide a new and improved breakwater construction block system configured in a first arrangement for protection against erosion along beaches, streambeds and riverbeds, and constructed using a closely-nested arrangement of the breakwater construction blocks interconnected using interlocking shear key blocks, wherein each breakwater construction block has a short tower portion for slowing down the flow of water passing thereacross, and wherein the X and Y cross-sectional dimensions of the interlocking shear key block are substantially equal.

Another object of the present invention is to provide a new and improved breakwater construction block system configured in a first arrangement for protection against erosion along beaches, streambeds and riverbeds, and constructed using a closely-nested arrangement of the breakwater construction blocks interconnected using interlocking shear key blocks, wherein each breakwater construction block has a short tower portion for slowing down the flow of water passing thereacross, and wherein the X and Y cross-sectional dimensions of the interlocking shear key block are substantially un-equal.

Another object of the present invention is to provide an interlocking shear key block for use in connection with the breakwater construction blocks of the present invention.

Another object of the present invention is to provide an interlocking shear key block for use in connection with the breakwater construction blocks of the present invention, wherein the X and Y cross-sectional dimensions of the interlocking shear key block are substantially equal.

Another object of the present invention is to provide an interlocking shear key block for use in connection with the breakwater construction blocks of the present invention, wherein the X and Y cross-sectional dimensions of the interlocking shear key block are substantially un-equal.

Another object of the present invention is to provide a new and improved arrangement of breakwater construction blocks assembled together along a single tier, in a side by side relationship, and interconnected by an interlocking shear key inserted between each pair of adjacent breakwater construction blocks, so as to create an semi-permeable barrier to water and soil flow.

Another object of the present invention is to provide a new and improved earth-surface erosion-protection barrier system employing a first arrangement of breakwater construction blocks, connected together by interlocking shear key blocks.

Another object of the present invention is to provide a new and improved breakwater construction block system for protection against erosion along beaches, streambeds and riverbeds, and constructed using a closely nested arrangement of the breakwater construction blocks, wherein an interlocking shear key block is disposed between the sidewall surfaces of adjacent break water construction blocks, so that the longer dimension of adjacent interlocking shear key blocks are aligned in orthogonal cross-sectional directions within the breakwater construction block system, and wherein each breakwater construction block has a short tower portion for slowing down the flow of water passing thereacross, and allowing suspended sand to settle within the breakwater construction, but remain permeable to allow the passage of water and sand to pass through the structure.

Another object of the present invention is to provide a new and improved breakwater construction block system for protection against erosion along beaches, streambeds and riverbeds, and constructed using a closely-nested arrangement of the breakwater construction blocks, wherein an interlocking shear key block is disposed between the sidewall surfaces of a first set of opposing break water construction blocks and also between the leg portions of a second set of opposing breakwater construction blocks, so that the longer dimension of each interlocking shear key block extends between the side wall surface of the first set of opposing breakwater construction blocks, whereas the shorter dimension of each interlocking shear key block extends between the leg portions of the second set of opposing breakwater construction blocks, and wherein each breakwater construction block has a short tower portion for slowing down the flow of water passing thereacross and allowing suspended sand to settle within the breakwater construction.

Another object of the present invention is to provide a new and improved riverbed erosion-prevention system installed at the bottom of a riverbed, constructed as an arrangement of breakwater construction blocks connected together by interlocking shear key blocks.

Another object of the present invention is to provide a new and improved streambed erosion-prevention system installed at the bottom of a streambed, constructed as an arrangement of breakwater construction blocks connected together by interlocking shear key blocks.

Another object of the present invention is to provide an ocean-groin type beach erosion-prevention barrier system employing an arrangement of at least four tiered rows of interconnected breakwater construction blocks assembled symmetrically about of linear mound of sand on a beach shore, wherein each row of breakwater construction blocks is constructed by a series of breakwater construction blocks connected together by interlocking shear key blocks having a height less than the central trapezoidal core portion of the breakwater construction blocks, so as to facilitate the reduction of water speed across the breakwater construction blocks and allow sand to collect and settle around the ocean-groin structure and prevent beach erosion.

Another object of the present invention is to provide a multi-tier seawall erosion-protection system constructed along a section of coastal shoreline, using breakwater construction blocks interconnected by interlocking shear key blocks.

Another object of the present invention is to provide a multi-tier seawall erosion-protection system constructed along a section of coastal shoreline, comprising (i) a seawall subsystem constructed from a continuous row of breakwater construction blocks arranged leg portion to leg portion and connected together by interlocking shear key blocks having a height substantially equal to the height of the breakwater construction block (e.g. 5' or so), and (ii) a scour-protection subsystem disposed in front of the seawall subsystem, and constructed from at least first and second continuous rows of 2-ton breakwater construction blocks interconnected by cables or rods passing through the central core portions of the breakwater construction blocks, to protect against erosion (i.e. scouring) of shoreline, along which the seawall subsystem is installed.

Another object of the present invention is to provide a single-tier seawall erosion-protection system constructed along a section of coastal shoreline, comprising a seawall subsystem constructed from a continuous row of breakwater construction blocks arranged leg portion to leg portion and connected together by interlocking shear key blocks having a height substantially equal to the height of the breakwater construction block (e.g. 5' or so).

Another object of the present invention is to provide a single-tier seawall erosion-protection system of the present invention, shown constructed along a section of coastal shoreline, using breakwater construction blocks, and interlocking shear key blocks.

Another object of the present invention is to provide a single-tier seawall erosion-protection system constructed along a section of coastal shoreline, comprising a seawall subsystem constructed from a continuous row of breakwater construction blocks of the type arranged leg portion to leg portion and connected together by interlocking shear key blocks of the type having a height substantially equal to the height of the breakwater construction block (e.g. 5' or so), behind which is a rock shelf that interlocks and wedges with the breakwater construction blocks and becomes an integral part of the overall structure, for increased stability.

Another object of the present invention is to provide a multi-tiered seawall erosion-protection system, constructed along a section of coastal shoreline using low-profile flat top breakwater construction blocks having truncated leg portions and bottom surface trimmed to slope of coastal edge surface, tower-type breakwater construction blocks, and interlocking shear key blocks having a height substantially equal to the central trapezoidal core portion of the low-profile flat top breakwater construction blocks.

Another object of the present invention is to provide a multi-tiered seawall erosion-protection system comprising (i) a seawall subsystem installed at the top elevation of a coastal incline upon a bed of crushed rock and/or stone and constructed from a continuous row of breakwater construction arranged leg portion to leg portion and connected together by interlocking shear key blocks having a height substantially equal to the height of the breakwater construction block (e.g. 5' or so), and (ii) a scour-protection subsystem installed on the inclined surface of the coastal region, disposed in front of the seawall subsystem, and constructed from (a) multiple continuous rows of 2-ton low-front-file flat-top breakwater construction blocks with truncated leg portions tailored to the incline surface, and interconnected by interlocking shear key blocks, and (b) a continuous row of 2-ton flat top breakwater construction blocks, interconnected by interlocking shear key blocks, the purpose of which is to protect against erosion (i.e. scouring) of shoreline, along which the multi-tiered seawall subsystem is installed.

Another object of the present invention is to provide a multi-tiered seawall erosion-protection system installed upon a bed or crushed rock or stone on the inclined surface of the coastal region, disposed in front of the seawall subsystem, and constructed from multiple continuous rows of 2-ton flat-top breakwater construction blocks with truncated leg portions tailored to the incline surface, and interconnected by interlocking shear key blocks, the purpose of which is to protect against erosion (i.e. scouring) of shoreline, along which the multi-tiered seawall subsystem is installed.

Another object of the present invention is to provide a multi-tiered seawall erosion-protection system comprising (i) a seawall subsystem installed at the top elevation of a coastal incline upon a bed of crushed rock and/or stone and constructed from a continuous row of breakwater construction blocks of the type arranged leg portion to leg portion and connected together by interlocking shear key blocks having a height substantially equal to the height of the breakwater construction block (e.g. 5' or so), and (ii) a scour-protection subsystem installed upon a bed or crushed rock or stone on the inclined surface of the coastal region, disposed in front of the seawall subsystem, and constructed from multiple continuous rows of 2-ton flat-top breakwater construction blocks with truncated leg portions tailored to the incline surface, and interconnected by interlocking shear key blocks, the purpose of which is to protect against erosion (i.e. scouring) of shoreline, along which the multi-tiered seawall subsystem is installed.

Another object of the present invention is to provide a multi-tiered seawall erosion-protection system of the present invention, constructed along a section of coastal shoreline using tower-type breakwater construction blocks having truncated leg portions and bottom surface trimmed to slope of coastal edge surface, and interlocking shear key blocks having a height substantially equal to the central trapezoidal core portion of the tower-type breakwater construction blocks.

Another object of the present invention is to provide a multi-tiered seawall erosion-protection system, installed upon a bed of crushed rock or stone on the inclined surface of a coastal region, and constructed from multiple continuous rows of 2-ton tower-type (5' high) breakwater construction blocks of the type with truncated leg portions tailored to the incline surface, and interconnected by interlocking shear key blocks, having a height substantially equal to the height of the breakwater construction block (e.g. 5' or so), the purpose of which is to dissipate wave energy, entrap sand suspended in ocean waters, and protect against the erosion (i.e. scouring) of shoreline, along which the multi-tiered seawall subsystem is installed.

Another object of the present invention is to provide a waterway dam system installed along a river or stream, and constructed from a discontinuous row of tower-type breakwater construction blocks that are interconnected by interlocking shear key blocks, each having a height substantially equal to the central trapezoidal core portion of its neighboring tower-type breakwater construction block, and wherein the discontinuity in the waterway dam system allows for the control of water flow, along the river or stream.

Another object of the present invention is to provide a waterway dam system installed along a river or stream, and constructed from a discontinuous row of tower-type breakwater construction blocks, having truncated leg portions to facilitate installation at an angle inclined into the body of water being dammed up by the waterway dam system, and being interconnected by interlocking shear key blocks, each having a height substantially equal to the central trapezoidal core portion of its neighboring tower-type breakwater construction blocks, wherein the discontinuity (e.g. break) in the waterway dam system allows for the control of water flow along the river or stream determined by the spatial extent of the discontinuity in the waterway dam system.

Another object of the present invention is to provide such a waterway dam system, wherein tall tower-type breakwater construction blocks are used to form the dam structure, and a specified zone in the dam has a reduced height to permit the release of water to control flooding on the river, stream or waterway.

Another object of the present invention is to provide an impermeable wall system installed along both sides of a river, stream or waterway, and constructed from a continuous row low-profile breakwater construction blocks, installed upon a bed of crushed stone or rock, beneath which is a layer of HS® filter fabric, and wherein the breakwater construction blocks are interconnected by interlocking shear key blocks, and each have a height substantially equal to the central trapezoidal core portion of its neighboring flat top breakwater construction blocks, creating a water impermeable wall structure for controlling and restraining flow of water when the water level increases on the river or stream during storm surges and the like.

Another object of the present invention is to provide a scour-protection system installed before a seawall or bulkhead along a river, stream or waterway, and constructed from a multiple continuous rows low-profile breakwater construction blocks interconnected by interlocking shear key blocks, wherein each breakwater construction block has a height substantially equal to the central trapezoidal core portion of its neighboring flat top breakwater construction block, and creating a scour-protection structure for preventing the scouring of the riverbed or oceanfront bed before the seawall or bulkhead.

Another object of the present invention is to provide a new and improved scour-protection system installed about the piers supporting a roadway bridge system across a river or waterway, and constructed from a multiple continuous rows low-profile breakwater construction blocks interconnected by interlocking shear key blocks, wherein each breakwater construction block has a height substantially equal to the central trapezoidal core portion of its neighboring flat top breakwater construction block, and creating a scour-protection structure for preventing the scouring of the riverbed or oceanfront bed before the seawall or bulkhead.

Another object of the present invention is to provide a new and improved groin-type impermeable water control system installed along both sides of a river, stream or waterway, and constructed from one or more continuous rows of low-profile breakwater construction blocks interconnected by interlocking shear key blocks, and each having a height substantially equal to the central trapezoidal core portion of its neighboring flat top breakwater construction blocks, and creating a water impermeable groin-type structure for controlling and restraining flow of water when the water level increases on a river or stream during storm surges and the like.

Another object of the present invention is to provide an improved breakwater construction block for use in broad fields of use including, but not limited to, coastal engineering: river, stream and torrent control, bulkhead designed projects, scour control, check dams, permeable and impermeable groins-both river and ocean structures and other hydraulic works including marinas.

Another object of the present invention is to provide a transportable breakwater construction block factory, contained within an ISO-shipping container, stored at a warehouse, for dispatch and shipment (e.g. via rail, air, roadway or sea) to a remote work site location, near an oceanfront or waterfront, for in situ manufacturing of breakwater construction blocks and interlocking shear pin key blocks of the present invention.

Another object of the present invention is to provide a transportable breakwater construction block manufacturing system of the present invention, comprising a plurality of multi-form block molding subsystems, having base mold portions mechanically coupled to the factory floor, and side molding portions being mechanically coupled, so that all or multiple groups of side mold portions (for the construction blocks and the matching shear key blocks) can be simultaneously lifted (e.g. by a hydraulic crane on site) to remove the side mold portions from the casted concrete blocks.

Another object of the present invention is to provide a transportable breakwater construction block manufacturing system of the present invention for use with hydraulically-powered cranes, concrete mixers and other equipment arranged about a breakwater construction block factory platform temporarily set up at a construction work site where the breakwater construction blocks and interlocking shear key blocks of the present invention are to be efficiently manufactured using multi-form block molding technology, and when cured, these blocks can be assembled to construct any system design under construction with an unprecedented level of efficiency, flexibility and economy.

Another object of the present invention is to provide a method of constructing erosion-protection systems using preassembled subsystems, banding techniques and interlocking shear key blocks.

Another object of the present invention is to provide a such a method of construction, wherein breakwater construction block subsystems are pre-assembled, interlocked and banded together on land and then transported to the designated construction site location for installation, using a crane system or the like, and this method is repeated to build resultant systems, above land, along the coast line, as well as underwater with greater efficiency and safety.

These and other objects of the present invention will become apparent hereinafter and in the Claims to Invention.

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, wherein:

FIG. 7A is a top perspective view of a first illustrative embodiment of the improved breakwater construction block of the present invention, having a central trapezoidal core portion of substantially trapezoidal cross-sectional dimensions, a set of four trapezoidal support legs, each extending from one corner of the central trapezoidal core portion in a radially-extending manner, and a tower-type portion (e.g. at least ½ the height of central trapezoidal core portion) extending axially along the central axis of the central trapezoidal core portion, for the purpose of breaking up and slowing down the flow of water passing over the central trapezoidal core portion of the breakwater construction block and allowing suspended sand to settle within the breakwater construction;

FIG. 7B is a bottom perspective view of the first illustrative embodiment of the improved breakwater construction block shown in FIG. 7A;

FIG. 7C is a top plan view of the first illustrative embodiment of the improved breakwater construction block shown in FIGS. 7A and 7B;

FIG. 7D is a cross-sectional view of the first illustrative embodiment of the improved breakwater construction block shown in FIGS. 7A, 7B and 7C, taken along its axial center;

FIG. 7E is a bottom view of the breakwater construction block shown in FIGS. 7A through 7D;

FIG. 8A is a schematic representation illustrating a transportable breakwater construction block factory, contained within an ISO-shipping container, stored at a warehouse, being dispatched and shipped (e.g. via rail, air, roadway or sea) to a remote work site location, near an oceanfront, for in situ manufacturing of breakwater construction blocks and interlocking shear pin key blocks of the present invention;

FIG. 8B is a perspective view of a tractor trailer truck transporting a transportable breakwater construction block factory of the present invention, contained within an ISO-shipping container, to a remote work site;

FIG. 8F is a schematic diagram showing a hydraulic crane, and a concrete mixer arranged about the breakwater construction block factory mounted at the construction work site where the breakwater construction blocks and interlocking shear key blocks of the present invention are efficiently manufactured using multi-form block molding technology, and when cured, these blocks can be assembled to construct the any system design under construction with an unprecedented level of efficiency, flexibility and economy;

FIG. 9A1 is a perspective view of the breakwater construction molding system of the present invention, configured together and ready for concrete to be poured into the mold, through the top pour opening, to form a tower-type breakwater construction block of the present invention as shown as No. 1 in FIG. 6A;

FIG. 9A2 is a side view of the breakwater construction block molding system configured as shown in FIG. 9A1;

FIG. 9A3 is a plan view of the breakwater construction block molding system configured as shown in FIGS. 9A1 and 9A2;

FIG. 9B1 is a perspective view of a molded concrete breakwater construction block identified by No. 1 (tower-type design) in FIG. 6A, still encased in its breakwater construction block molding system, with its top mold portion being removed;

FIG. 9B2 is a side perspective view of the side mold portion being removed off from the breakwater construction block formed using the breakwater molding system configured as shown in FIG. 9B1;

FIG. 9B3 is a perspective view of the breakwater construction block being lifted off the bottom mold portion of the breakwater molding system configured as shown in FIGS. 9B1 and 9B2;

FIG. 9C1 is a perspective view of a molded flat-top concrete breakwater construction block identified by No. 11 (flat top design) in FIG. 6A, still encased in its breakwater construction block molding system;

FIG. 9C2 is a side perspective view of the side mold portion being removed off from the breakwater construction block formed using the breakwater molding system configured as shown in FIG. 9C1;

FIG. 9C3 is a perspective view of the breakwater construction block being lifted off the bottom mold portion of the breakwater molding system configured as shown in FIGS. 9C1 and 9C2;

FIG. 9D1 is a perspective view of the breakwater construction block molding system configured for forming a concrete breakwater construction block identified by No. 2 (tower-type with side flow port design) in FIG. 6A, before concrete is poured into the concrete flow port of the upper portion of the molding system;

FIG. 9D2 is a side view of the breakwater construction block molding system configured as shown in FIG. 9D1;

FIG. 9D3 is a bottom view of the breakwater construction block molding system configured as shown in FIGS. 9D1 and 9D2;

FIG. 9D4 is a perspective view of a molded concrete breakwater construction block identified by No. 2 (tower-type with side flow port design) in FIG. 6A, still encased in its breakwater construction block molding system, with its top mold portion being removed;

FIG. 9D5 is a side perspective view of the side molding portion being is removed off from the breakwater construction block formed using the breakwater construction block molding system configured as shown in FIGS. 9D1 through 9D3, and the tapered mold segments from each side mold half section forming a side flow port formed in the breakwater construction block;

FIG. 9D6 is a perspective view of the breakwater construction block being lifted off the bottom mold portion of the breakwater construction block molding system configured as shown in FIGS. 9D4 and 9C5;

FIG. 9D7 is a perspective view of the breakwater construction block shown lifted off the bottom mold portion of the breakwater construction block molding system, and from which the tapered mold segments are removed to show side flow ports fromed in the breakwater construction block;

FIG. 9D8 shows the tapered mold segments assembled together outside of the breakwater construction block, for molding the side flow ports formed in the breakwater construction block when configured as show in FIGS. 9D1-9D6;

FIG. 10A is a perspective disassembled view of the breakwater construction block molding system of the present invention configured to form a second illustrative embodiment of the breakwater construction block of the present invention, having a pair of its legs truncated using an leg truncation mold insert installed on the bottom mold portion of the system, as shown;

FIG. 10B1 is a upper perspective view of the second illustrative embodiment of the improved breakwater construction block formed using the system of FIG. 10A, and having a central trapezoidal core portion of substantially trapezoidal cross-sectional dimensions, a set of four trapezoidal support legs, each extending from one corner of the central trapezoidal core portion in a radially-extending manner, and a pair of the trapezoidal support legs being truncated at its bottom end, and a tower-type portion (e.g. at least ½ the height of the central trapezoidal core portion) extending axially from the central trapezoidal core portion for breaking up and slowing down the flow of water passing over the central trapezoidal core portion of the breakwater construction block and allowing suspended sand to settle within the breakwater construction;

FIG. 10B2 is a bottom perspective view of the first illustrative embodiment of the improved breakwater construction block shown in FIG. 10B1;

FIG. 10B3 is a top plan view of the first illustrative embodiment of the improved breakwater construction block shown in FIGS. 10B1 and 10B2;

FIG. 10B4 is a cross-sectional view of the first illustrative embodiment of the improved breakwater construction block shown in FIGS. 10B1, 10B2 and 10B3, taken along its axial center;

FIG. 14A is a top perspective view of a sixth illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, and a pair of the trapezoidal support legs being truncated at its bottom end, a substantially flat top portion extending axially from the central trapezoidal core portion for allowing water to flow over the central trapezoidal core portion of the breakwater construction block and allowing suspended sand to settle within the breakwater construction;

FIG. 14B is a bottom perspective view of the breakwater construction block shown in FIG. 12A;

FIG. 14C is a bottom plan view of the breakwater construction block shown in FIGS. 14A and 14B;

FIG. 14D is a top plan view of the breakwater construction block shown in FIGS. 14A, 14B and 14C;

FIG. 14E is an elevated side view of the breakwater construction block shown in FIGS. 14A through 14D;

FIG. 17A is a top perspective view of a ninth illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, a tower-type portion (at least ⅓ the height of the central trapezoidal core portion) extending axially from the central trapezoidal core portion for slowing down the flow of water over the central trapezoidal core portion of the breakwater construction block, and an axially-disposed borehole extending along the central axis of the central trapezoidal core portion, and is designed for clear passage of water energy providing permeability to the overall system;

FIG. 17B is a bottom perspective view of the breakwater construction block shown in FIG. 17A;

FIG. 17C is a bottom plan view of the breakwater construction block shown in FIGS. 17A and 17B;

FIG. 17D is a side cross-sectional view of the breakwater construction block shown in FIGS. 17A, 17B and 17C;

FIG. 17E is an elevated side view of the breakwater construction block shown in FIGS. 17A through 17D;

FIG. 18A is a top perspective view of a ten illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, a tower-type portion (at least ⅓ of the height of the central trapezoidal core portion) extending axially from the central trapezoidal core portion for slowing down the flow of water over the central trapezoidal core portion of the breakwater construction block, and a water flowhole transversely extending along the central axis of the central trapezoidal core portion, for allowing water to flow therethrough and slow down in velocity allowing suspended sand to settle within the breakwater construction and prevent erosion of streams, rivers and coastal regions;

FIG. 18B is a bottom perspective view of the breakwater construction block shown in FIG. 18A;

FIG. 18C is a side view of the breakwater construction block shown in FIGS. 18A and 18B;

FIG. 18D is a top view of the breakwater construction block shown in FIGS. 18A, 18B and 18C;

FIG. 18E is an elevated side view of the breakwater construction block shown in FIGS. 18A through 18C;

FIG. 19A is a top perspective view of an eleventh illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, a medium-height top portion (at least ¼ of the height of the central trapezoidal core portion) extending axially from the central trapezoidal core portion for slowing down the flow of water over the central trapezoidal core portion of the breakwater construction block and allowing suspended sand to settle within the breakwater construction;

FIG. 19B is a bottom perspective view of the breakwater construction block shown in FIG. 19A;

FIG. 19C is an elevated side view of the breakwater construction block shown in FIGS. 19A and 19B;

FIG. 19D is a top plan view of the breakwater construction block shown in FIGS. 19A, 19B and 18C;

FIG. 19E is an elevated cross-sectional side view of the breakwater construction block shown in FIGS. 19A through 19D;

FIG. 22D is an elevated side view of the breakwater construction block shown in FIG. 22A;

FIG. 22E is an elevated side view of breakwater construction block shown in FIG. 22D, where the inner mold portion is removed from the central trapezoidal core portion of the breakwater construction block;

FIG. 30C is an elevated side view of a third arrangement showing a pair of flat-top type breakwater construction blocks of the design show in FIGS. 12A through 12E, assembled together along a single tier, in a side by side relationship, with spacing between the trapezoidal leg portions as shown, and interconnected by an interlocking shear key of the design shown in FIG. 30A, inserted between each adjacent breakwater construction blocks, to create an erosion-protection barrier;

FIG. 31B is a plan view of the earth-surface erosion-protection barrier system of FIG. 31A;

FIG. 31C is an elevated side view of the earth-surface erosion-protection barrier system of FIGS. 31A and 31B;

Figure 1:
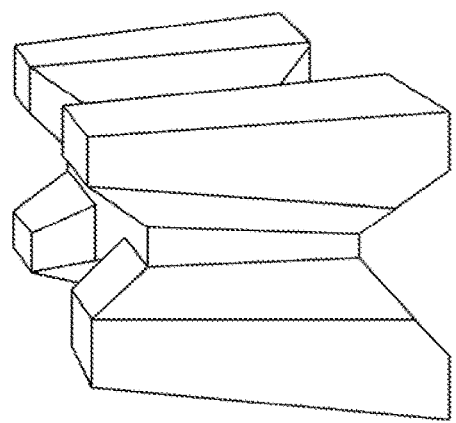
FIG. 1 is perspective view of the prior art breakwater construction block disclosed in Applicant's U.S. Pat. No. 4,594,023, having a trapezoidal central core, with four trapezoidal leg portions extending from the central core at the corners of a square imposed about the central core.
Figure 4:
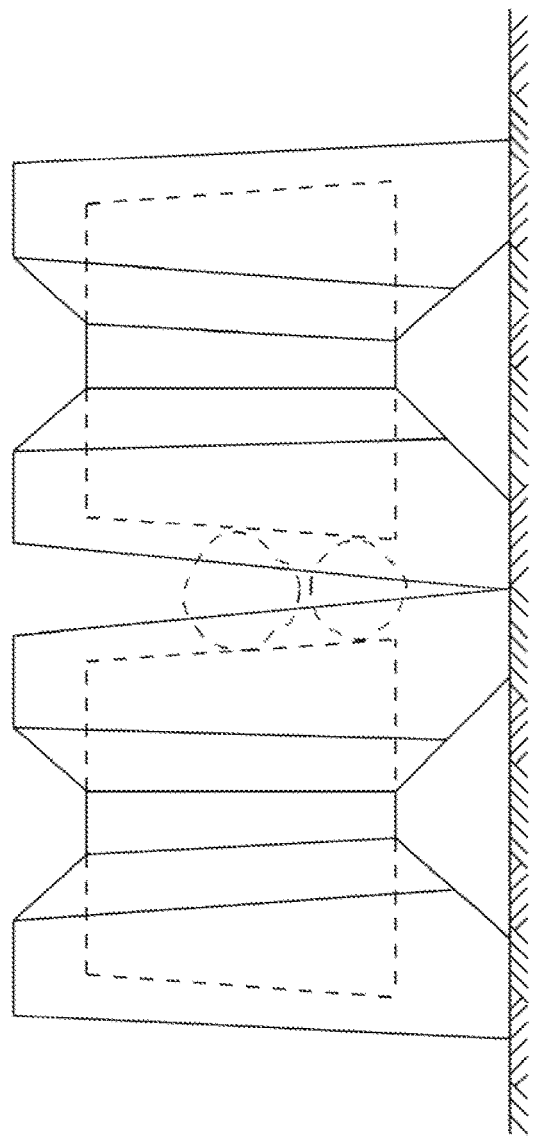
FIG. 4 is a side view of a pair of prior art breakwater construction blocks shown in FIGS. 1 through 3, wherein rock and other debris is captured between the adjacent pairs of legs of the breakwater construction blocks.
Figure 5:
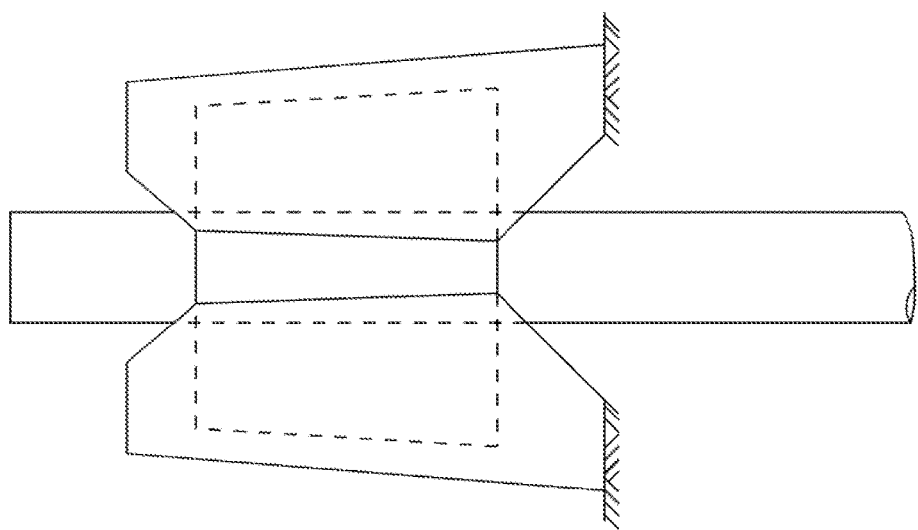
FIG. 5 is a side view of the prior art breakwater construction block shown in FIG. 1, with a cylindrical hole formed through the center of the block to permit a pile or rod to be driven through the construction block and into the surface of the earth to secure the block in placed.
Figure 8C:
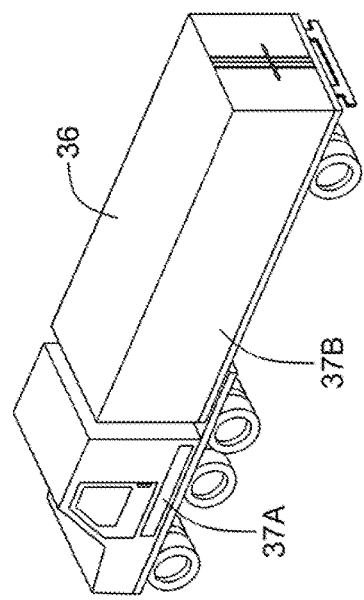
FIG. 8C is a perspective view of the tractor trailer truck of FIG. 8B, shown delivering the transportable breakwater construction block factory of the present invention, within an ISO-shipping container, to the remote work site.
Figure 8D:
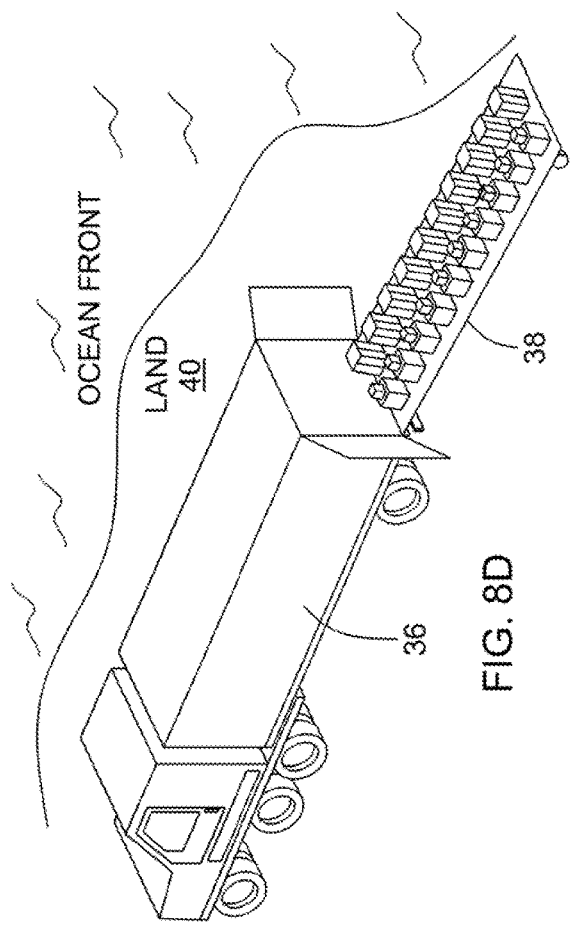
FIG. 8D is a perspective view of the transportable breakwater construction block manufacturing system being unloaded from its ISO-shipping container, onto the ground at the remote work site.
Figure 8E:
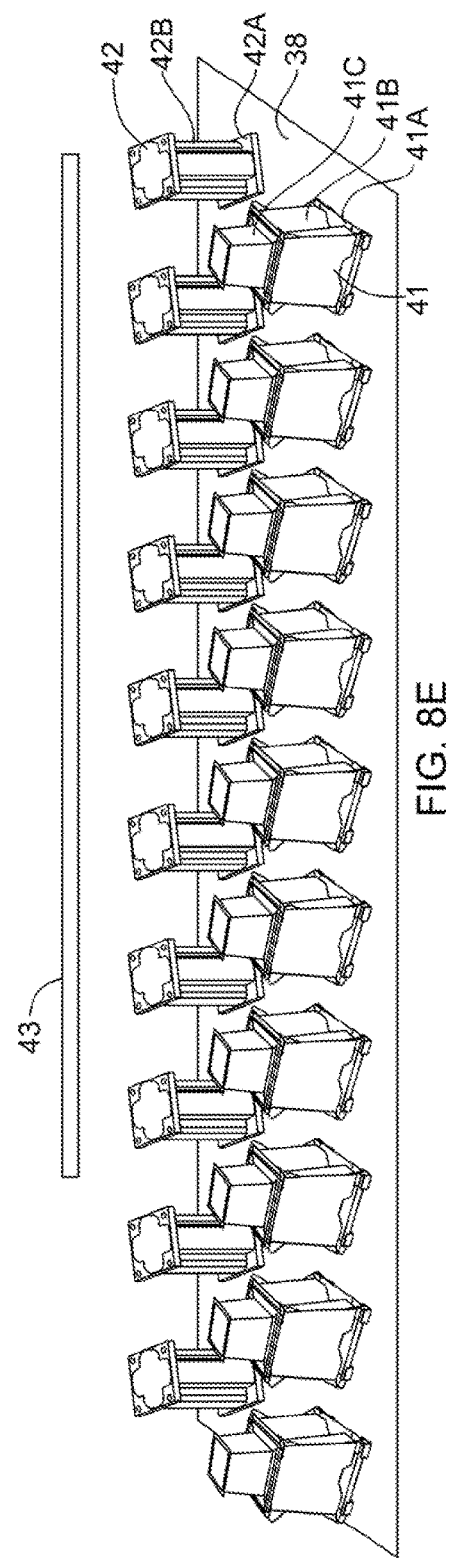
FIG. 8E is a perspective view of the transportable breakwater construction block manufacturing system of the present invention, comprising a plurality of multi-form block molding subsystems, having base mold portions mechanically coupled to the factory floor, and the side molding portions being mechanically coupled so that all or multiple groups of side mold portions (for the construction blocks and the matching key blocks) can be simultaneously lifted (e.g. by a hydraulic crane on site) to remove the side mold portions from the caste blocks.
Figure 28B:
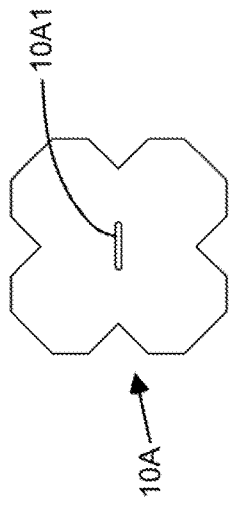
FIG. 28B is a plan view of the first illustrative embodiment of an interlocking shear key block shown in FIG. 28A.
Figure 28A:
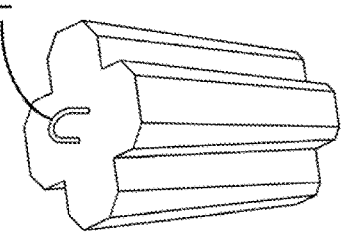
FIG. 28A is a perspective view of the first illustrative embodiment of an interlocking shear key block for use in connection with the breakwater construction blocks of the present invention, wherein the X and Y cross-sectional dimensions of the interlocking shear key block are substantially equal.
Figure 30A:
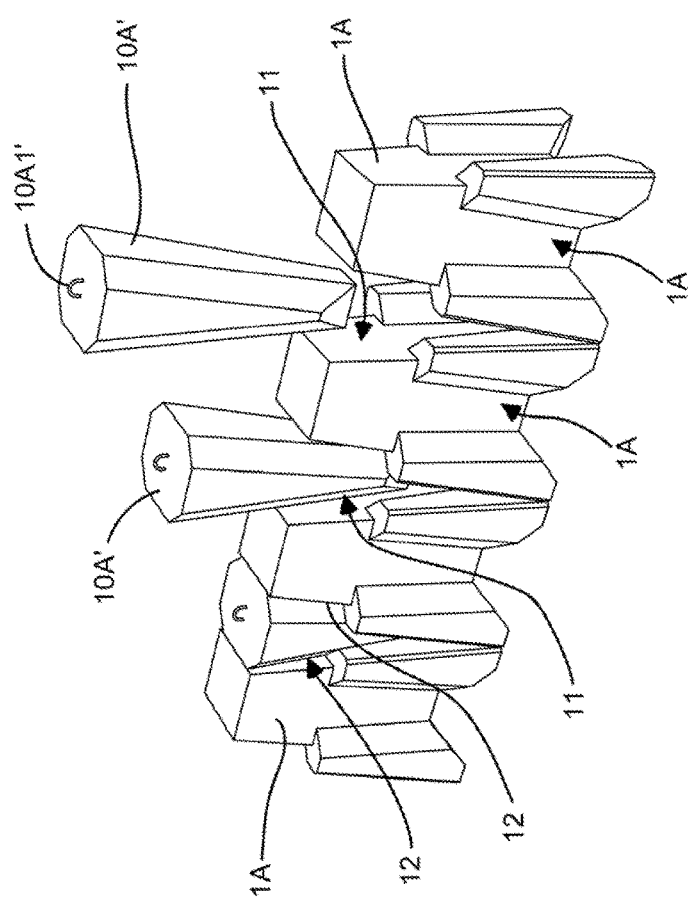
FIG. 30A is a perspective view of a first arrangement showing a series of tower-type breakwater construction blocks of the design show in FIGS. 7A through 7E, assembled together along a single tier, in a side by side relationship, and interconnected by an interlocking shear key block design slightly modified from the design shown in FIGS. 28A and 28B, and inserted between each adjacent breakwater construction blocks, to create an semi-permeable barrier to water and soil flow.
Figure 31A:
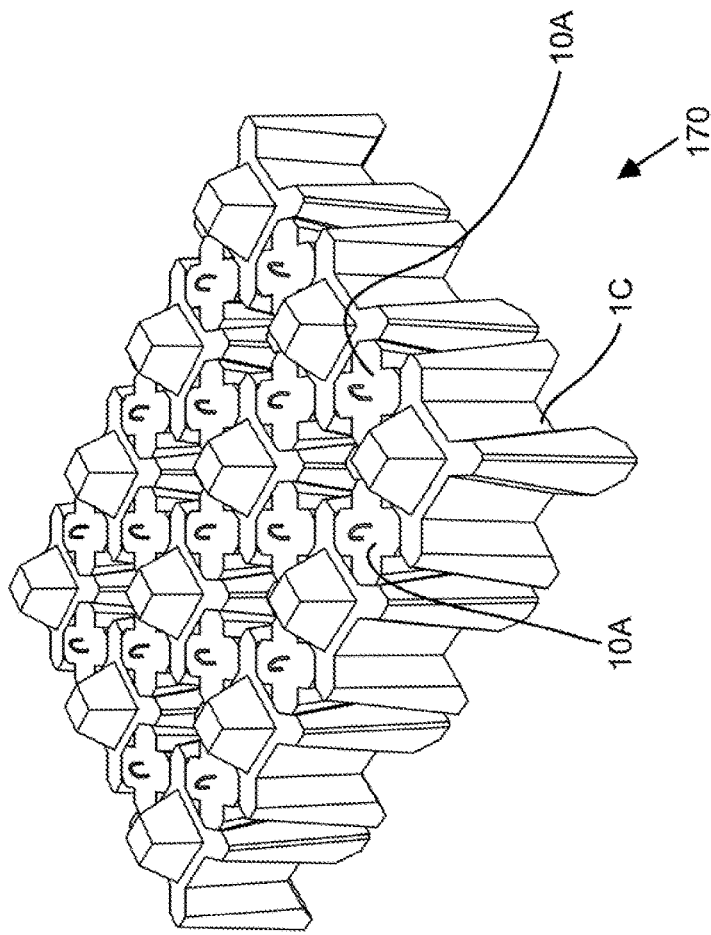
FIG. 31A is an earth-surface erosion-protection barrier system employing a first arrangement of breakwater construction blocks shown in FIGS. 11A through 11D, connected together by interlocking shear key blocks shown in FIGS. 28A and 28B.
Figure 32A:
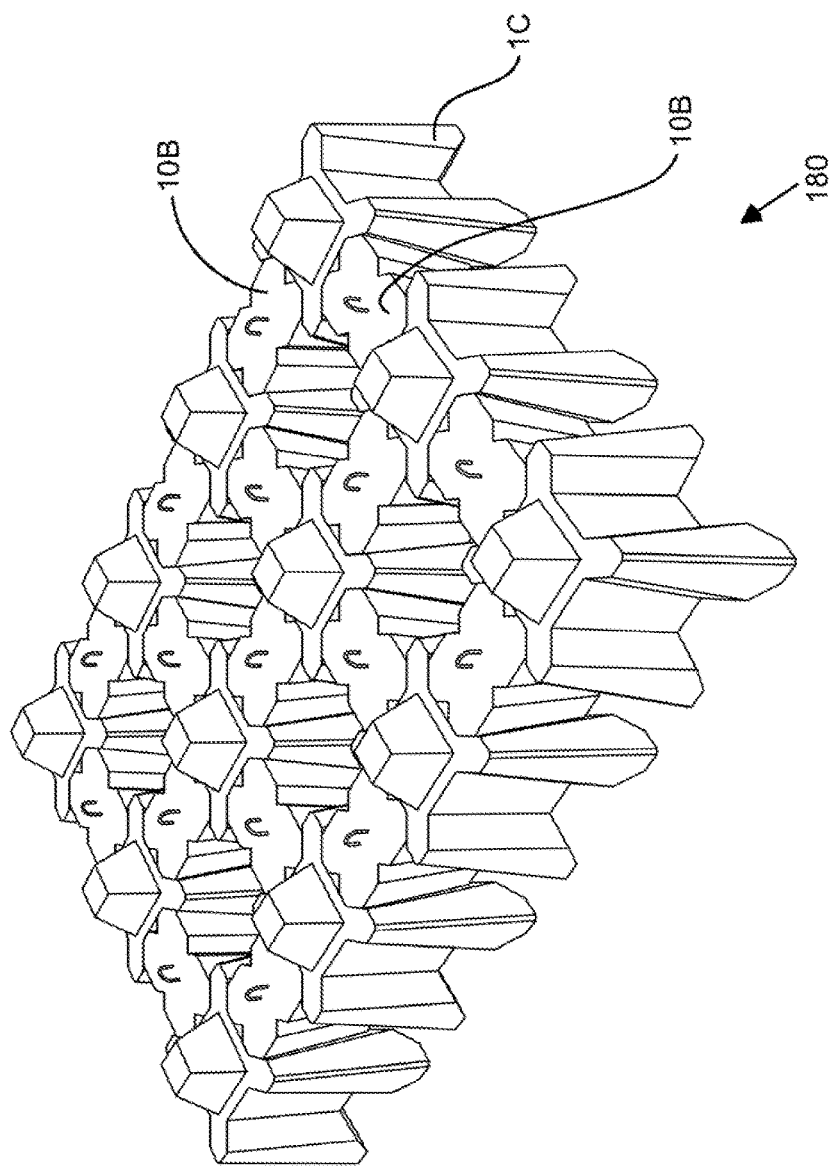
Figure 32B:
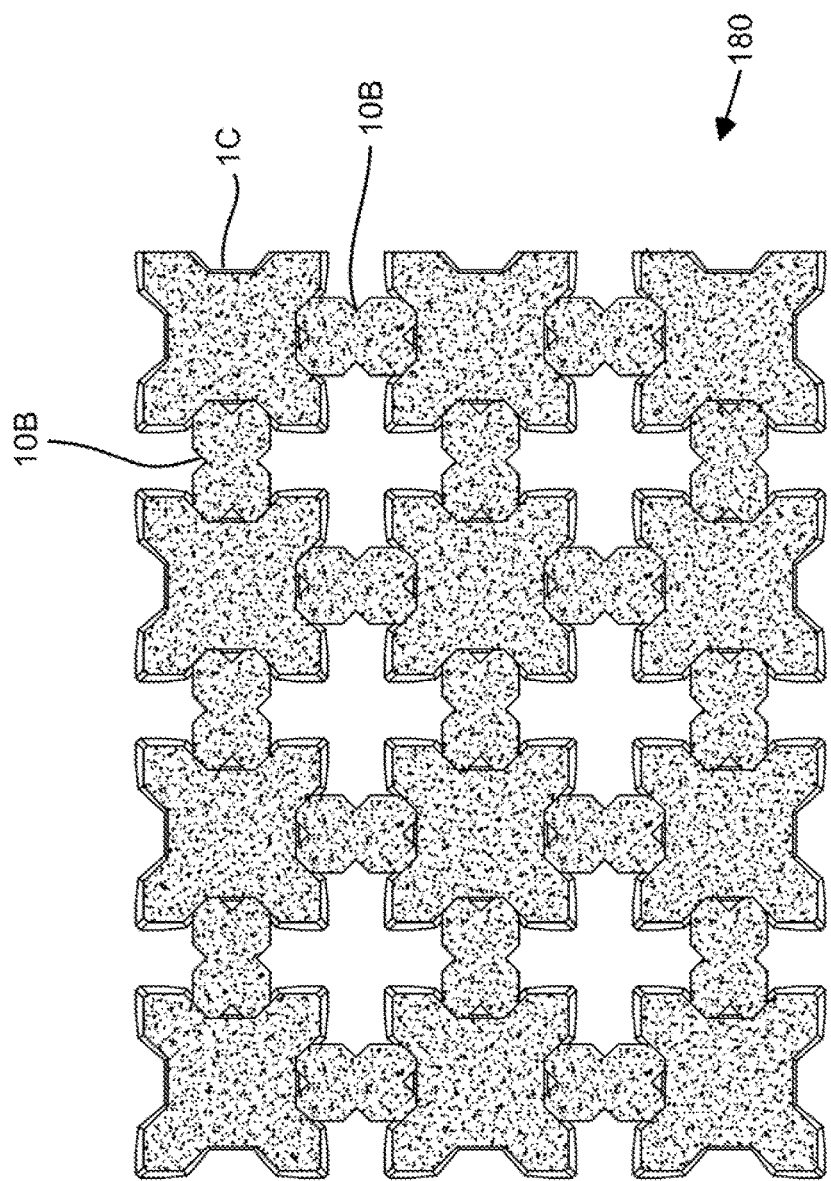
Figure 32C:
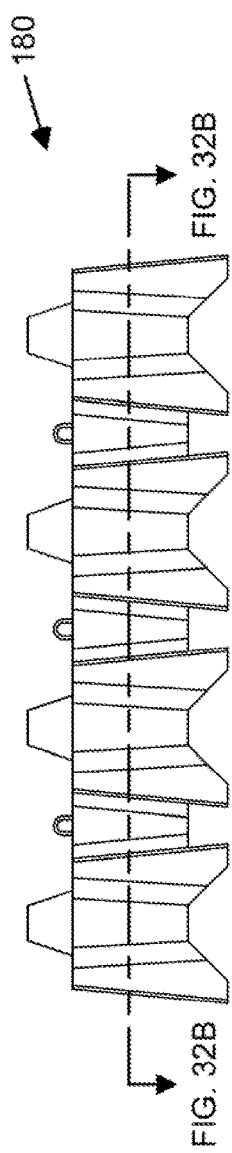
Figure 33A:
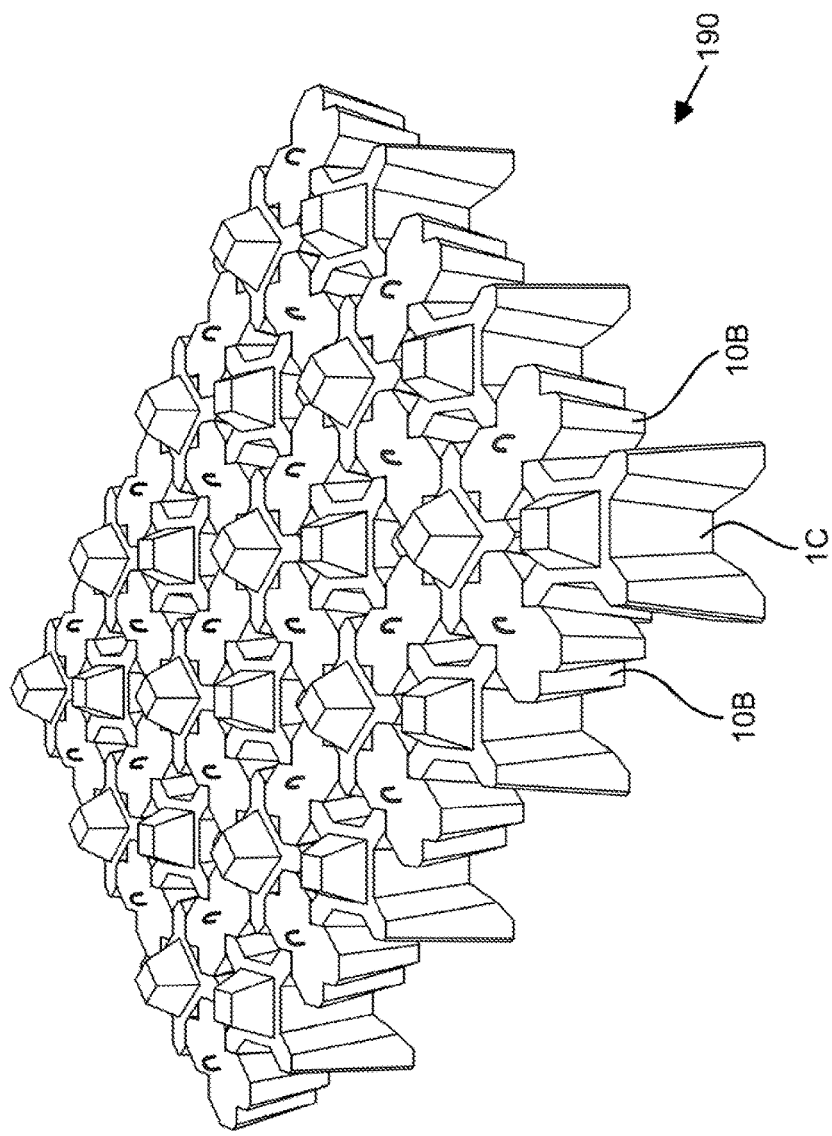
Figure 33B:
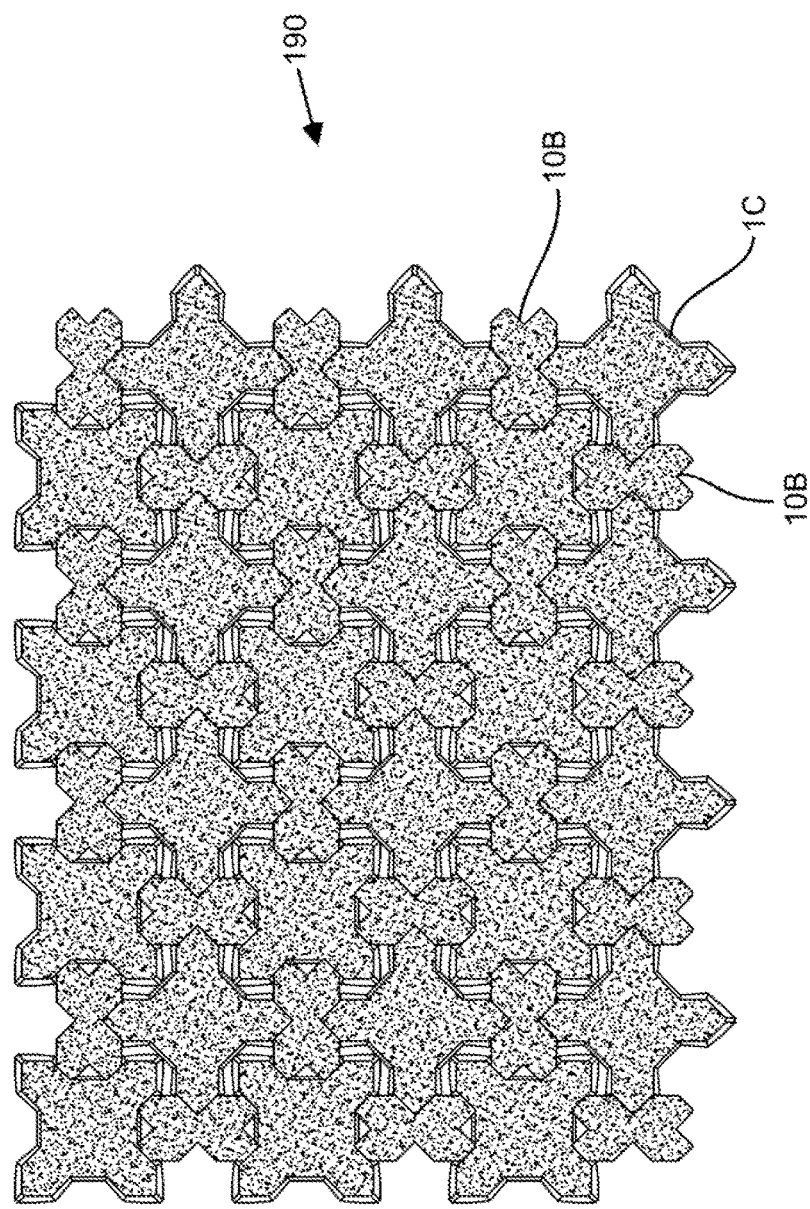
Figure 33C:
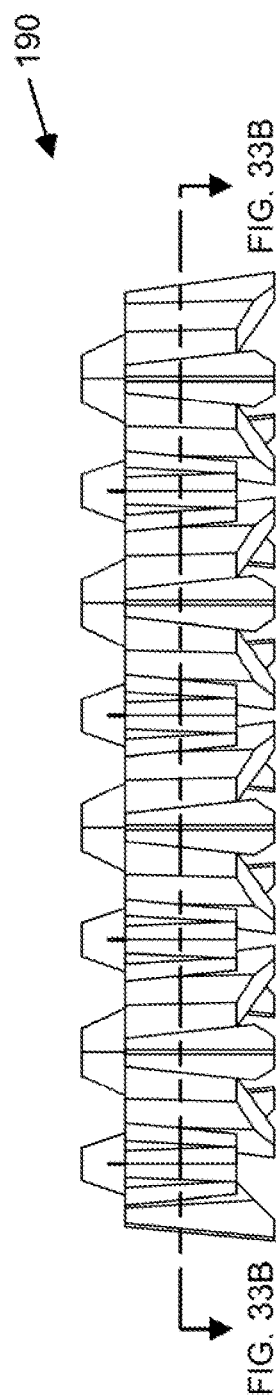
Figure 36A:
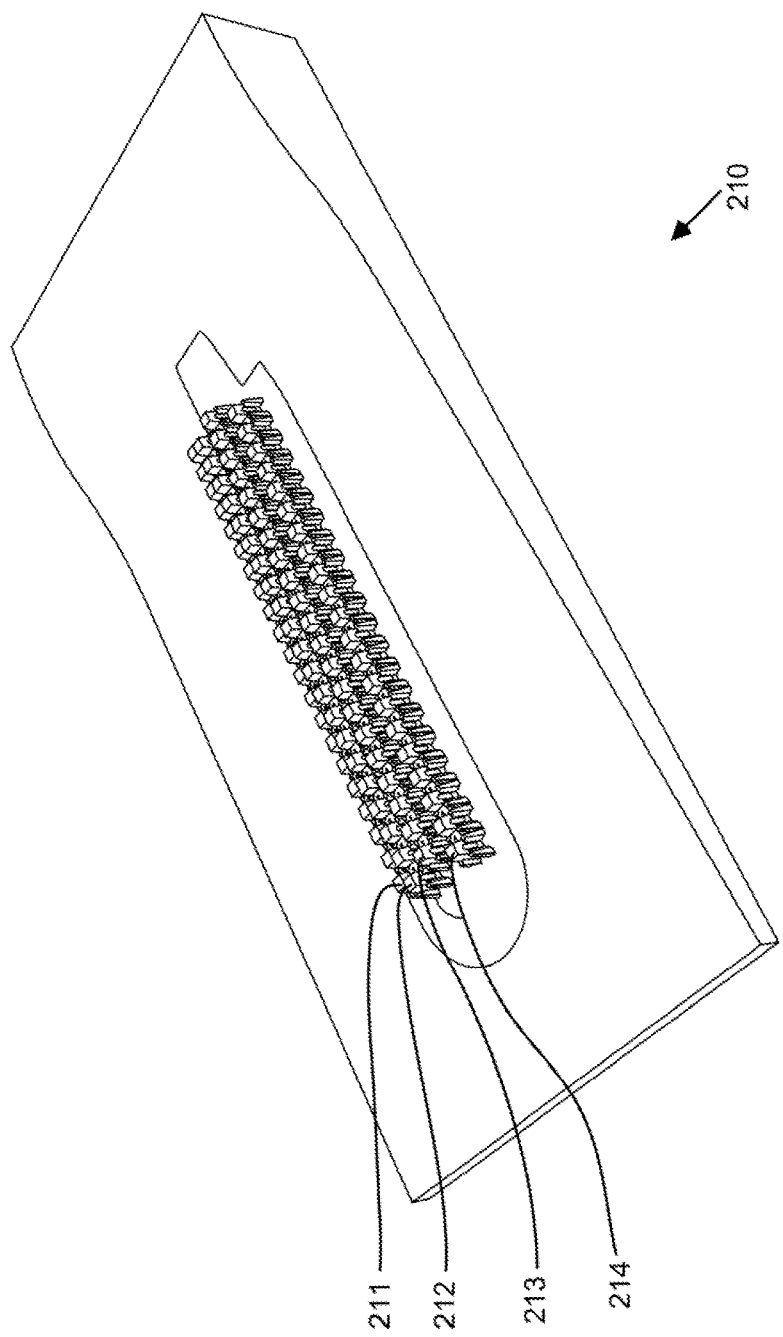
Figure 36B:
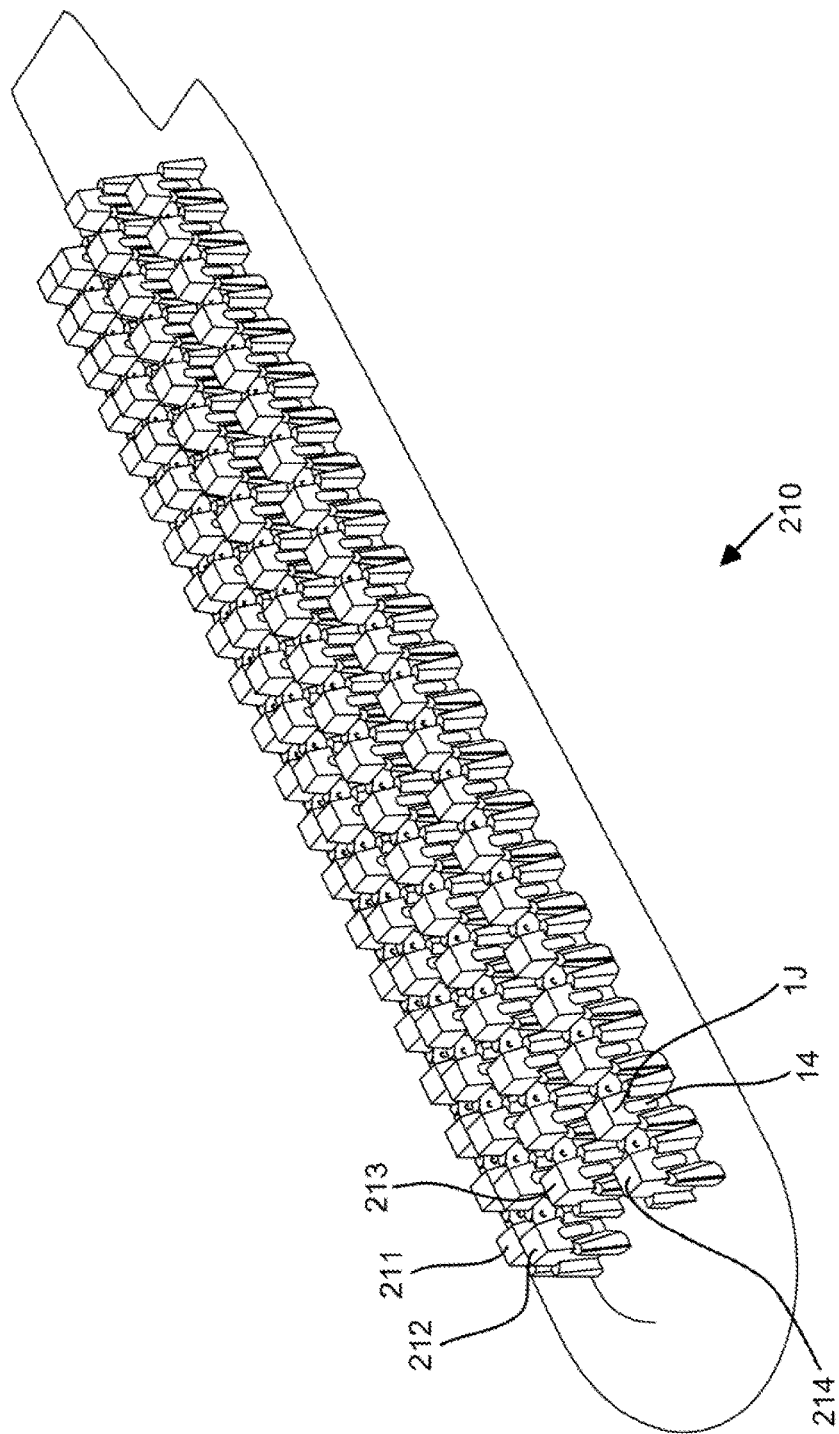
Figure 36C:
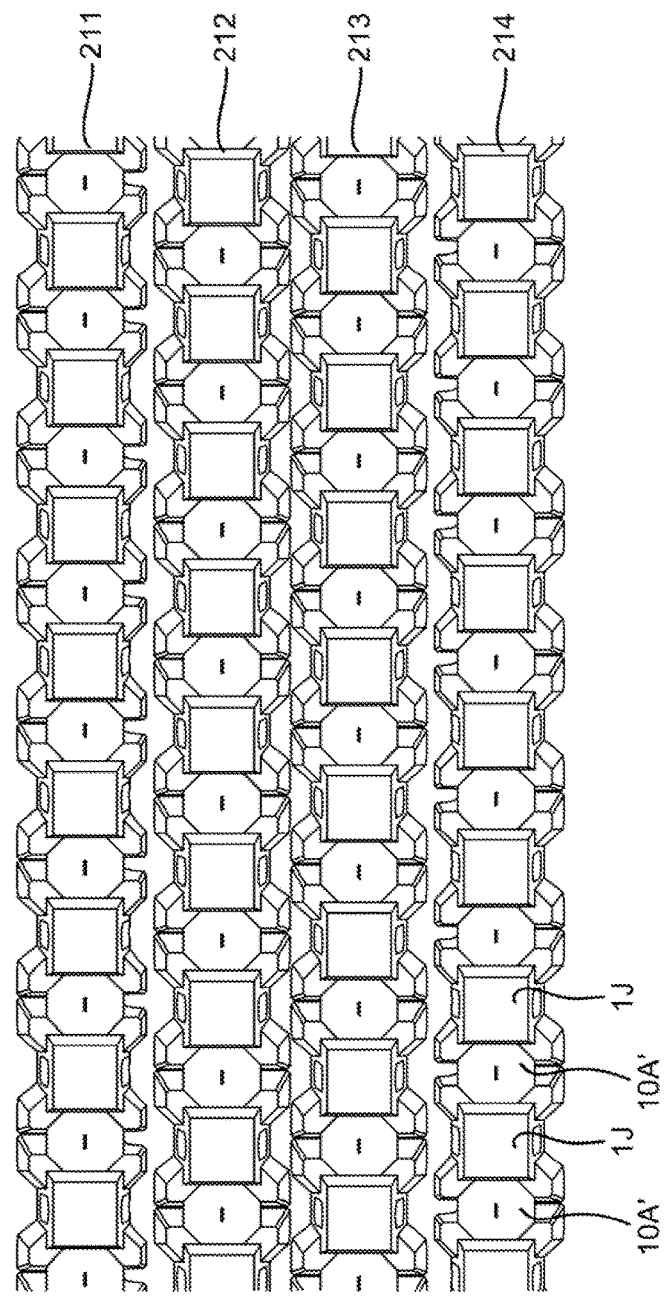
Figure 36D:
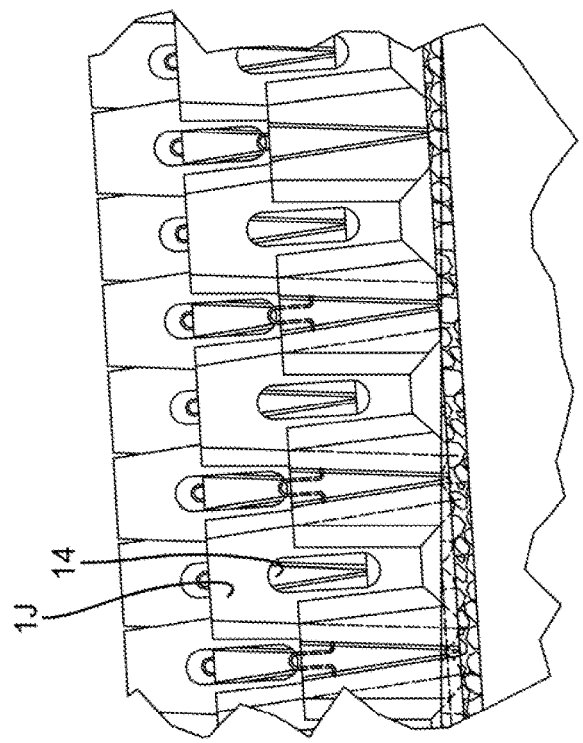
Figure 36E:
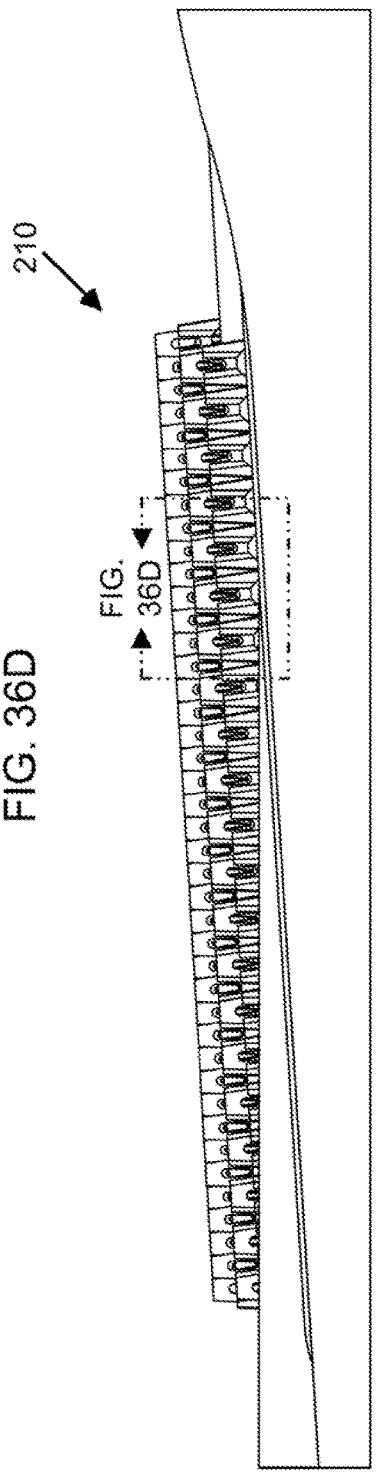
Figure 36F:
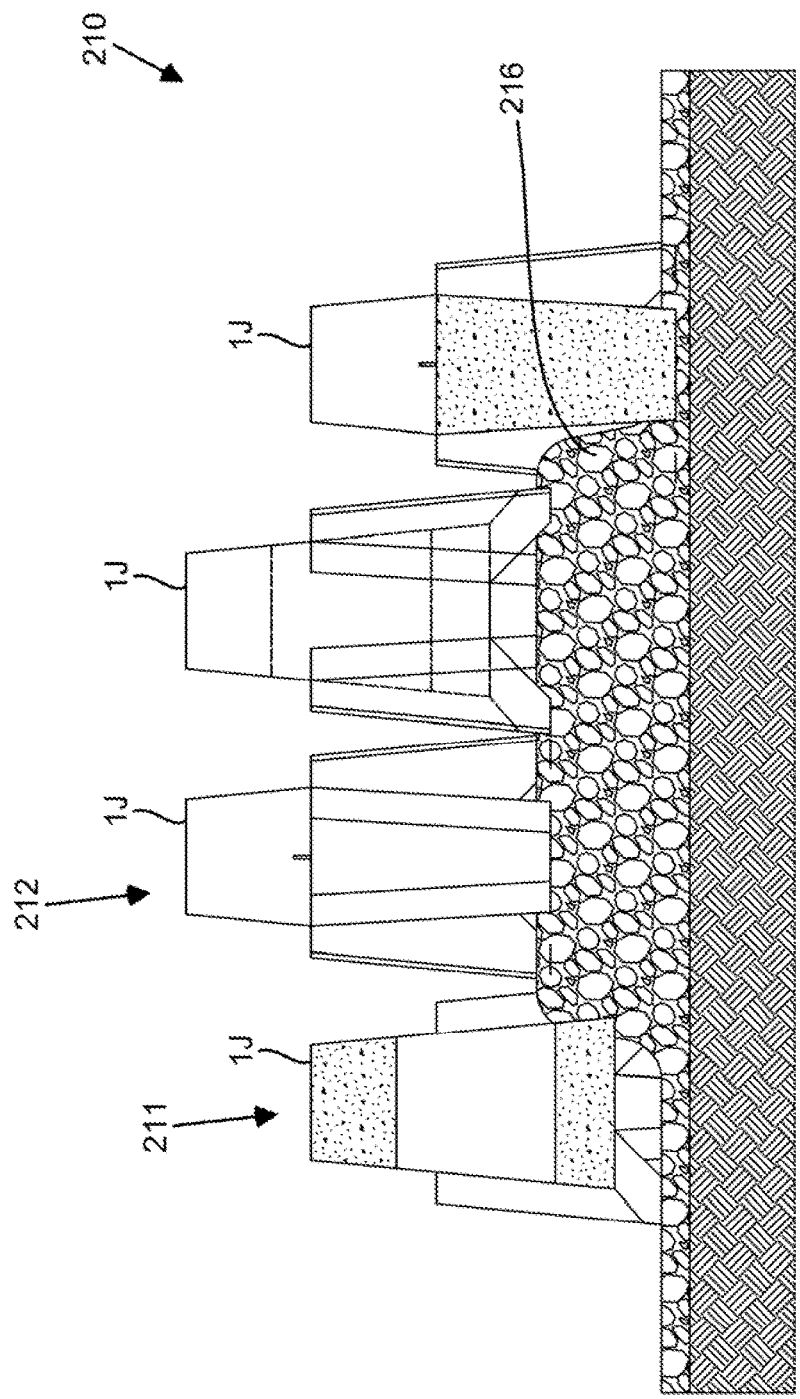
Figure 37:
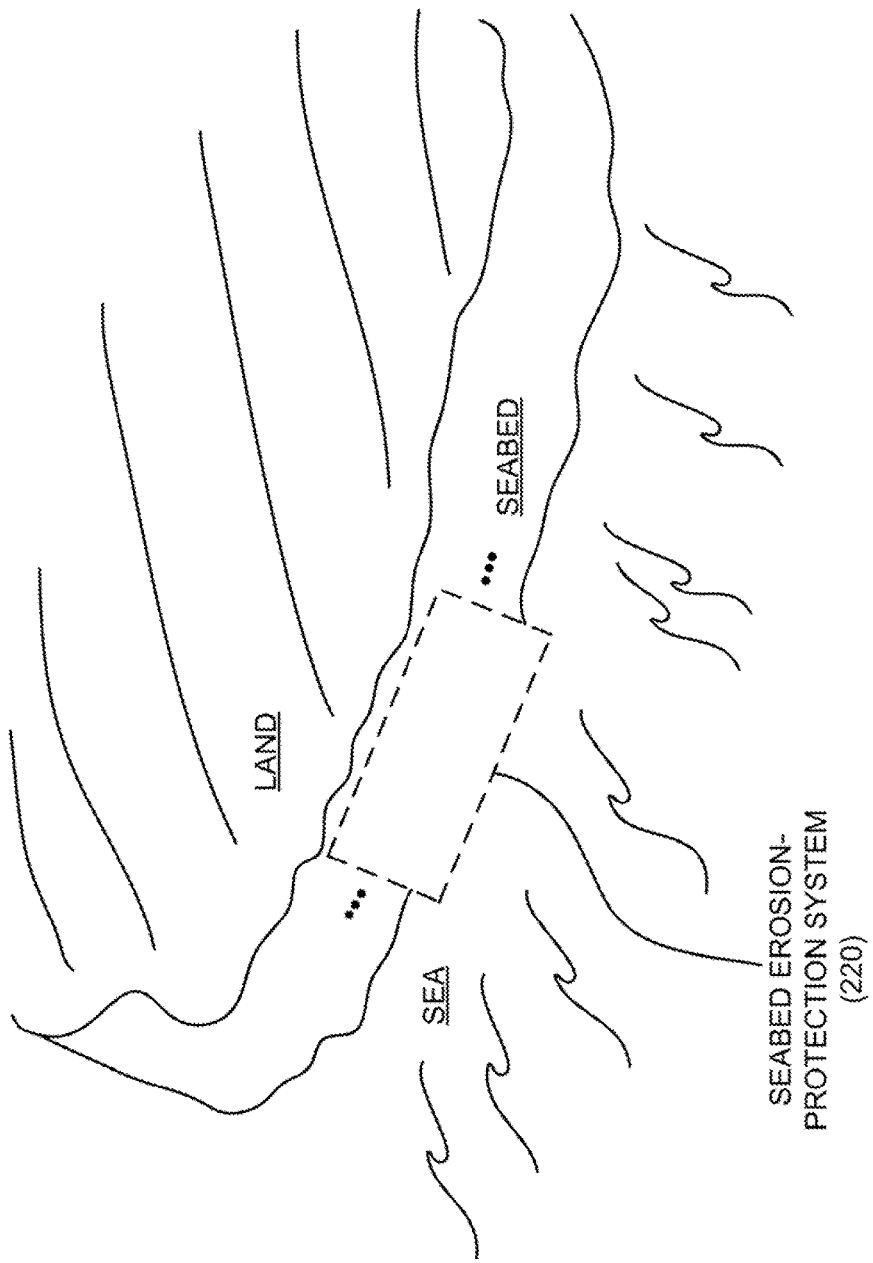
Figure 37A:
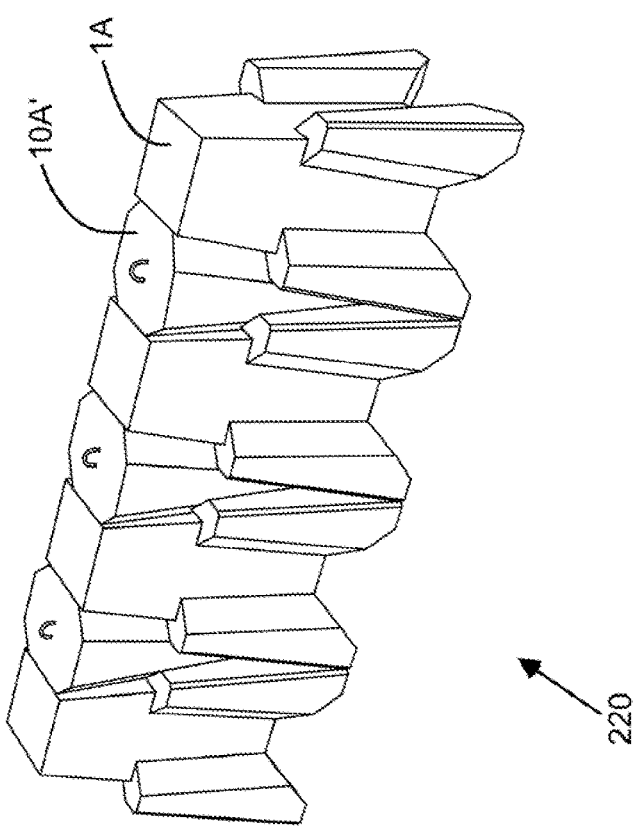
Figure 38:
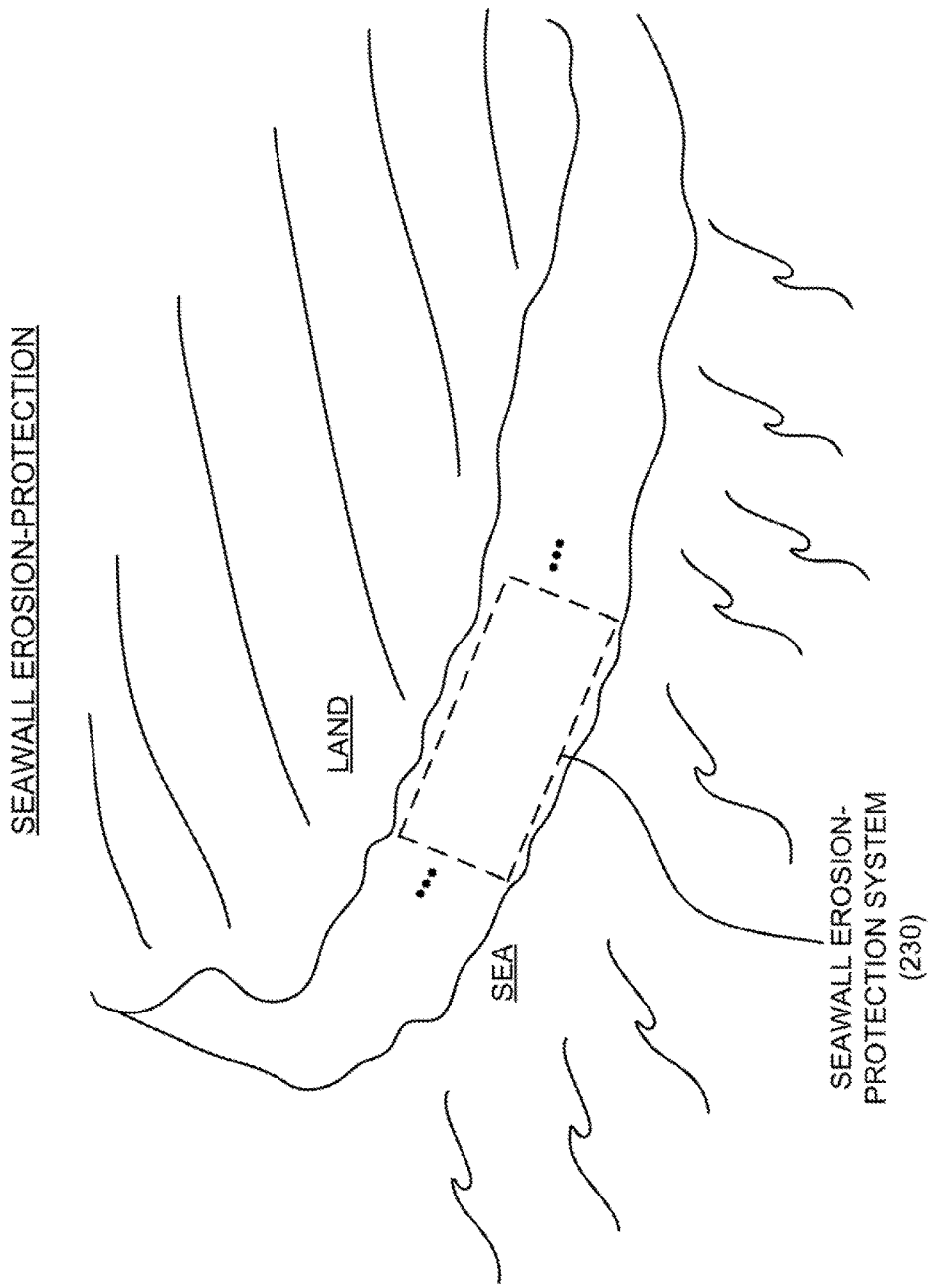
Figure 38A:
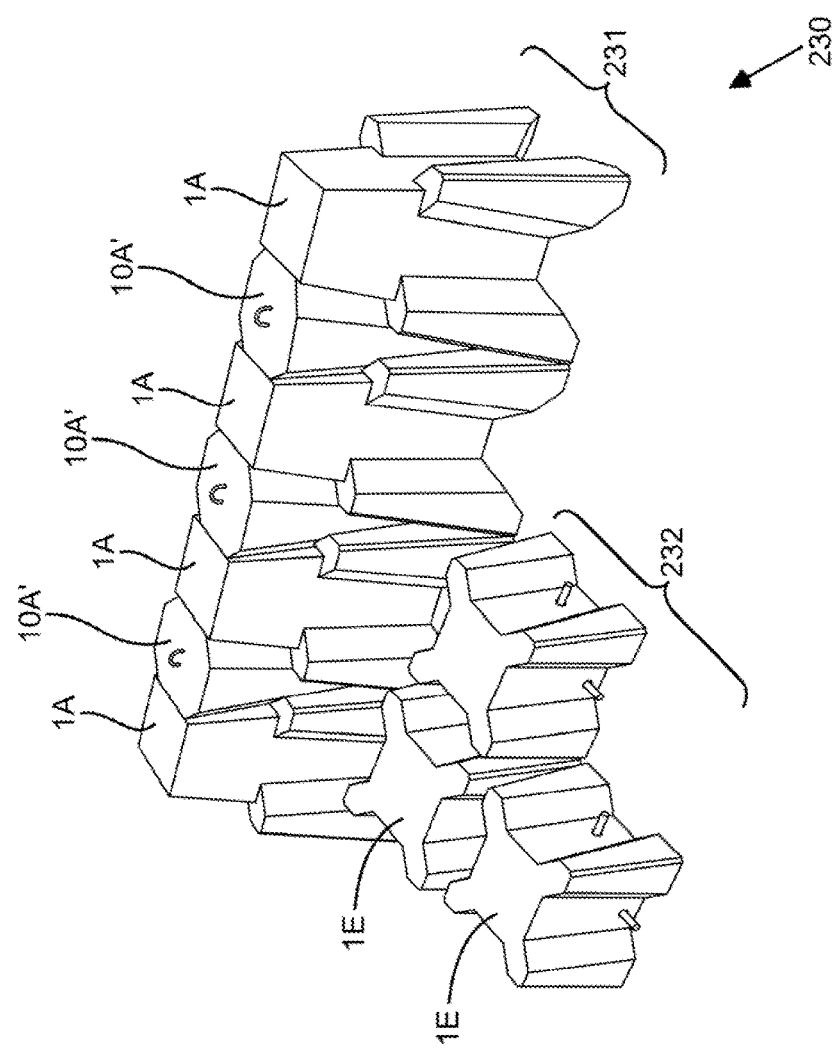
Figure 38B:
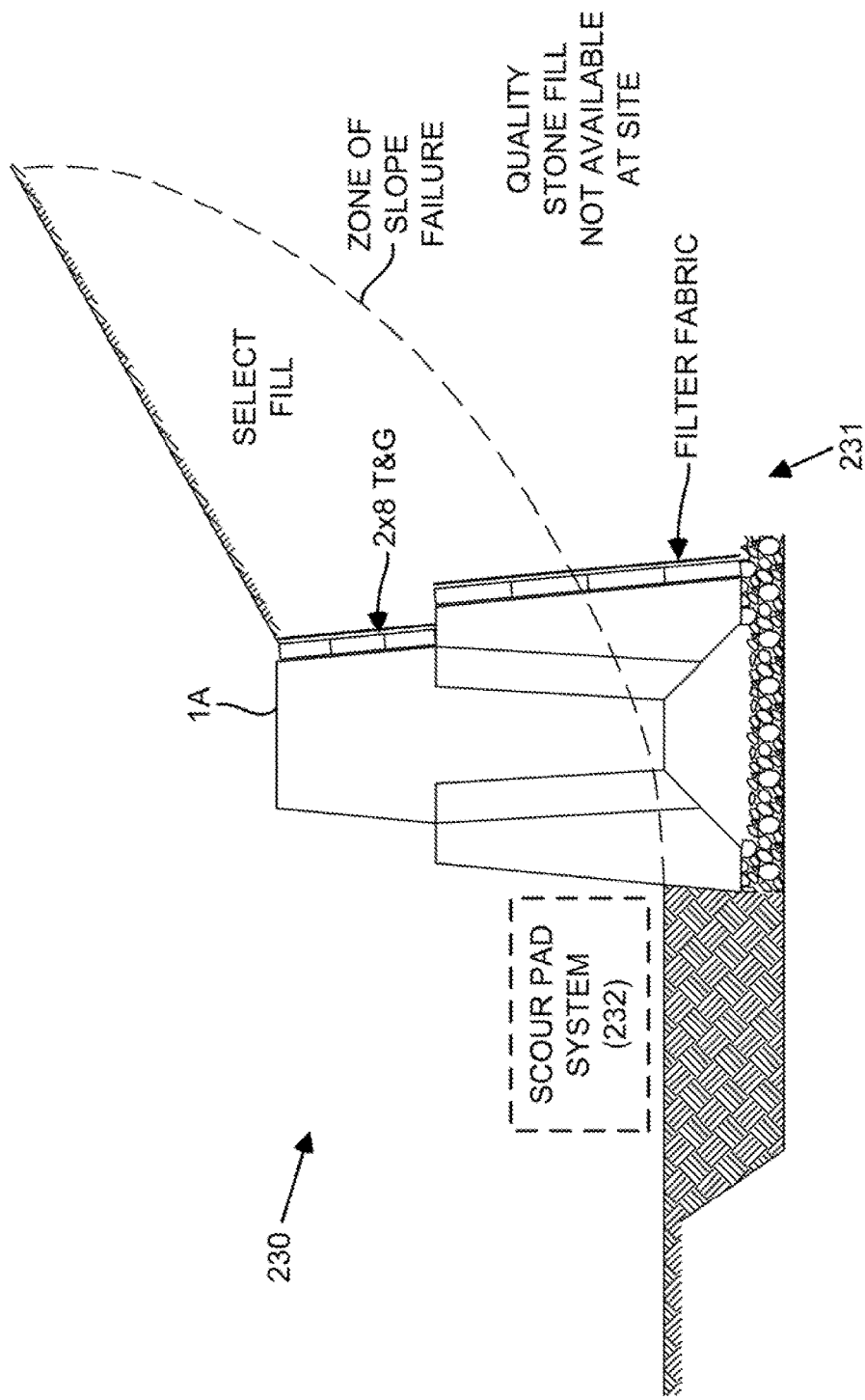
Figure 39:
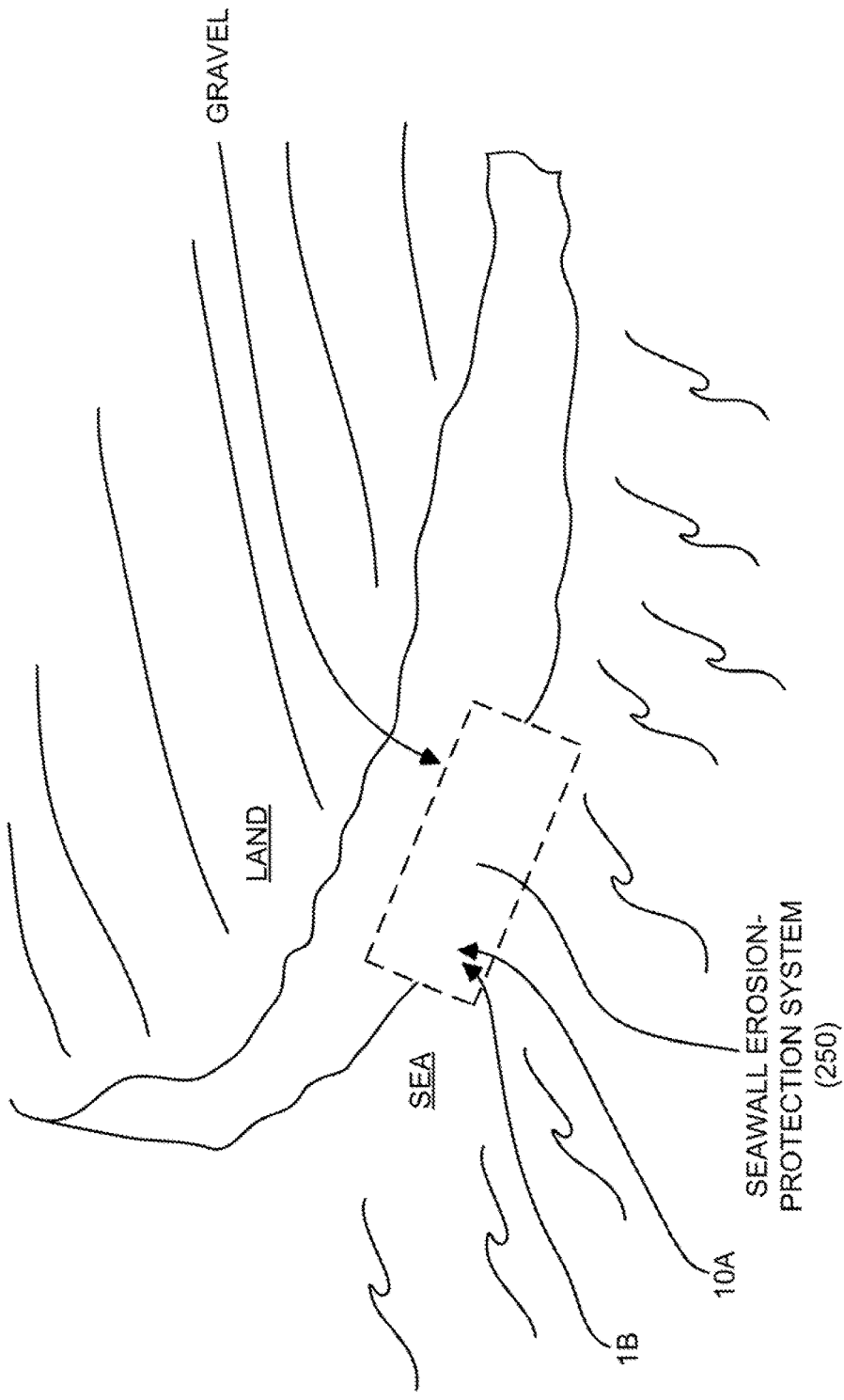
Figure 39A:
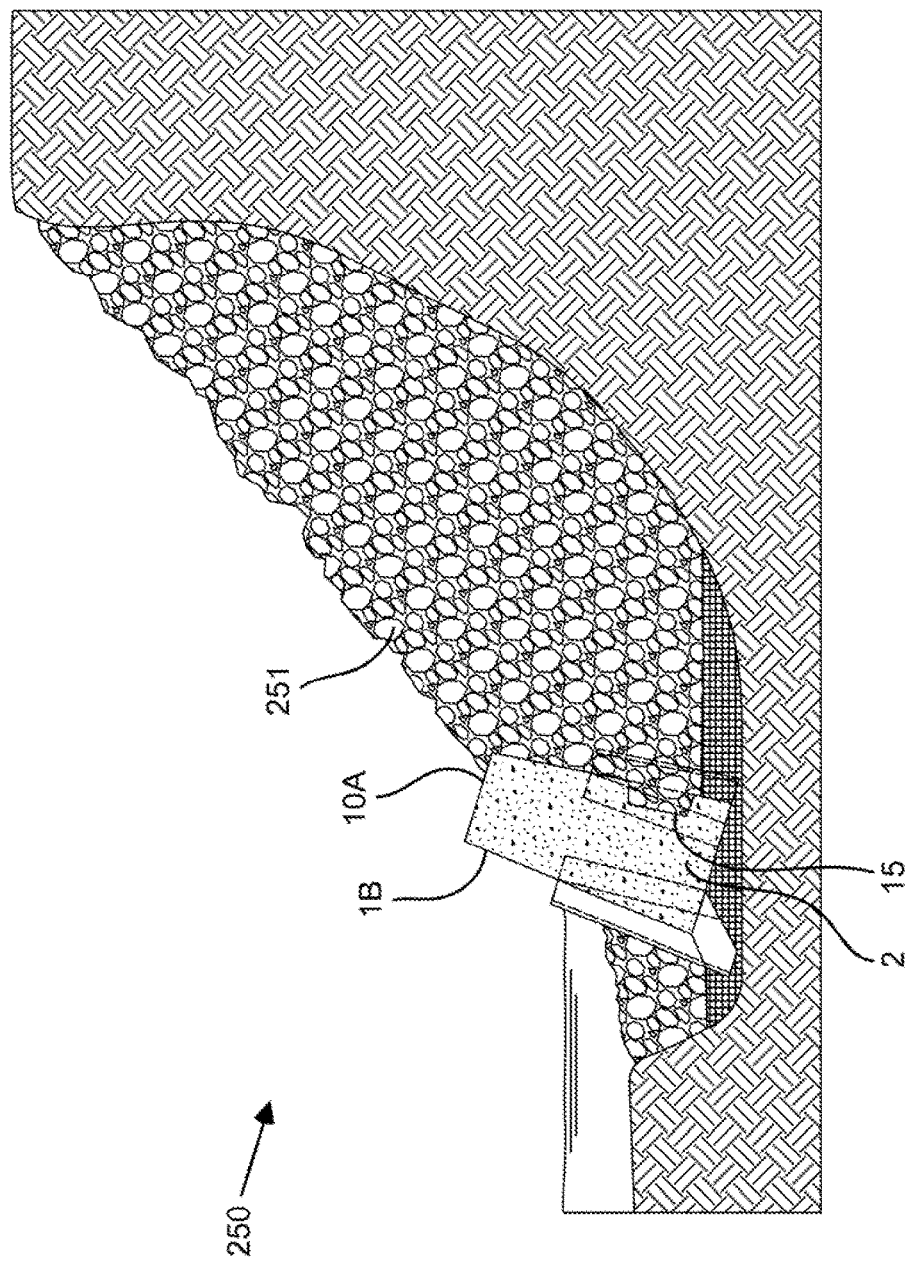
Figure 40:
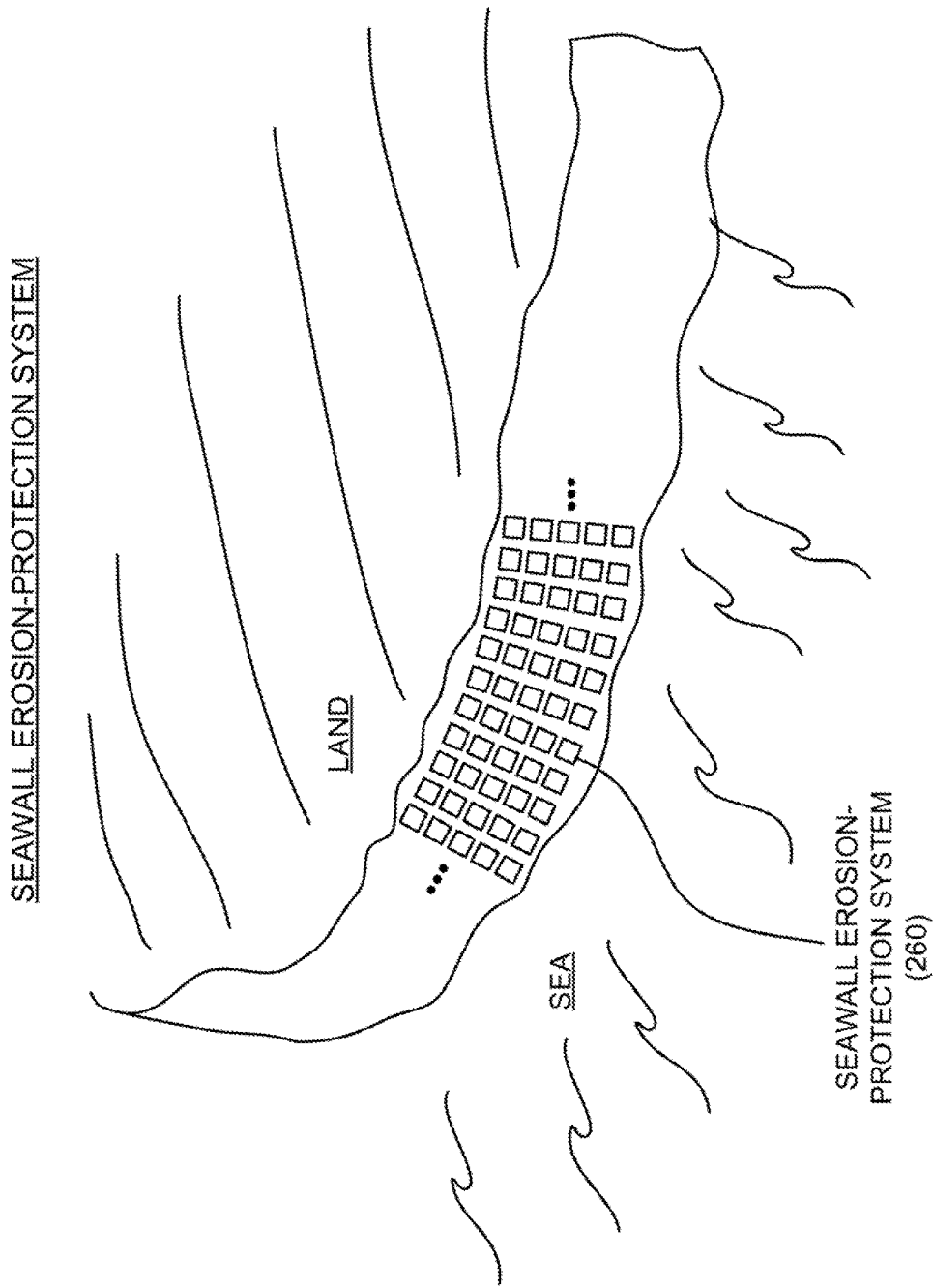
Figure 40A:
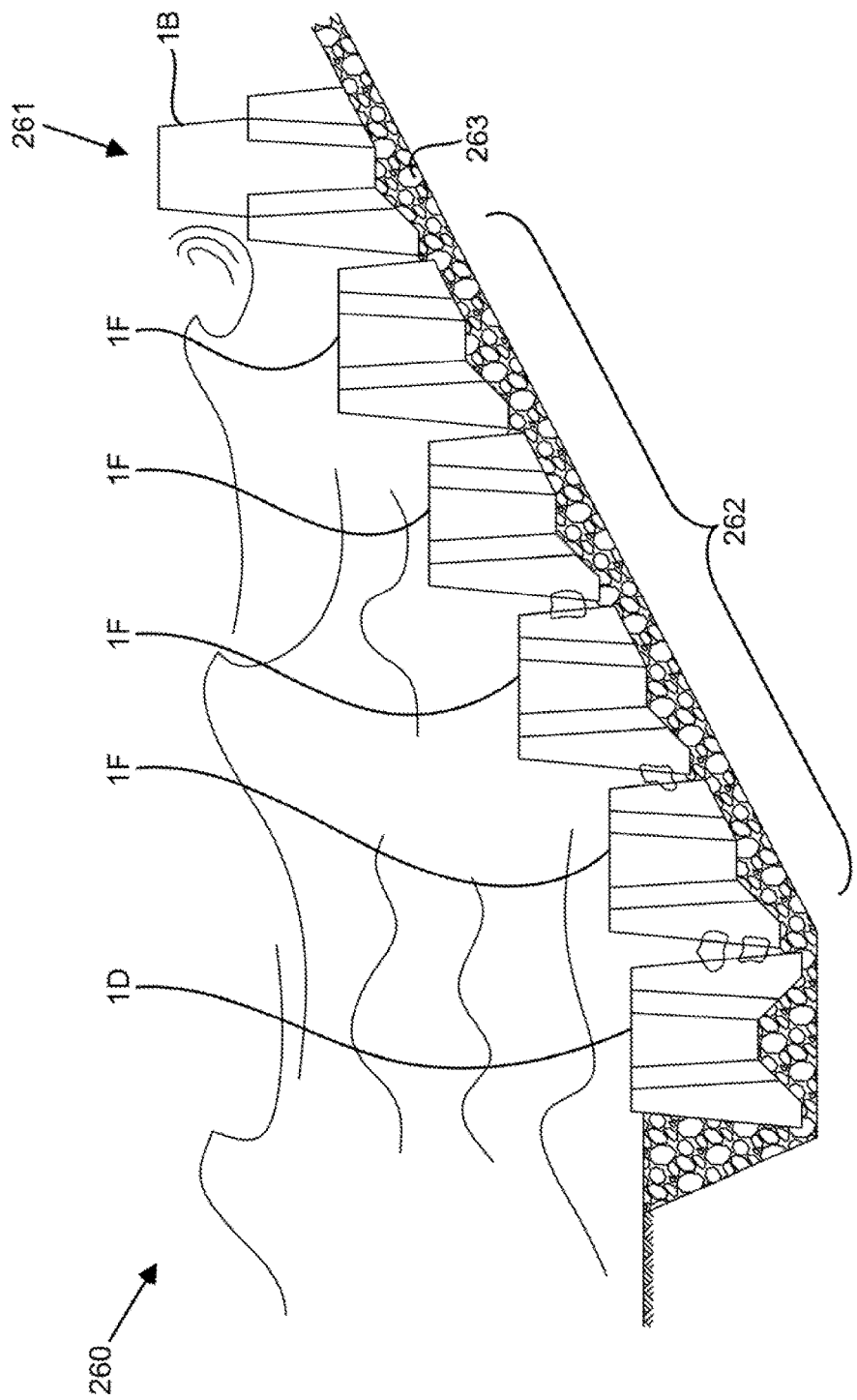

FIG. 32A is a perspective view of a breakwater construction block system configured in a first arrangement for protection against erosion along beaches, streambeds and riverbeds, and constructed using a third arrangement of the breakwater construction blocks shown in FIGS. 11A through 11F, wherein an interlocking shear key block of the type shown in FIGS. 28A and 28B is disposed between the sidewall surfaces of adjacent break water construction blocks, so that longer dimension of adjacent interlocking shear key blocks are aligned in orthogonal cross-sectional directions within the breakwater construction block system, and wherein each breakwater construction block has a short tower portion for slowing down the flow of water passing thereacross;

FIG. 32B is plan view of the breakwater construction block system shown in FIG. 32A taken along line FIG. 32B-FIG. 32B in FIG. 32C;

FIG. 32C is an elevated side view of the breakwater construction block system shown in FIGS. 32A and 32B;

FIG. 33A is a perspective view of a breakwater construction block system configured in a first arrangement for protection against erosion along beaches, streambeds and riverbeds, and constructed using a third arrangement of the breakwater construction blocks shown in FIGS. 11A through 11F, wherein an interlocking shear key block of the type shown in FIGS. 28A and 28B is disposed between the sidewall surfaces of a first set of opposing break water construction blocks and also between the leg portions of a second set of opposing breakwater construction blocks, so that the longer dimension of each interlocking shear key block extends between the side wall surface of the first set of opposing breakwater construction blocks, whereas the shorter dimension of each interlocking shear key block extends between the leg portions of the second set of opposing breakwater construction blocks, and wherein each breakwater construction block has a short tower portion for slowing down the flow of water passing thereacross;

FIG. 33B is plan view of the breakwater construction block system shown in FIG. 33A taken along line FIG. 33B-FIG. 33B in FIG. 33C;

FIG. 33C is an elevated side view of the breakwater construction block system shown in FIGS. 33A and 33B;

FIG. 34A is a riverbed erosion-prevention system installed at the bottom of a riverbed, constructed as an arrangement of breakwater construction blocks connected together by interlocking shear key blocks, as shown in FIG. 31A, 32A or 33A;

FIG. 34B is a cross-sectional view of the riverbed erosion-prevention system installed at the bottom of a riverbed, as shown in FIG. 34A, with water flowing over the installed riverbed erosion-prevention system;

FIG. 35A is a streambed erosion-prevention system installed at the bottom of a streambed, constructed as an arrangement of breakwater construction blocks connected together by interlocking shear key blocks, as shown in FIG. 31A, 32A or 33A;

FIG. 35B is a cross-sectional view of the riverbed erosion-prevention system installed at the bottom of a streambed, as shown in FIG. 34A, with water flowing over the installed streambed erosion-prevention system;

FIG. 36A is a first perspective view of a groin-type beach erosion-prevention barrier system employing an arrangement of four tiered rows of interconnected breakwater construction blocks of the type shown in FIGS. 18A through 8E (with flow through water channels), assembled symmetrically about of linear mound of sand on a beach shore as shown in FIG. 36F, wherein each row of breakwater construction blocks is constructed by a series of breakwater construction blocks connected together by interlocking shear key blocks of the type shown in FIGS. 28A and 28B having a height less than the central trapezoidal core portion of the breakwater construction blocks, so as to facilitate the reduction of water speed across the breakwater construction blocks and cause sand to collect and settle around the groin structure, to prevent beach erosion;

FIG. 36B is a second closer-up perspective view of the groin-type beach erosion-prevention barrier system shown in FIG. 36A;

FIG. 36C is a plan view of a section of the groin-type beach erosion-prevention barrier system shown in FIGS. 36A and 36B;

FIG. 36D is an elevated side view of a side section of the groin-type beach erosion-prevention barrier system taken along the arrows indicated by FIG. 36D as shown in FIG. 36E;

FIG. 36E is an elevated side view of the groin-type beach erosion-prevention barrier system shown in FIGS. 36A through 36D;

FIG. 36F is a cross-sectional view of the groin-type beach erosion-prevention barrier system of FIGS. 36A through 36E, showing the symmetrically tiered arrangement of the four linear rows of breakwater construction blocks FIG. 37 is a birds-eye perspective view of a multi-tier seawall erosion-protection system of the present invention, shown constructed along a section of coastal shoreline using breakwater construction blocks shown in FIGS. 8A through 8E, interlocking shear key blocks shown in FIG. 30A, and breakwater construction blocks shown in FIGS. 13A through 13D;

FIG. 37A is a close-up perspective the multi-tier seawall erosion-protection system constructed along a section of coastal shoreline shown in FIG. 37, comprising (i) a seawall subsystem constructed from a continuous row of breakwater construction blocks of the type shown in FIGS. 8A through 8E arranged leg portion to leg portion and connected together by interlocking shear key blocks of the type shown in FIG. 30A having a height substantially equal to the height of the breakwater construction block (e.g. 5' or so), and (ii) a scour-protection subsystem disposed in front of the seawall subsystem, and constructed from at least first and second continuous rows of 2-ton breakwater construction blocks of the type shown in FIGS. 13A through 13D, interconnected by cable or rods as shown in FIGS. 27A through 27D, to protect against erosion (i.e. scouring) of shoreline along which the seawall subsystem is installed;

FIG. 38 is a birds-eye perspective view of a single-tier seawall erosion-protection system of the present invention, shown constructed along a section of coastal shoreline using breakwater construction blocks shown in FIGS. 8A through 8E, interlocking shear key blocks shown in FIGS. 28A and 28B;

FIG. 38A is a close-up perspective the single-tier seawall erosion-protection system constructed along a section of coastal shoreline shown in FIG. 38, comprising a seawall subsystem constructed from a continuous row of breakwater construction blocks of the type shown in FIGS. 8A through 8E arranged leg portion to leg portion and connected together by interlocking shear key blocks of the type shown in FIG. 30A having a height substantially equal to the height of the breakwater construction block (e.g. 5' or so);

FIG. 38B is a side view of the single-tier seawall erosion-protection system constructed along a section of coastal shoreline shown in FIG. 38;

FIG. 39 is a birds-eye perspective view of a single-tier seawall erosion-protection system of the present invention, shown constructed along a section of coastal shoreline using breakwater construction blocks shown in FIGS. 10A through 10E, and interlocking shear key blocks shown in FIGS. 28A and 28B, inserted between neighboring breakwater construction blocks;

FIG. 39A is a side view of the single-tier seawall erosion-protection system constructed along a section of coastal shoreline shown in FIG. 39, comprising a seawall subsystem constructed from a continuous row of battered breakwater construction blocks of the type shown in FIGS. 10B1 through 10B4, arranged from leg portions to front leg portions, (having truncated rear leg portions), and connected together by interlocking shear key blocks of the type shown in FIGS. 28A and 28B having a height substantially equal to the height of the breakwater construction block (e.g. 5' or so), behind which is a rock shelf that interlocks and wedges with the breakwater construction blocks and becomes an integral part of the overall structure, for increased stability;

FIG. 40 is a birds-eye perspective view of multi-tiered seawall erosion-protection system of the present invention, constructed along a section of coastal shoreline using low-profile flat top breakwater construction blocks shown in FIGS. 14A through 14E having truncated leg portions and bottom surface trimmed to slope of coastal edge surface, tower-type breakwater construction blocks shown in FIGS. 10A through 10E, and interlocking shear key blocks shown in FIGS. 28A and 28B having a height substantially equal to the central trapezoidal core portion of the low-profile flat top breakwater construction blocks;

FIG. 40A is a side view of a first embodiment of the multi-tiered seawall erosion-protection system shown in FIG. 40, comprising (i) a seawall subsystem installed at the top elevation of a coastal incline upon a bed of crushed rock and/or stone and constructed from a continuous row of breakwater construction blocks of the type shown in FIGS. 10B1A through 10B4 arranged leg portion to leg portion and connected together by interlocking shear key blocks of the type shown in FIGS. 28A and 28B having a height substantially equal to the height of the breakwater construction block (e.g. 5' or so), and (ii) a scour-protection subsystem installed on the inclined surface of the coastal region, disposed in front of the seawall subsystem, and constructed from (a) multiple continuous rows of 2-ton low-front-file flat-top breakwater construction blocks of the type shown in FIGS. 14A through 14E with truncated leg portions tailored to the incline surface, and interconnected by interlocking shear key blocks shown in FIGS. 28A through 28D, and (b) a continuous row of 2-ton flat top breakwater construction blocks of the type shown in FIGS. 12A through 12E, interconnected by interlocking shear key blocks shown in FIGS. 28A through 28D, the purpose of which is to protect against erosion (i.e. scouring) of shoreline along which the multi-tiered seawall subsystem is installed;

FIG. 40B is a side view of a second embodiment of the multi-tiered seawall erosion-protection system shown in FIG. 40, installed upon a bed or crushed rock or stone on the inclined surface of the coastal region, disposed in front of the seawall subsystem, and constructed from a continuous row of 2-ton flat-top breakwater construction blocks of the type shown in FIGS. 14A through 14E with truncated leg portions tailored to the incline surface, and interconnected by interlocking shear key blocks shown in FIGS. 28A through 28D, and multiple continuous rows of 2-ton tower-type breakwater construction blocks of the type shown in FIGS. 10B1 through 10B5 with truncated leg portions tailored to the incline surface, and interconnected by interlocking shear key blocks shown in FIGS. 28A through 28D, the purpose of which is to protect against erosion (i.e. scouring) of shoreline along which the multi-tiered seawall subsystem is installed;

FIG. 40C is a side view of a third embodiment of the multi-tiered seawall erosion-protection system shown in FIG. 40, comprising (i) a seawall subsystem installed at the top elevation of a coastal incline upon a bed of crushed rock and/or stone and constructed from a continuous row of breakwater construction blocks of the type shown in FIGS. 10B1A through 10B4 arranged leg portion to leg portion and connected together by interlocking shear key blocks of the type shown in FIGS. 28A and 28B having a height extending above the height of the breakwater construction block (e.g.

Figure 41A:
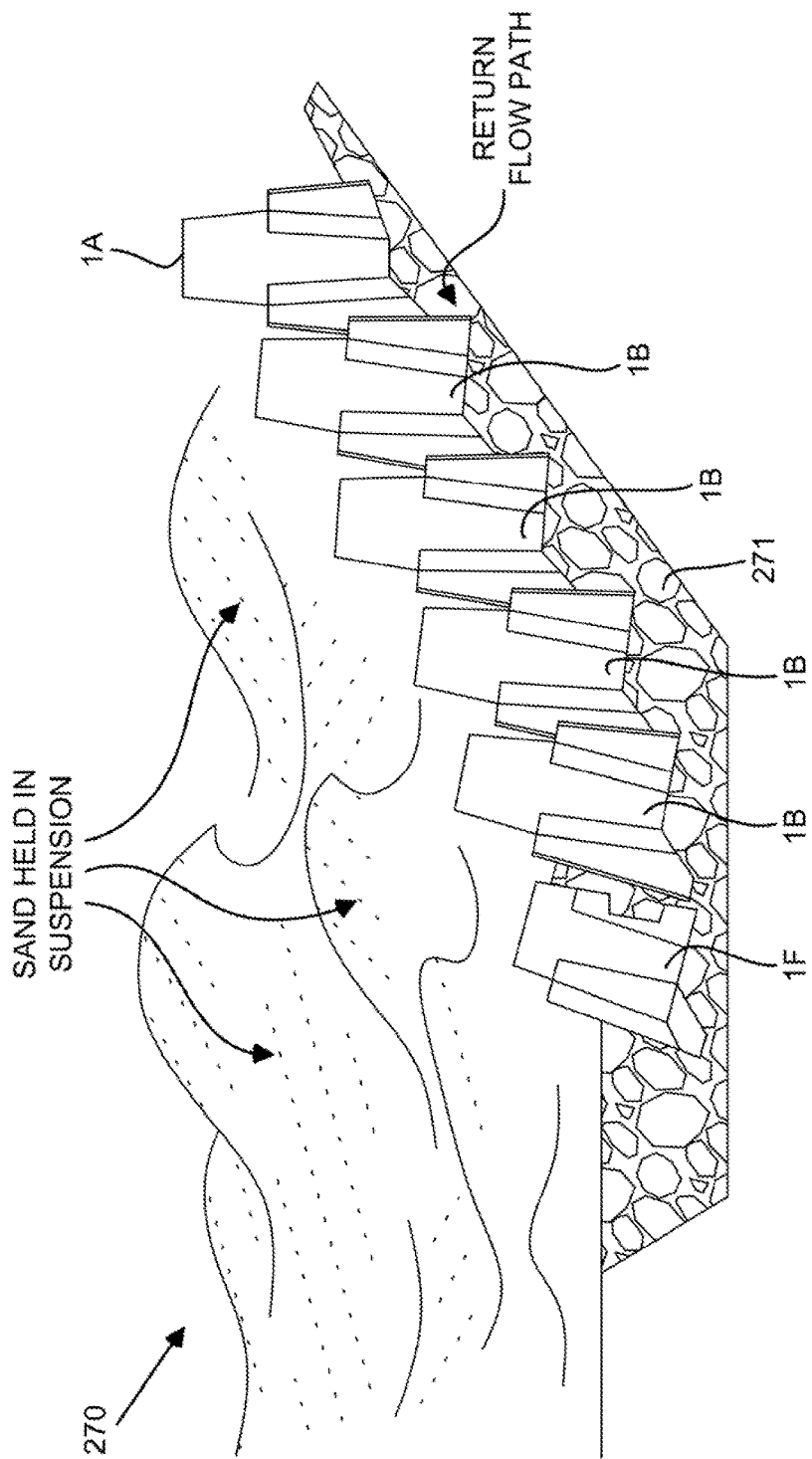
Figure 42:
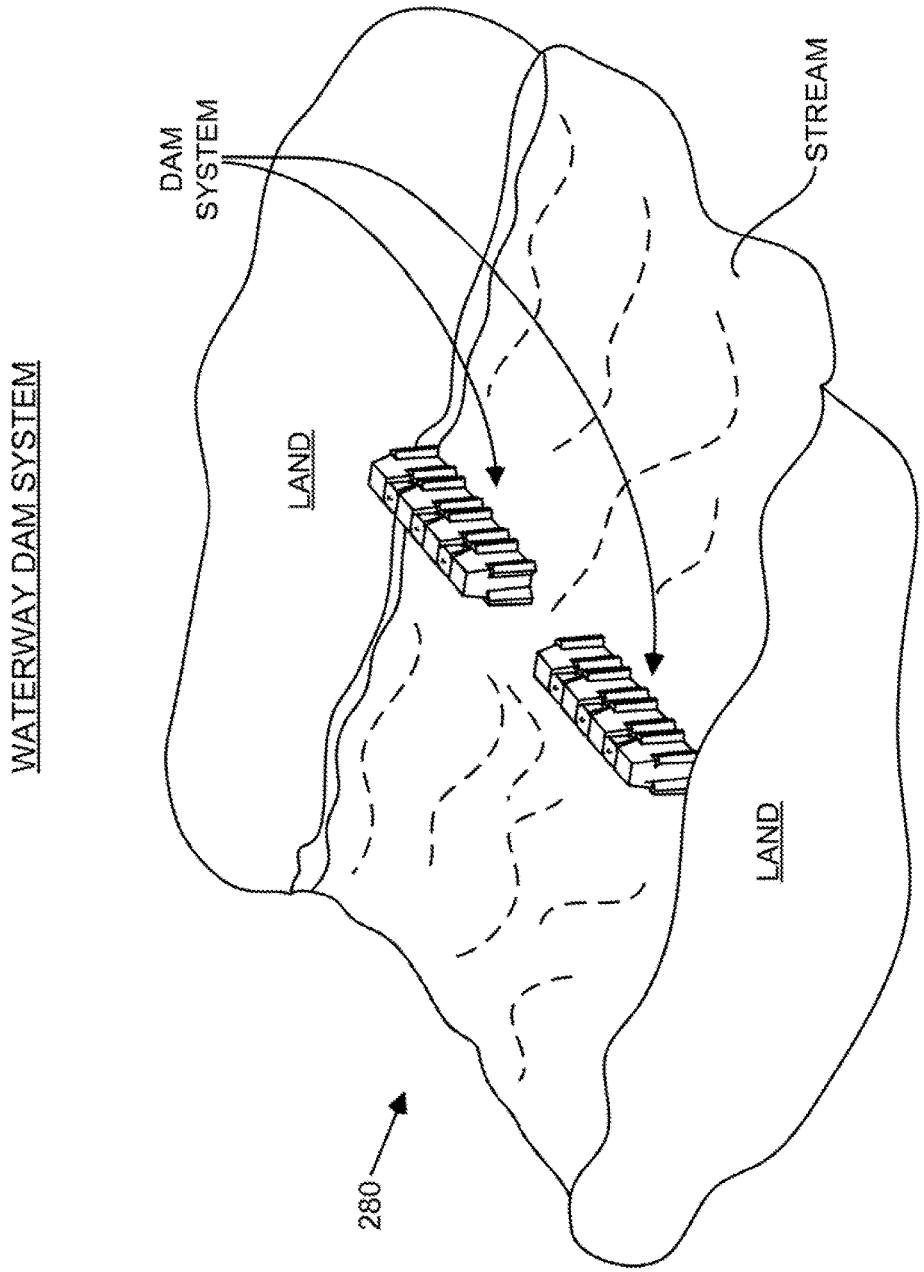
Figure 42A:
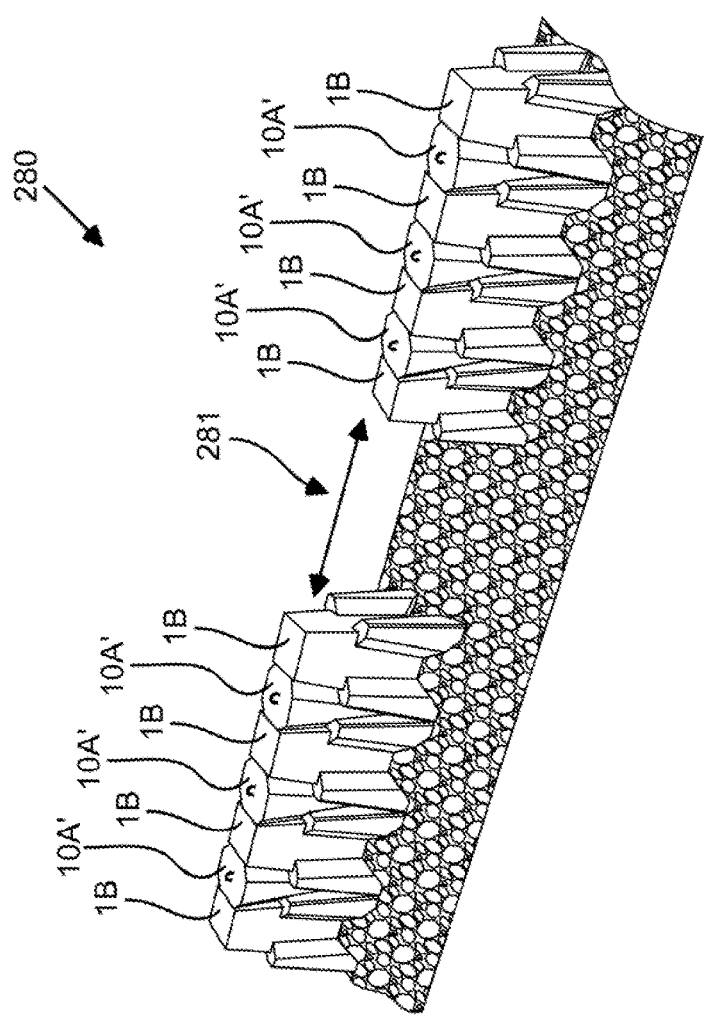
Figure 42B:
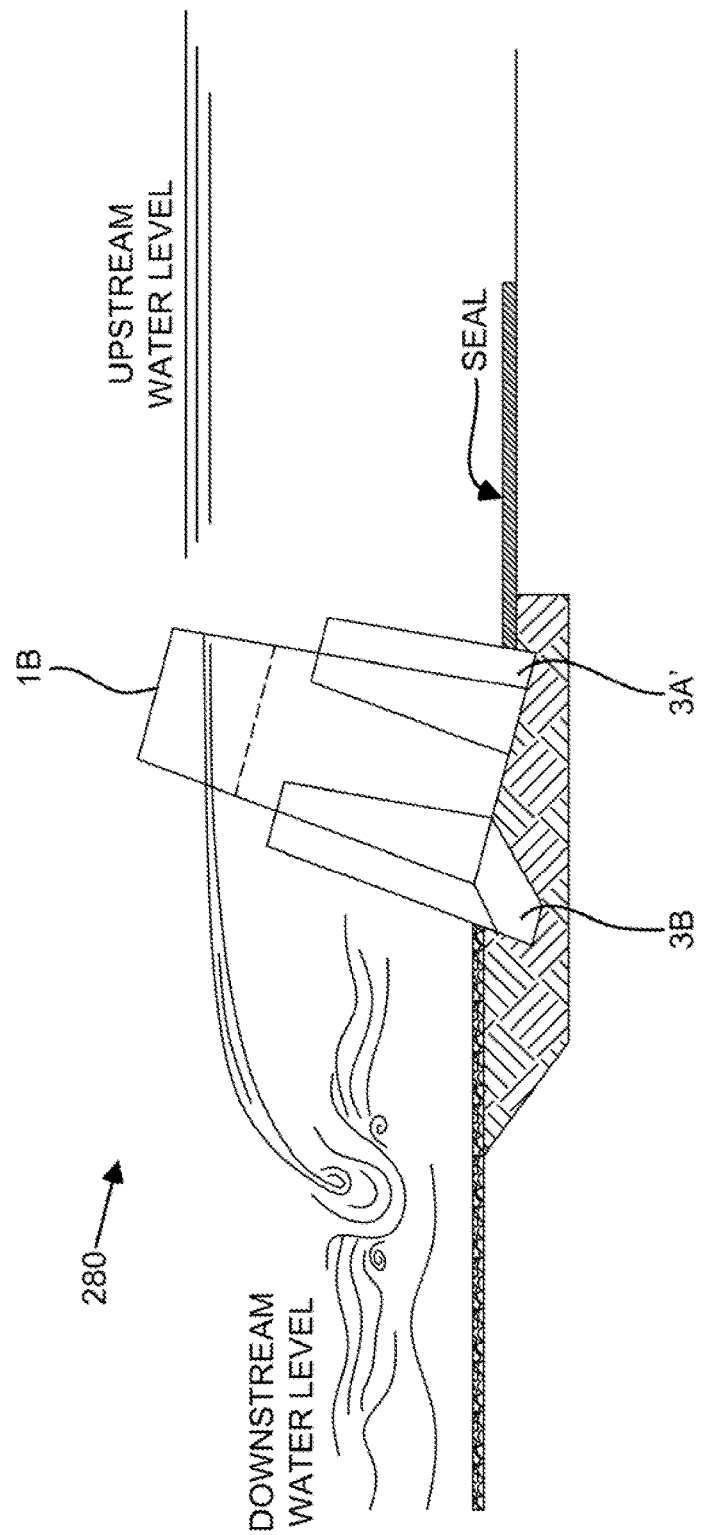
Figure 47:
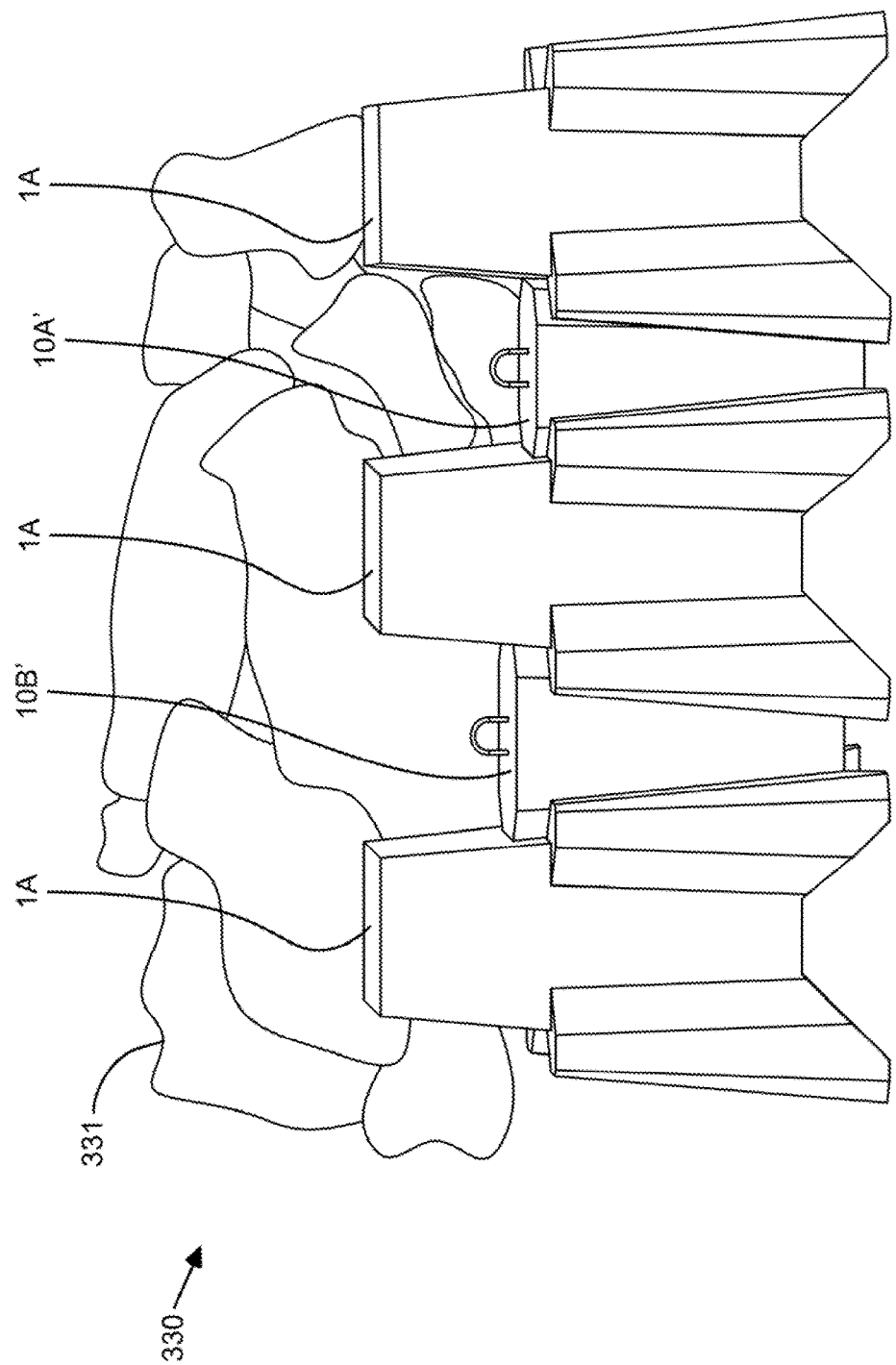
Figure 48:
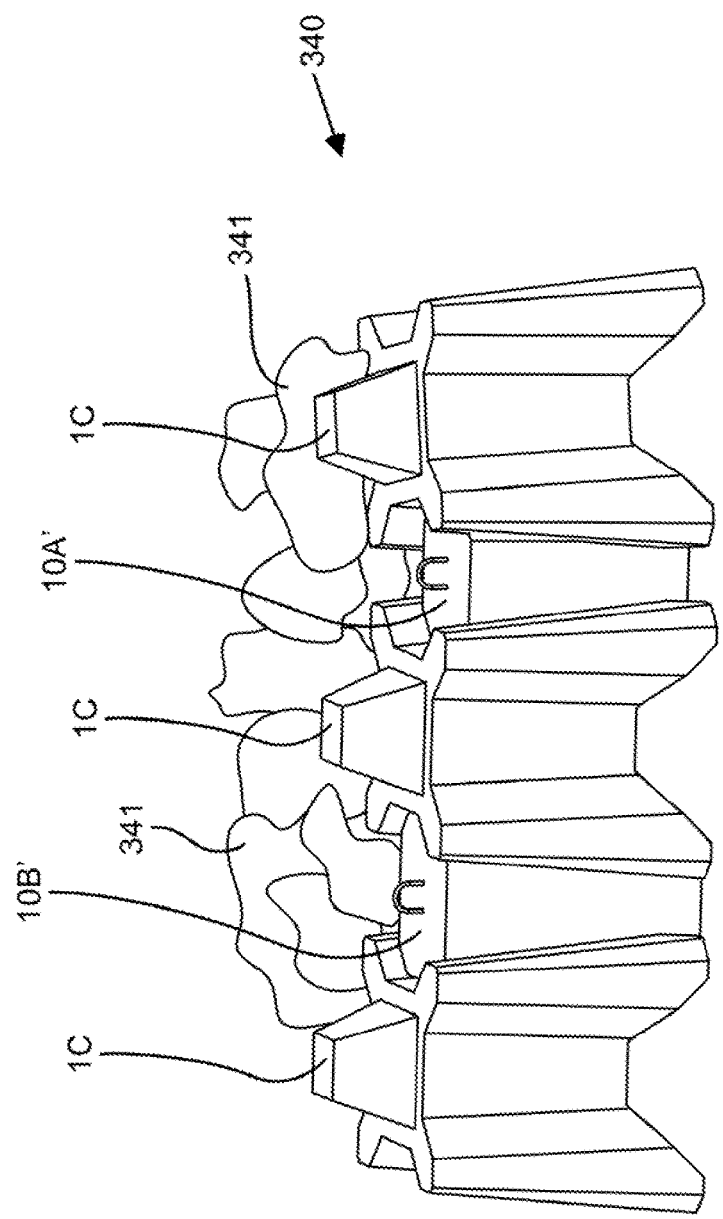
Figure 49:
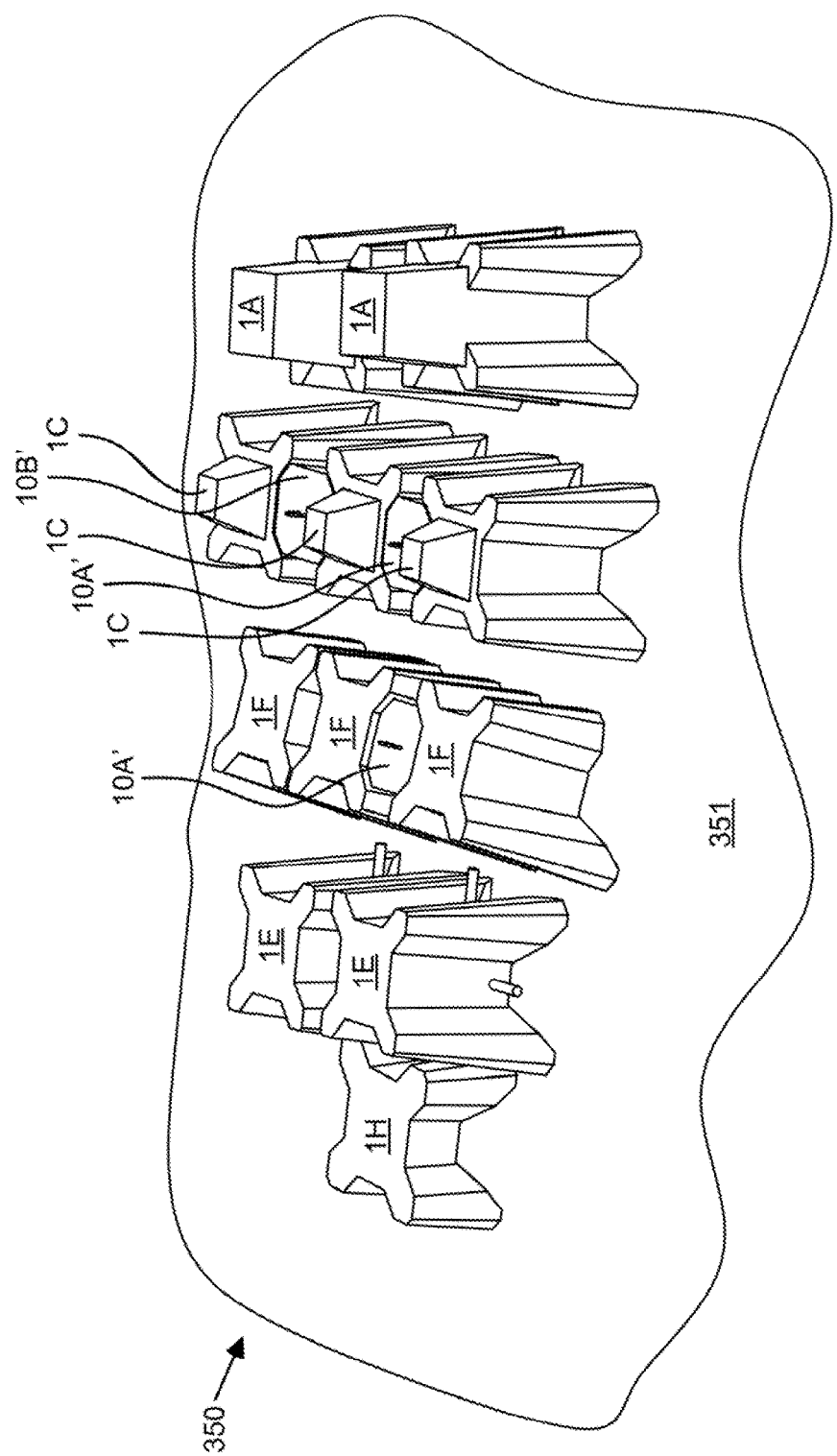
Figure 50:
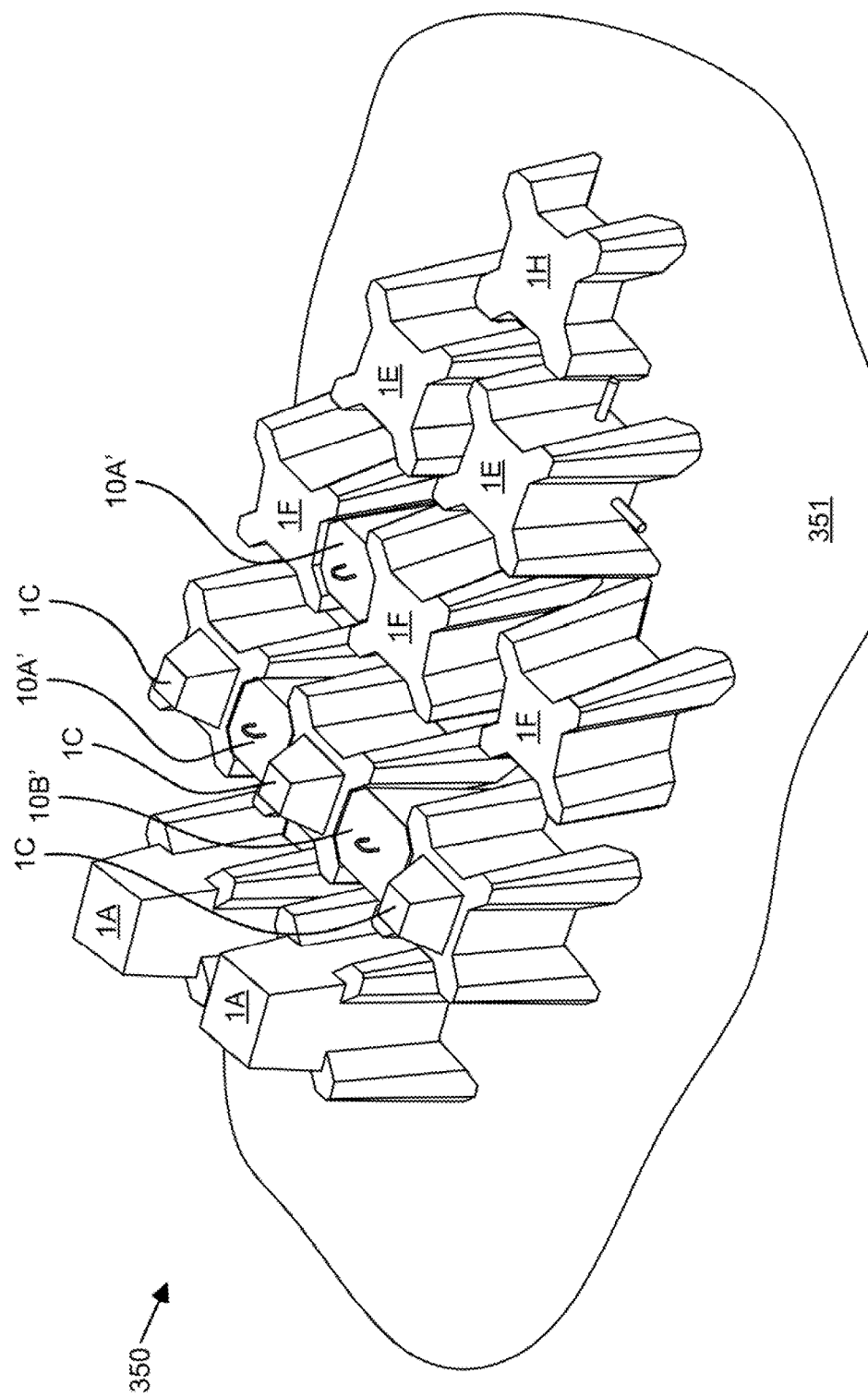
Figure 51:
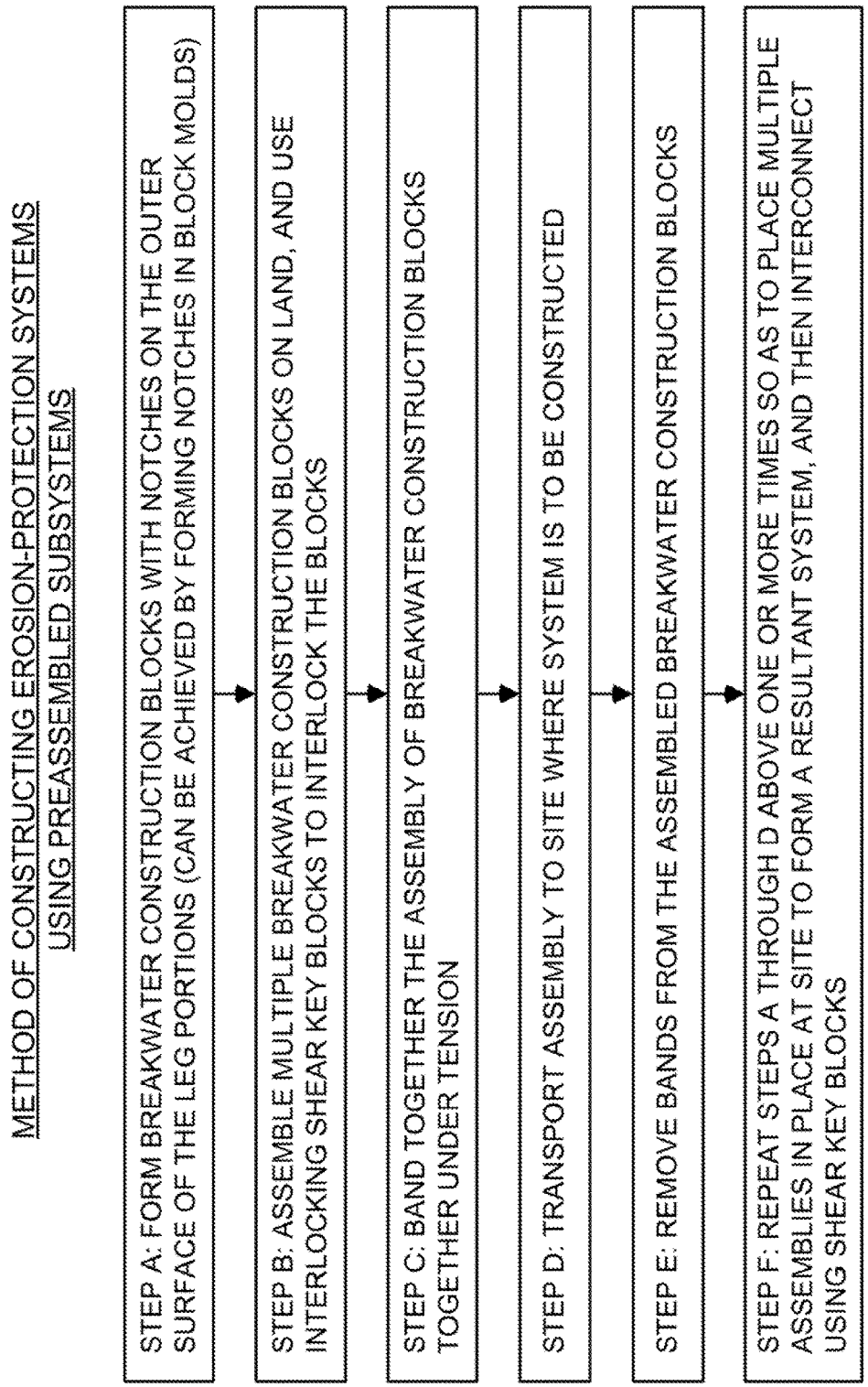
Figure 52:
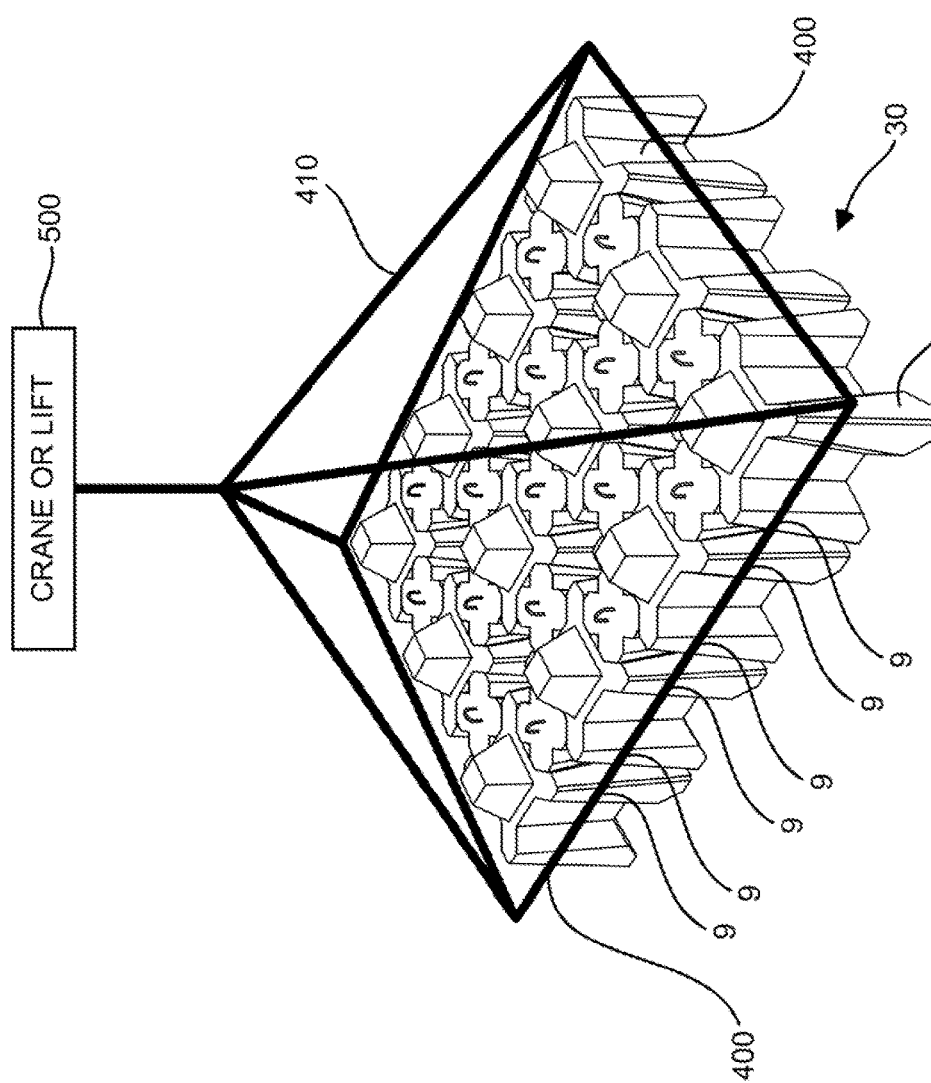
Figure 53:
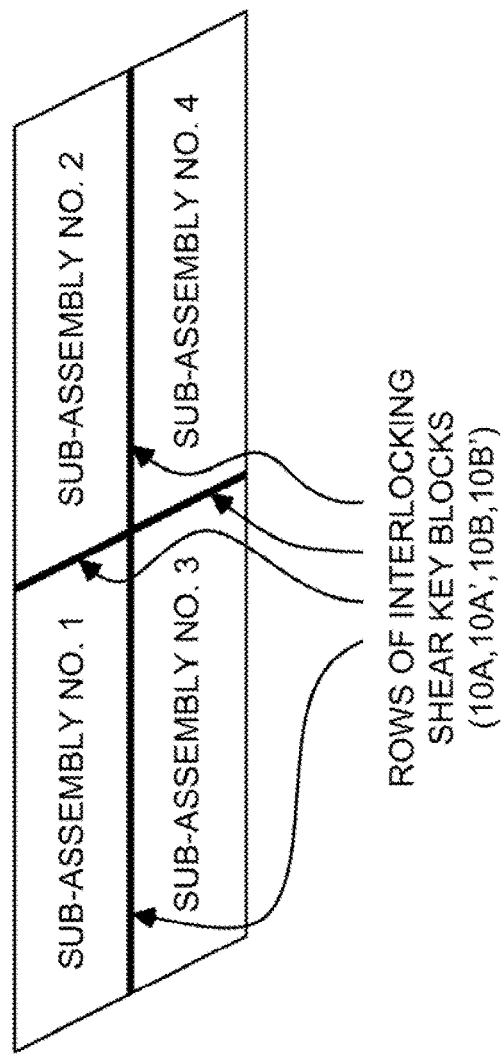

5' or so), and (ii) a scour-protection subsystem installed upon a bed or crushed rock or stone on the inclined surface of the coastal region, disposed in front of the seawall subsystem, and constructed from multiple continuous rows of 2-ton flat-top breakwater construction blocks of the type shown in FIGS. 14A through 14E with truncated leg portions tailored to the incline surface, and interconnected by interlocking shear key blocks shown in FIGS. 28A through 28D, the purpose of which is to protect against erosion (i.e. scouring) of shoreline along which the multi-tiered seawall subsystem is installed;

FIG. 41 is a birds-eye perspective view of multi-tiered seawall erosion-protection system of the present invention, constructed along a section of coastal shoreline using tower-type breakwater construction blocks shown in FIGS. 10B1 through 10B4 having truncated leg portions and bottom surface trimmed to slope of coastal edge surface, and interlocking shear key blocks shown in FIGS. 28A and 28B having a height substantially equal to the central trapezoidal core portion of the tower-type breakwater construction blocks;

FIG. 41A is a side view of the multi-tiered seawall erosion-protection system shown in FIG. 41, installed upon a bed of crushed rock or stone on the inclined surface of a coastal region, and constructed from multiple continuous rows of 2-ton tower-type (5' high) breakwater construction blocks of the type shown in FIGS. 10A through 10E with truncated leg portions tailored to the incline surface, and interconnected by interlocking shear key blocks shown in FIGS. 28A through 28D, having a height substantially equal to the height of the breakwater construction block (e.g. 5' or so), the purpose of which is to dissipate wave energy, entrap sand suspended in ocean waters, and protect against the erosion (i.e. scouring) of shoreline along which the multi-tiered seawall subsystem is installed;

FIG. 42 is a birds-eye perspective view of a waterway dam system installed along a river or stream, and constructed from a discontinuous row of tower-type breakwater construction blocks shown in FIGS. 7A through 7E that are inter connected by interlocking shear key blocks shown in FIGS. 28A and 28B, each having a height substantially equal to the central trapezoidal core portion of its neighboring tower-type breakwater construction blocks, wherein the discontinuity in the waterway dam system allows for the control of water flow along the river or stream;

FIG. 42A is a birds-eye perspective view of a waterway dam system installed along a river or stream, and constructed from a discontinuous row of tower-type breakwater construction blocks shown in FIGS. 10A through 10E, having truncated leg portions to facilitate installation that are inter connected by interlocking shear key blocks shown in FIG. 30A, each having a height substantially equal to the central trapezoidal core portion of its neighboring tower-type breakwater construction blocks, wherein the discontinuity in the waterway dam system allows for the control of water flow along the river or stream;

FIG. 42B is a cross-sectional view of the waterway dam system shown in FIG. 42A, illustrating that the tall breakwater construction blocks with truncated leg portions are installed at an angle inclined into the body of water being dammed up by the waterway dam system;

FIG. 43 is a birds-eye perspective view of a water permeable wall system installed along both sides of a river, stream or waterway, and constructed from a continuous row low-profile breakwater construction blocks shown in FIGS. 12A through 12E, installed upon a bed of crushed stone or rock, beneath which is a layer of HS® filter fabric, and wherein the breakwater construction blocks are interconnected by interlocking shear key blocks shown in FIGS. 28A and 28B, and each have a height substantially equal to the central trapezoidal core portion of its neighboring flat top breakwater construction blocks, creating a water permeable wall structure for controlling and restraining flow of water when the water level increases on the river or stream during storm surges and the like;

FIG. 43A is a cross-sectional view of the water permeable water control system shown in FIG. 43 taken along line FIG. 43A-FIG. 43A in FIG. 43, illustrating that a continuous line of flat breakwater construction blocks are installed on each side of the river, stream or waterway, upon a bed of crushed stone or rock, beneath which is a layer of HS® filter fabric;

FIG. 44 is a birds-eye perspective view of a scour-protection system installed before a seawall or bulkhead along a river, stream or waterway, and constructed from a multiple continuous rows low-profile breakwater construction blocks shown in FIGS. 12A through 12E, being interconnected by interlocking shear key blocks shown in FIG. 30A, as shown in FIGS. 31A through 31C, wherein each breakwater construction block has a height substantially equal to the central trapezoidal core portion of its neighboring flat top breakwater construction block, and creating a scour-protection structure for preventing the scouring of the riverbed or oceanfront bed before the seawall or bulkhead;

FIG. 44A is a cross-sectional view of the scour-protection system shown in FIG. 44 taken along line FIG. 44A-FIG. 44A in FIG. 44, illustrating the interconnection of neighboring rows of breakwater construction blocks and neighboring breakwater construction blocks along each row, by way of interlocking shear keys of the present invention applied as shown in FIGS. 28A through 28B;

FIG. 45 is a birds-eye perspective view of a scour-protection system installed about the piers supporting a roadway bridge system across a river or waterway, and constructed from a multiple continuous rows low-profile breakwater construction blocks shown in FIGS. 12A through 12E, being interconnected by interlocking shear key blocks of FIGS. 28A and 28B, as shown in FIGS. 31A through 31C, wherein each breakwater construction block has a height substantially equal to the central trapezoidal core portion of its neighboring flat top breakwater construction block, and creating a scour-protection structure for preventing the scouring of the riverbed or oceanfront bed before the seawall or bulkhead;

FIG. 45A is a cross-sectional view of the scour-protection system shown in FIG. 45, illustrating the interconnection of neighboring rows of breakwater construction blocks and neighboring breakwater construction blocks along each row, by way of interlocking shear keys of the present invention applied as shown in FIG. 30A, and ensuring that the river bottom is located at the top of the stone fill to avoid turbulence and attracting flood debris;

FIG. 46 is a birds-eye perspective view of an impermeable water control system installed along both sides of a river, stream or waterway, and constructed from one or more continuous rows of low-profile breakwater construction blocks shown in FIGS. 12A through 12E, being interconnected by interlocking shear key blocks shown in FIGS. 28A and 28B, each having a height substantially equal to the central trapezoidal core portion of its neighboring flat top breakwater construction blocks, and creating a water impermeable groin-type structure for controlling and restraining flow of water when the water level increases on a river or stream during storm surges and the like;

FIG. 46A is a cross-sectional view of impermeable water control system shown in FIG. 46 taken along line FIG. 46A-FIG. 46A in FIG. 46, illustrating that one or more rows of continuous flat-top breakwater construction blocks are installed on each side of the river, stream or waterway, upon a bed of crushed stone or rock, beneath which is a layer of HS® filter fabric;

FIG. 47 is a perspective view of an exemplary barrier system for a coastal region, constructed on a beach before a collection of large rocks, comprising tower-type breakwater construction blocks shown in FIGS. 7A through 7E, spaced apart by different spacings, and interconnected by interlocking shear key blocks shown in FIG. 30A which is a modification of the designs shown in FIGS. 28A and 28B and 29a and 29B;

FIG. 48 is a perspective view of an exemplary barrier system for a coastal region, constructed on a beach before a collection of large rocks, comprising breakwater construction blocks shown in FIGS. 11A through 11F, spaced apart by different spacings and interconnected by interlocking shear key blocks shown in FIG. 30A which is a modification of the designs shown in FIGS. 28A and 28B and 29A and 29B;

FIG. 49 is a first perspective view of an exemplary barrier system for a coastal region, constructed on a beach, comprising five different rows of armor protection constructed from different breakwater construction blocks of the present invention disclosed herein, wherein the first row closest to the ocean front is formed from the low-profile breakwater construction blocks shown in FIGS. 16A through 16D, the second row is formed from the flat-top breakwater construction blocks shown in FIGS. 13A through 13D and interconnected by tie rods, the third row is formed from flat-top breakwater construction blocks shown in FIGS. 12A through 12E and interconnected by shear key blocks shown in FIG. 30A which is a modification of the design shown in FIGS. 28A and 28B, the fourth row is formed from mini-tower breakwater construction blocks shown in FIGS. 11A through 11F and interconnected by shear key blocks shown in FIG. 30A and FIGS. 28A through 29B, and the fifth row is formed from tower-type breakwater construction blocks arranged together with or without shear key blocks;

FIG. 50 is a second perspective view of the barrier system shown in FIG. 49;

FIG. 51 is a flow chart describing the steps involved in practicing the method of the present invention, for construction of erosion-protection systems using preassembled subsystems, banding techniques and interlocking shear key blocks;

FIG. 52 is a perspective view of a subsystem of breakwater construction blocks and interlocking shear key blocked assembled together on land, banded together and transported to the designated construction site location for installation, using a crane system or the like; and FIG. 53 is a schematic representation of the resultant system constructed by assembling a number of subassemblies illustrated in FIG. 52, in accordance with the method described in FIG. 51.

DETAILED DESCRIPTION OF THE ILLUSTRATIVE EMBODIMENTS OF THE PRESENT INVENTION

Referring to the accompanying Drawings, like structures and elements shown throughout the figures thereof shall be indicated with like reference numerals. As used in this Patent Specification and in the Claims to Invention herein, the term "block" shall include, but is not limited to the terms "unit", element", "structure" and "component", which shall be embraced by the term "block."

Years of research and experience have been applied to develop the new and improved features of the improved breakwater construction block designs, and interlocking shear key block designs of the present invention, as well as the disclosed methods of and apparatus for manufacturing the same in accordance with the principles of the present invention disclose herein.

Figure 6A:
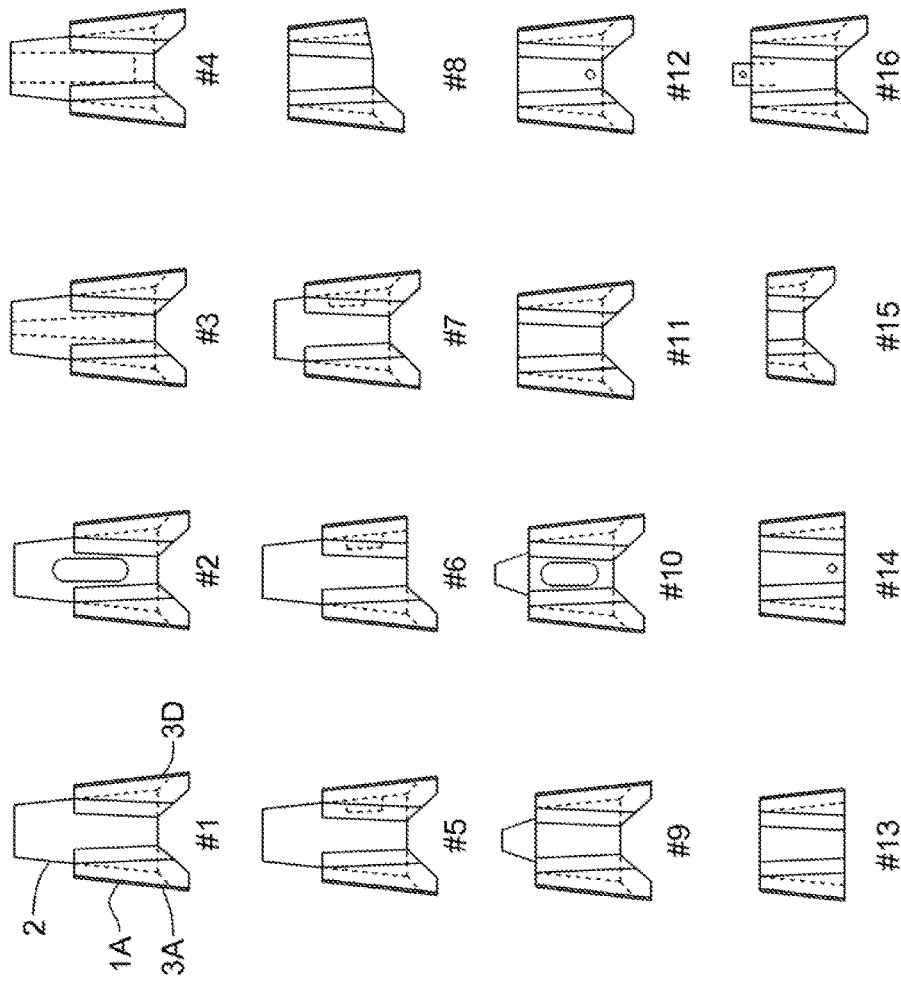
FIG. 6A is an elevated partially-cross-sectional view of a family of improved breakwater construction blocks of the present invention which can be manufactured using a single modular-type multi-form breakwater construction block molding system of the present invention, illustrated in FIGS. 7 through 9.
Figure 6B:
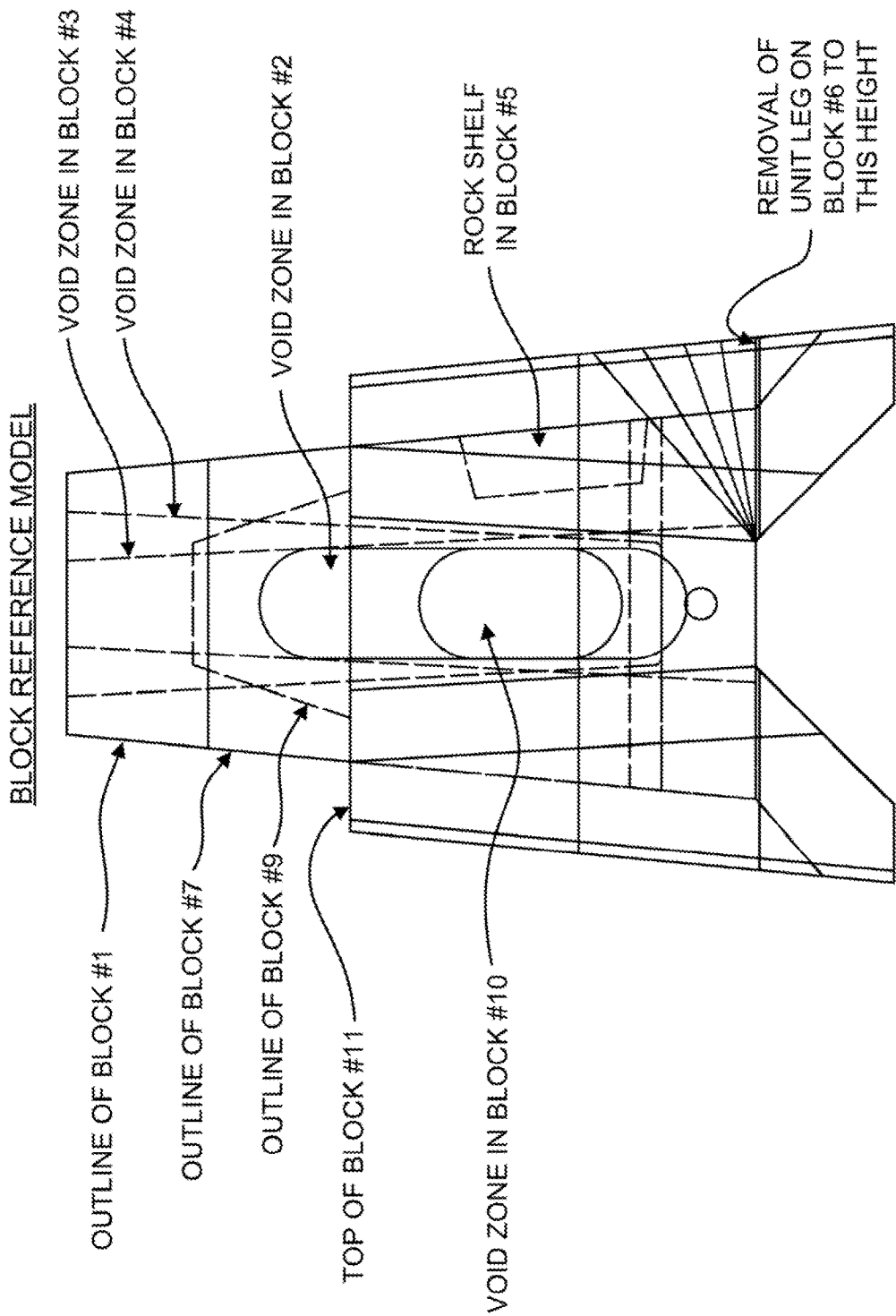
FIG. 6B is a schematic representation illustrating all of the side and cross-sectional dimensions of the family of improved breakwater construction blocks of the present invention shown in FIG. 6A, and illustrating how all of these different breakwater construction blocks can be molded (i.e. formed) using the same modular-type multi-form breakwater construction block molding system illustrated in FIGS. 7 through 9.

Specification of Improved Breakwater Construction Blocks of the Present Invention Which can be Manufactured Using a Modular-Type Multi-Form Breakwater Construction Block Molding System FIG. 6A shows a family of improved breakwater construction blocks of the present invention which can be manufactured using a single modular-type multi-form breakwater construction block molding system of the present invention, illustrated in FIGS. 7 through 9. In a single cross-sectional type schematic, FIG. 6B illustrates the side and cross-sectional dimensions of the family of breakwater construction blocks shown in FIG. 6A. All of these different breakwater construction block designs can be molded, formed or produced from the modular-type multi-form breakwater construction block molding system illustrated in FIGS. 7 through 9, using form attachments, form inserts and filler segments to modify the features of the block designs, and increase the stability factor of the blocks for specific engineering projects. Such modifications to the basic block design produce improved breakwater construction blocks having significantly improved degrees of stability as, for example, the height of the rear leg portions are reduced, as shown by the three lines in FIG. 6B above the right leg of the level unit, so that one can increase the batter and increase the stability of the work constructed from the construction blocks. In many applications, there may be the need to increase the stability of a marine structure by decreasing the surfaces of the breakwater construction block which are influenced by, or otherwise respond to, the hydraulic forces and energy of the water and waves of an ocean, a river or body of water, in the application under consideration. In other applications, there might be a need to slow down the velocity of water to allow suspended sand to collect about the structures to prevent beach and/or coastal erosion as the case may be. Such design tradeoffs and balances will be considered by the design engineer, and further discussed in greater detail hereinafter.

It is an object of the present invention to provide a new and improved modular-type block molding system employing mold inserts, fillers and other devices that enabled the molding of diverse family of breakwater construction blocks having the inventive features shown in FIGS. 6A and 6B, which are required for river and coastal engineering products. As will be described hereinafter, this flexible block molding technology enables engineers to flexibly produce breakwater (i.e. armor) construction blocks having multiple shapes, each with varied void ratios and stability factors, that will satisfy the design criteria for virtually any water and erosion control design problem.

Another object of the present invention is to provide a block molding system that allows the design engineer to easily produce breakwater construction blocks enjoying the many benefits associated with (i) various void zones (e.g. flow through channels), (ii) diverse shape factors, and (iii) proper placement of the construction blocks. When properly designed and placed in strategic locations, void zones formed in breakwater construction blocks provide the design engineer with structures having increased stability, plus being suitable for additional applications. The void zone shapes can be circular, elliptical or conical and will depend on its application. Also the breakwater construction block designs can be made having various depths and heights, the stepped-type breakwater construction blocks can be constructed for slope installations, plus elimination of select void zones, for the fast erection of failed stone structures during severe storms or hurricanes.

By providing large void zones in the stacked breakwater construction blocks, the build up hydrostatic head pressure behind the wall can be greatly reduced, allowing water to flow through and out the resulting constructed work, with the breaking of each ocean wave. Also, and interlocking shear key block designs of the present invention, which function to link neighboring breakwater construction blocks loosely together, can be designed with different heights to close off the space between neighboring breakwater construction blocks of the present invention, as applications may require. At the same time, sufficient flexibility can be provided at the intersection of each interlocking shear key block, so that when struck, hit and hammered by the peaks forces of ocean waves, these constructed works can respond without breakage, yet maintain their structural integrity and continue to perform as intended.

In the case of ocean-groin structures, various permeabilities can be accomplished by providing void zones through the breakwater construction blocks and using the interlocking shear key blocks having multiple heights, installed between the breakwater construction blocks. Improved control of violent wave action can be achieved by off-setting of the breakwater construction blocks in a selected pattern.
Specification of the First Illustrative Embodiment of the Improved Breakwater Construction Block of the Present Invention, and its use with the Trapezoidal-Type Shear Key Blocks of the Present Invention to Create Diverse Types of Water Permeable and Water-Permeable Marine Structures, for Horizontal, Vertical and Inclined Installation In FIGS. 7A through 7E, the first illustrative embodiment of the improved breakwater construction block of the present invention 1A is shown comprising: a central trapezoidal core portion 2 of substantially trapezoidal cross-sectional dimensions; a set of four trapezoidal support legs 3A through 3D, each extending from one corner of the central trapezoidal core portion in a radially-extending manner; a bottom portion 6 of substantially planar dimensions, raised off a support surface 8 by a distance d determined by the distance that the leg portions 3A through 3D extend beyond the bottom planar surface 6 of the core portion 2; and a tower-type portion 4 (e.g. at least ½ the height of the central trapezoidal core portion) extending axially along the central axis 5 of the central trapezoidal core portion 2, and having a planar top surface 7. The purpose of the tower-type portion 4 is to break up and slow down the flow of water passing over the central trapezoidal core portion 2, and allow sand suspended in water to settle within the breakwater construction work erected on the beachfront, oceanfront or coastal waterway.

The rugged breakwater construction blocks of the present invention shown in FIG. 6A have been designed for building water impermeable and water-permeable marine structures, alike, such as sea walls, bulkheads, and impermeable ocean-groins, as required by the application at hand. In order to construct these marine structures, the present invention also employs trapezoidal-like interlocking shear key blocks 10A, shown in FIGS. 28A through 29B, that fit precisely between the interstices 11 formed between neighboring breakwater construction blocks 1A and 1A, as shown in FIGS. 30A through 30D, to create a structural interface and seal 12 between each breakwater construction block/interlocking shear key block arrangement formed thereby.

FIG. 30A shows an exemplary section of a marine construction (e.g. seawall, oceanwall, riverwall, erosion-protection structure) employing the tower-type type breakwater construction block 1A shown in FIGS. 8A through 8E and the interlocking shear key block design 10A' which is a slight modification from the designs shown in FIGS. 28A and 28B, where the breakwater construction blocks are spaced closely together and the length of the interlocking shear key block is equal to the total length of the central core portion and its tower portion, to form a tight fluid seal. As shown in FIG. 30A, interlocking shear key design 10A has substantially planar side surfaces, whereas side surfaces in the interlocking shear key block designs shown n FIGS. 28A through 28B have notches or grooves extending along the length of each side surface.

Figure 30B:
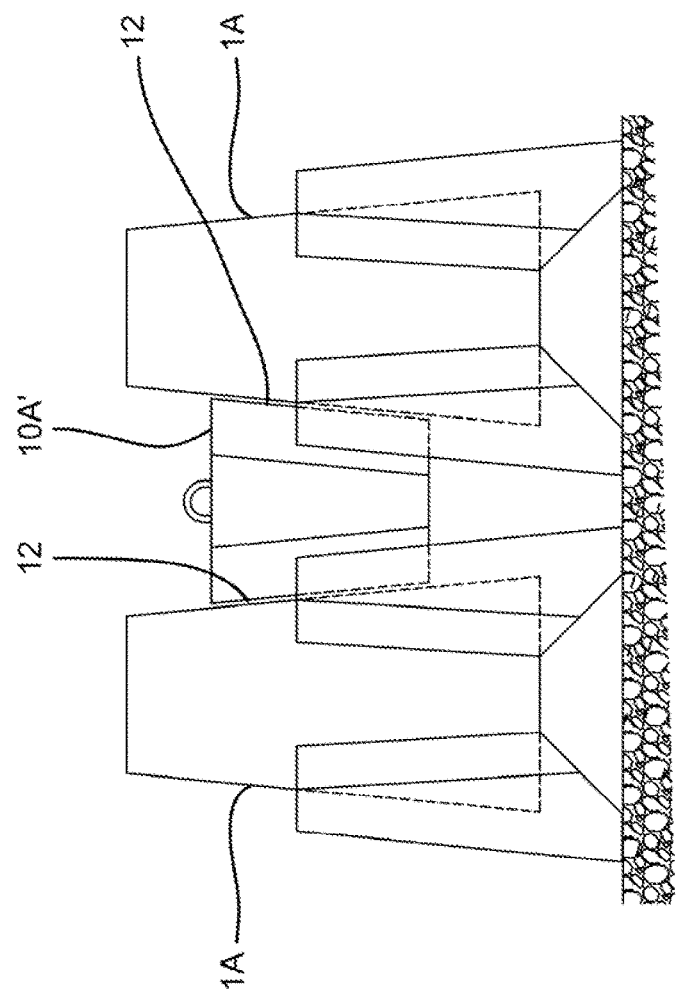
FIG. 30B is an elevated side view of a second arrangement showing a pair of tower-type breakwater construction blocks of the design show in FIGS. 7A through 7E, assembled together along a single tier, in a side by side relationship, with spacing between the trapezoidal leg portions as shown, and interconnected by an interlocking shear key of the design shown in FIG. 30A, of a length shorter than the shear key block shown in FIG. 30A, inserted between the adjacent breakwater construction blocks, to create an erosion-protection barrier.

FIG. 30B shows an exemplary section of a marine construction employing the tower-type type breakwater construction block 1A shown in FIGS. 8A through 8E and the interlocking shear key block design 10A' shown in FIG. 30A, where the breakwater construction blocks are spaced apart and the length of the interlocking shear key block is equal to about half of the total length of the central core portion and its tower portion.

FIG. 30C shows an exemplary section of a marine construction employing the flat-top type breakwater construction block 1D shown in FIGS. 12A through 12E and the interlocking shear key block design 10A' shown in FIG. 30A, where the breakwater construction blocks are spaced apart and the length of the interlocking shear key block is equal to about half of the total length of the central core portion and its tower portion.

Figure 30D:
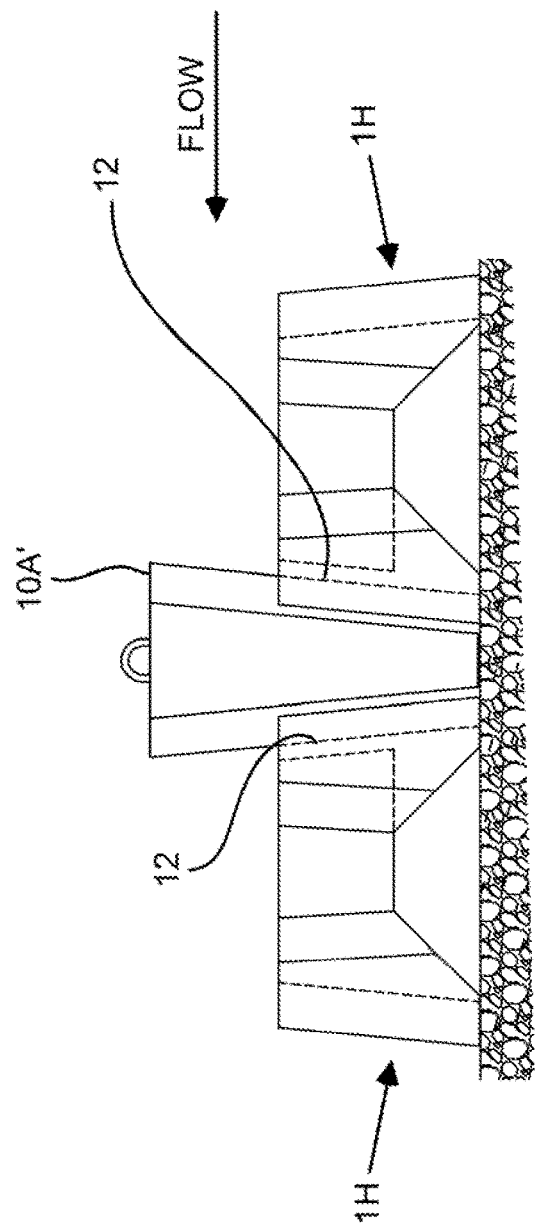
FIG. 30D is an elevated side view of a fourth arrangement showing a pair of low-profile type breakwater construction blocks of the design show in FIGS. 16A through 16D, assembled together along a single tier, in a side by side relationship, with spacing between the trapezoidal leg portions as shown, and interconnected by an interlocking shear key of the design shown in FIG. 30A, inserted between each adjacent breakwater construction blocks, to slow down the velocity of water flowing over the blocks and cause suspended sand to collect about the block structures.

FIG. 30D shows an exemplary section of a marine construction employing the low-profile breakwater construction block 1H shown in FIGS. 16A through 16D and the interlocking shear key block design 10A' shown in FIG. 30A, where the breakwater construction blocks are spaced apart and the length of the interlocking shear key block is nearly twice the total height of the breakwater construction block 1H.

These block assemblies can be used to construct water, sand, and/or soil impermeable sea walls, erosion-protection systems, and other kinds of marine-engineering works, as required in many civil-marine engineering applications. Hereinafter, numerous examples and illustrations will be provided on how this novel marine engineering technology can be applied to solve diverse engineering problems.

Attention is now turned to the basic improved breakwater construction block designs, and improved methods for manufacturing the same, along with the interlocking shear key blocks that interconnect the breakwater construction blocks, in accordance with the principles of the present invention. In general, the breakwater construction block design 1A shown in FIGS. 7A through 7E has a total height to widest base dimension (H/W) ratio of approximately H/W=5/3, which can be scaled to any practical size, as required by the construction application at hand.

Also, preferably, a notch 9 is formed in the outer surface of the middle of each leg portion 3A through 3B, to allow each block to be banded together with other blocks while assembled as a subsystem 30, as shown in FIGS. 51 through 53. Breakwater construction block design 1A can be further modified to include additional features that will provide added functionality and performance to the constructed block, selected on the end-user application, for example: (i) pass-through channels (e.g. void zones) 11 as shown in FIGS. 18A through 18E that allow water to flow therethrough with minimal hydraulic resistance, and thus providing more stability in ocean-groin type constructions, in particular; (ii) recessed surface voids 15 formed on the outside rear surface of the central portion of the breakwater construction blocks 1B, as shown in FIGS. 39 and 39A, to allow crushed rock in a rock shelf to integrate with an assembly of breakwater construction blocks of the present invention; (iii) truncated rear leg portions 16, and also optionally truncated portions of the lower rear portion of the central core portion 2, as shown in FIGS. 10B1 through 10B4, and 14A through 14E, and illustrated by the dotted lines indicated in FIGS. 6B, to increase the batter of wall structures constructed using such modified breakwater construction blocks 1B, 1F, and interlocking shear key blocks used to build such works of civil engineering and design, as illustrated in FIGS. 39A, 41A, 42B; (iv) modified height, surface geometry and/or features of the top (i.e. tower) portion 4, as shown in FIGS. 11A through 11E, 12A through 12E, 14A through 14E, 15A through 15D, and 19A through 19E; (v) modified height of the central core portion and top portion of the breakwater construction block, as shown in FIGS. 16A through 16D; and (vi) modified specific density of the central core portion 3, by molding voids 17 therein during a first stage of manufacture, and then filling in the voided region with a higher density concrete material 18 during a subsequent manufacturing stage, as shown in FIGS. 20A through 20D, and 21A through 21C and 21D and 22E; (vii) modified central core portion 3 by molding an axially void 19 is formed therein during block manufacture, so that a pile or like structure can be passed through the breakwater construction block 1I as shown in FIGS. 17A through 17E, and into the earth for increased stability; and (viii) modified central core portion 3 to include a mounting post or attachment 20. These modifications to the basic "reference" breakwater construction block 1A shown in FIGS. 7A through 7E, provide added features identified above, and specified in Block Reference Model of FIG. 6B, which will be described in greater detail hereinafter.

Transportable ISO-Shipping Container Block Factory System for Manufacturing the Family of Breakwater Construction Blocks and Interlocking Shear Key Blocks of the Present Invention, at any Construction Site Around the World As shown in FIGS. 8A through 10A, an object of the present invention is to provide a transportable breakwater construction block factory system 35, contained within an ISO-shipping container 36, stored at a warehouse 38, for dispatch and shipment (e.g. via rail, air, roadway or sea) to a remote work site location 40, near an oceanfront, for in situ manufacturing of breakwater construction blocks 1A through 1M, and interlocking shear pin key blocks 10A, 10B of the present invention. In the illustrative embodiment of FIGS. 8C through 8D, the ISO-shipping container 36 is transported by a tractor-trailer combination comprising a tractor 37A pulling a trailer 37B, carrying ISO-shipping container 36.

As shown in FIGS. 8A through 8E, the breakwater construction block manufacturing system 39 comprises: the ISO-shipping container 36 containing a plurality of multi-form block molding subsystems 41 for simultaneously molding break water construction blocks 10A through 10M, and block molding subsystems 42 for interlocking shear key blocks 10A, 10B, wherein each subsystem has a base mold portion 41A, 42A that is mechanically coupled to the factory floor 38, and a side molding portion 41B, 42B being mechanically coupled with a movable framework 43, operated manually or using hydraulics, so that all or multiple groups of side mold portions (for the construction blocks and the matching key blocks) can be simultaneously lift (e.g. by a hydraulic crane on site) and remove the side mold portions from molded concrete blocks; top mold portions 41C; and fillers, attachments, etc 44 for modifying the breakwater construction block and shear key block molds to realize the required design features in the concrete blocks to be manufactured. The actual number of multi-form block molding subsystems 41, 42 actually installed on the transportable factory platform 38, and contained within the ISO-shipping container 36, will depend on several factors including the H/W ratio of the breakwater construction block design, the number of interlocking shear key block designs supported by the system, the length of the interlocking shear key blocks, etc.

As shown in FIG. 8E, the transportable block manufacturing system 39 is designed for use with locally-supplied hydraulically-powered cranes 45, concrete mixers 46, tractors 47, and other equipment (e.g. generators, jack hammers, rock drills, GPS tracking equipment, i etc) 48 arranged about the breakwater construction block factory platform 38 temporarily set up at a construction work site 40 where the breakwater construction blocks and interlocking shear key blocks of the present invention are to be efficiently manufactured using the multi-form block molding technology of the present invention. When the concrete has set (e.g. typically within 5-6 hours), these formed blocks can be removed from their molds, brought to a holding zone for a curing time of several days, and then transported to GPS-specified locations on the construction work site. At the work site, the formed blocks can be assembled together, to construct the any system design under construction with an unprecedented level of efficiency, flexibility and economy.

For breakwater construction blocks having a total block height of 5 feet and base dimensions of 3+ feet, it will be possible to install at least 20 (2×10) breakwater construction block molding subsystems 41, 42 on the factory platform 38 slidably received with an 8×8×40 ISO-shipping container having a length of 40 feet, a width of 8 feet and a height of 8 feet. Alternatively, at least 10 breakwater construction block molding subsystems 41, and at least 10 interlocking shear key block molding subsystems 42, can be mounted on the factory platform 38 that slides within a 8×8×40 ISO-shipping container. In some arrangements, it may be desirable to mount only breakwater construction block molding subsystems 41 on the factory platform 38 of a first ISO-shipping container, and mount all interlocking shear key block molding subsystems 42 on a separate factory platform in another ISO shipping container. This way, multiple ISO-shipping containers will be sent to the construction site to build a portable block molding system of the present invention.

In some applications of the present invention, multiple ISO-shipping container block factories will be required to meet the block manufacturing demands of any given construction project, anywhere around the world. Each ISO-shipping container can contain block molding subsystems on the factory platform designed to produce blocks required by the project design. As ISO shipping containers have size restrictions determined by the standards, it is understood that each molding subsystem can be dismantled into its basic components during shipping/transport, in applications where the height of the breakwater construction blocks exceeds the 8-9 foot height limitations, and the base width of the blocks exceeds the 8 foot limitations of most ISO-shipping containers.

Figure 3:
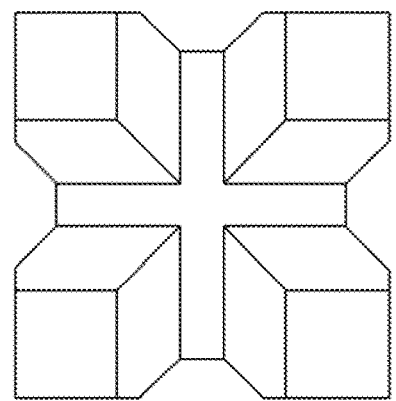
FIG. 3 is a bottom view of the prior art breakwater construction block shown in FIG. 1.

Specification of the Multi-Form Block Molding Subsystem Configured for Different Breakwater Construction Block of the Present Invention FIGS. 9A1 and 9A3 shows a breakwater construction molding subsystem of the present invention 41, mounted on the factory platform 38, configured together and ready for concrete to be poured into the mold, through the top pour opening, to form a tower-type breakwater construction block 1A as shown as No. 1 in FIG. 6A.

FIGS. 9B1 through 9B3 show the steps that are performed after a block is molded. In FIG. 9B1, the top mold portion 41C is removed from the side mold portion 41B, and then in FIG. 9B2, the side mold portion 41B is slidably-lifted off the formed block. The final step involves lifting the molded block off the base portion 41A.

FIG. 9C1 shows a breakwater construction molding subsystem of the present invention 41, mounted on the factory platform 38, configured together and ready for concrete to be poured into the mold, and form a concrete breakwater construction block 1D shown in FIGS. 12A through 12E and identified by Block "#11" (i.e. flat top design) in FIG. 6A. After concrete is poured through the top opening of the side mold portion 41B, the side mold portion 41B is slid off the cured block, and thereafter, the block 1D is lifted off the mold base portion 41 by a crane, lift or other suitable device.

FIGS. 9D1 through 9D8 shows the breakwater construction molding subsystem configured for a tower-type breakwater construction block 1J with flow through channel 14, as shown in FIGS. 18A through 18E and identified by Block #2 in FIG. 6A (tower-type with side flow channel). The water flow channel (i.e. a positive void-ratio) 14 allows free flow passage of water through the structure, and lowers the resistance of the block to hydraulic flow. This flow channel decreases the weight of the block but increases the porosity (i.e. flow characteristics) thereof. This block design can be used to construct a permeable ocean-type groin, generally-erected perpendicular to the ocean shoreline, as shown in FIGS. 36A through 36F.

Figure 2:
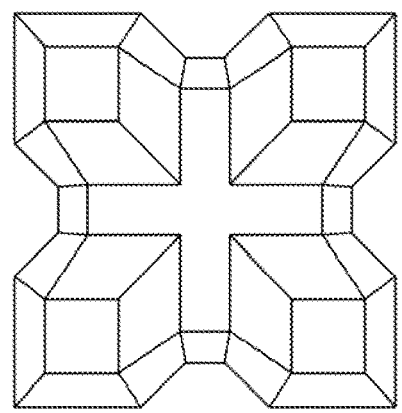
FIG. 2 is a top view of the prior art breakwater construction block shown in FIG. 1.

As shown in FIGS. 9D1 through 9D8, these pass-through channels (i.e. void zones) 14 can be formed using a pair of paraboloid-type channel molding sections 41D1 and 41D2 (e.g. formed from metal, plastic and/or foam) that are joined in the midsection of the side mold portion 41B. As shown in FIGS. 9D1 and 9D2, each flow channel molding section 41D1, 41D2 has an integrated handle portion 41E for pulling the molding section out of a molded concrete block 1D, and also a pair of spring-loaded releasable locking mechanisms 41F1 and 41F2 (about the outer side of the molding section) which releasably locks with the aperture 41B1, 41B2 formed in the side molding section 41B to which the channel molding section 41D1, 41D2 attaches, during mold configuration and concrete pouring operations. After the side molding portion 41B has been attached to the mold base portion 41A, then the flow channel molding portions 41D1 and 41D2 are slid through apertures 41B1 and 41B2 in the side mold portion 41B and slidably joined together in the middle of the side mold section 41B. Spring-loaded releasable locking mechanisms 41F1 and 41F2 in the flow channel mold portions 41D1 and 41D2 engage with the top and bottom portions of the apertures 41B1 and 41B2, respectively, on opposite sides of the side mold section 41B, and hold the joined together flow channel mold portions 41D1 and 41D2 together in place during concrete pouting and curing operations. Thereafter, the top mold portion 41C is attached to the side mold portion 41B.

After concrete has been poured into the configured mold, through the top opening of top mold section 41C, and it has sufficiently cured, then the top molding portion 41C is ready to be slid over and off from the top portion of the concrete block 1D. Then the side mold portion is ready to be slid off the concrete block 1D, But first, the releasable lock mechanisms 41F1 and 41F2 must be released from the outer apertures 41B1 and 41B2 formed in the flow channel molding sections 41D1 and 41D2, respectively. These flow channel mold sections 41D1 and 41D2 will remain in the molded concrete block after the side mold section 41B is slid off the molded concrete block. To remove these channel mold sections 41D1 and 41D2 from the molded concrete block, the user manually pulls the integrated handle 41E in the outside of each channel mold section, and then pulls the channel mold section out from the molded channel 14 within the concrete block 1D. Preferably, the channel mold sections 41D1 and 41D2 will be made from a material which is non-porous and slippery to concrete once cured so that the cured concrete material does not bond to the channel mold sections. Lubricants can be added to the outer surface of the channel mold sections to facilitate the release of the channel mold sections from the molded concrete block, as is well known in the concrete block manufacture art.

While formation of paraboloid channels 14 in breakwater construction blocks 1D has been discussed above, it is understood that such void zones 14 can be made with circular, elliptical or conical cross-sections through the overall breakwater construction block. When void zones 14 are properly designed and placed in strategic locations in the central core portion 2 of the breakwater construction block, the design engineer can build blocks that demonstrate increased stability in diverse applications in the field of civil and marine engineering. Such void zones and flow through channels increase the porosity of the breakwater construction blocks and this generally guarantees a higher stability factor when the blocks are subjected to wave action.

Alternatively, void zones can be formed half-way, quarter-way or three-quarters-way through the breakwater construction blocks. In such designs, where the void zones do not pass completely through the central core portion of the block, the central core portion 2 of the block can be provided with integrated heat exchange coils, to facilitate the exchange of thermal energy between water within the voids, and heat exchange fluid passing through the heat exchange coils.

Figure 9E:
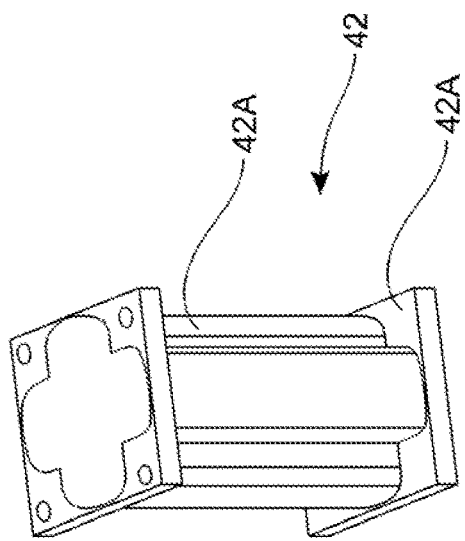
FIG. 9E shows a trapezoidal interlocking shear key block molding subsystem designed for moolding the trapezoidal interlocking shear key blocks shown in FIGS. 28A and 28B.

Specification of Molding Operations for the Trapezoidal Interlocking Shear Key Blocks of the Present Invention FIG. 9E shows a trapezoidal interlocking shear key block molding subsystem 41 in greater detail. While this molding subsystem is designed for molding the trapezoidal interlocking shear key block 10A shown in FIGS. 28A and 28B, it can be readily adapted to mold the interlocking shear key block 10B shown in FIGS. 29A and 29B, and other variations of such shear key blocks.

In general, the trapezoidal shear key block molding subsystem 41 comprises: a base mold portion 41A for molding the surface features of the bottom of each interlocking shear key block 10A 10B; and a side molding portion 42B for molding the trapezoidal surface features of each trapezoidal interlocking shear key block 10A, 10B. The mold sections 42$a$ and 42B can be made from metal, plastic and/or any other suitable material that is strong and durable enough to allow the mold/form withstand the pressure generated from poured concrete before and while it is cured.

Preferably, each interlocking shear key (i.e. wedge) block 10A (10A') includes an integrally formed hook 10A1 (e.g. made from steel or other metal) that is inserted into the top core portion of the shear key block before concrete into the top opening of the mold has had an opportunity to cure. Interlocking shear key (i.e. wedge) block 10B (10B') includes an integrally formed hook 10B1. Once cured, the hook portion 10A1 is securely connected to the core portion 10A2 of the interlocking shear key block 10A, and can support the full weight thereof during lifting, transport and placement operations during construction work. During construction work, the hook 10A1 (10B1) will be used to pickup and place these shear key blocks 10A, (10A'), 10B, (10B') into trapezoidal interstices 11 formed between neighboring breakwater construction blocks 1H.

Specification of the Breakwater Construction Block of the Second Illustrative Embodiment of the Present Invention Having a Pair of Truncated Leg Portions and Trimmed Central Core Portion It has been discovered by Applicant that the breakwater construction blocks of the present invention can be battered (or reinforced in terms of the strength and stability) by removing the rear leg portions and trimmed portions of the central core portion of the breakwater construction block 1A so that that the resulting block 1B (i) has increased batter (i.e. incline with respect to the normal), or (ii) adapts to an inclined surface on which the blocks are mounted or installed, and demonstrate increased stability in the constructed works. This truncated block design is shown in FIGS. 10B1 through 10B4 and 14A through 14E, and provides new shape for the speedy erection of revetments, and other marine structures, can be erected on incline surfaces of up to 60 or so degrees with excellent performance results.

The shape factor of the battered breakwater construction block 1B in FIGS. 10B1 through 10B4 is achieved by removing the tower top mold/form portion 41C, and inserting a sloped filler section 41G at the bottom of the base mold portion 41A, conform to slope angle requirements for a specific project, as illustrated in FIG. 10A. The sloped filler section 41G also truncates leg portions 3A' and 3D', and also removes a portion of the bottom of the central core portion 2 of the breakwater construction block 1B. Depending on the application and engineering requirements, the slope of the filler section 41G could be as large as 60 or so degrees, to allow the resulting breakwater construction block 1G to be erected or mounted on an inclined surface of 60 or so degrees, so that the central axis 5 of the block is normal to the Earth's surface (i.e. gravitational forces) and the top surface 7B of the block is parallel with the level of the sea.

As shown in FIGS. 10B1 through 10B4, the second improved breakwater construction block of the present invention 1B comprises: a central trapezoidal core portion 2 of substantially trapezoidal cross-sectional dimensions; a set of four trapezoidal support legs 3A' through 3D', each extending from one corner of the central trapezoidal core portion 2 in a radially-extending manner; and a pair of the trapezoidal support legs 3A' and 3D' being truncated at its bottom end; and a tower-type portion 4 (e.g. at least ½ the height of the central trapezoidal core portion) extending axially from the central trapezoidal core portion 2 for breaking up and slowing down the flow of water passing over the central trapezoidal core portion of the breakwater construction block. This breakwater construction block design can be used in combination with any of the interlocking shear key blocks of the present invention illustrated in FIGS. 28A through 29B and FIG. 30A.

As shown in FIGS. 39 and 39A, a seawall is constructed from the interlocking of a set of tower-type breakwater construction blocks 1B (i.e. H/W=5/3) using the interlocking shear key blocks 10A, shown in FIGS. 28A and 28B. The interlocking is achieved by installing (e.g. lowering onto place) interlocking shear key block 10A between each neighboring pair of tower-type breakwater construction blocks 1B to form an impermeable seawall revetment structure 100, constructed with great economy.

Figure 11A:
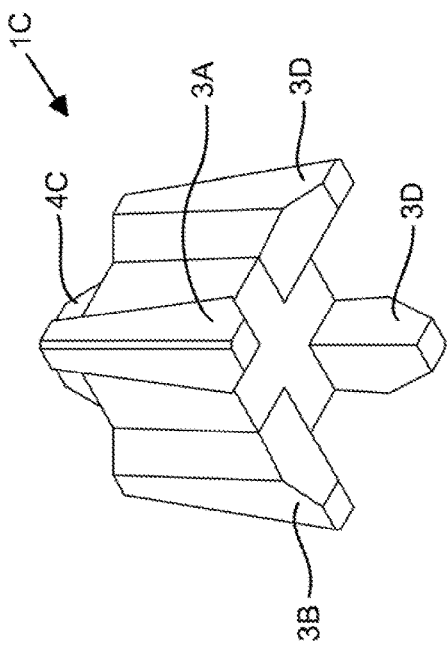
FIG. 11A is a upper perspective view of a third illustrative embodiment of the improved breakwater construction block of the present invention, having a central trapezoidal core portion of substantially trapezoidal cross-sectional dimensions, a set of four trapezoidal support legs, each extending from one corner of the central trapezoidal core portion in a radially-extending manner, and a short top portion (e.g. ¼ the height of central trapezoidal core portion) extending axially from the central trapezoidal core portion for breaking up and slowing down the flow of water passing over the central trapezoidal core portion of the breakwater construction block and allowing suspended sand to settle within the breakwater construction.
Figure 11B:
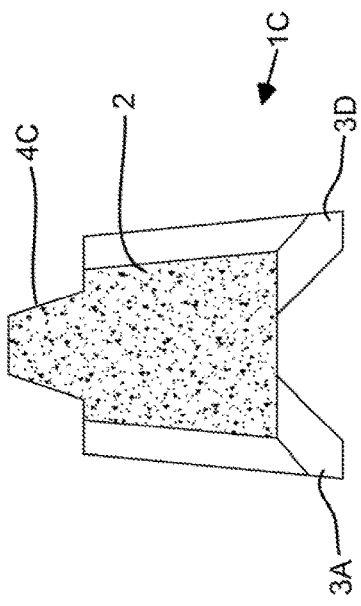
FIG. 11B is a bottom perspective view of the first illustrative embodiment of the improved breakwater construction block shown in FIG. 11A.
Figure 11C:
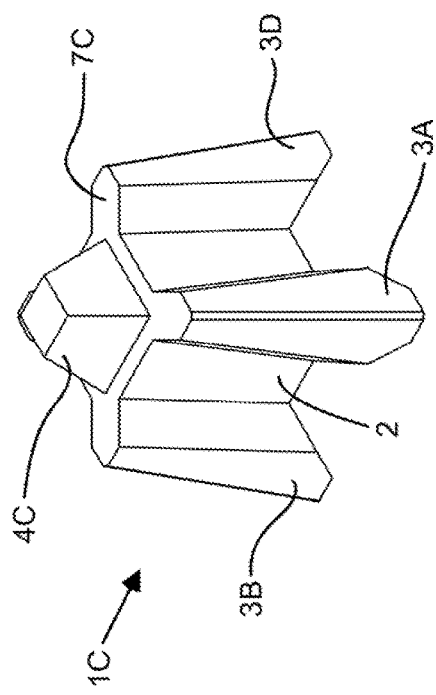
FIG. 11C is a top plan view of the first illustrative embodiment of the improved breakwater construction block shown in FIGS. 10A and 11B.
Figure 11D:
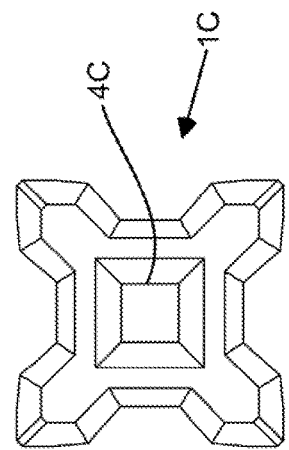
FIG. 11D is a cross-sectional view of the first illustrative embodiment of the improved breakwater construction block shown in FIGS. 11A, 11B and 11C, taken along its axial center.
Figure 11F:
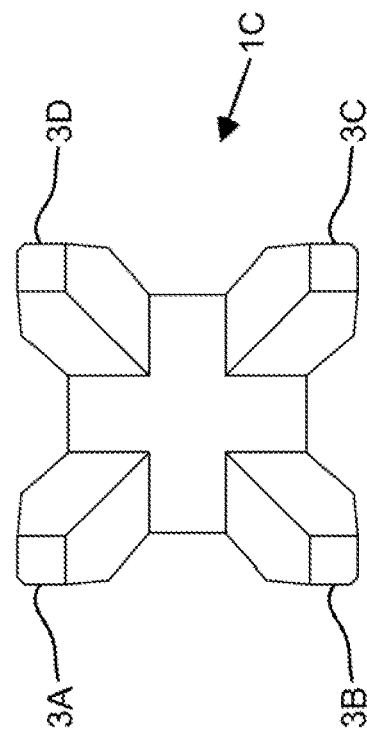
FIG. 11F is a bottom view of the first illustrative embodiment of the improved breakwater construction block shown in FIGS. 11A, 11B and 11C.
Figure 11E:
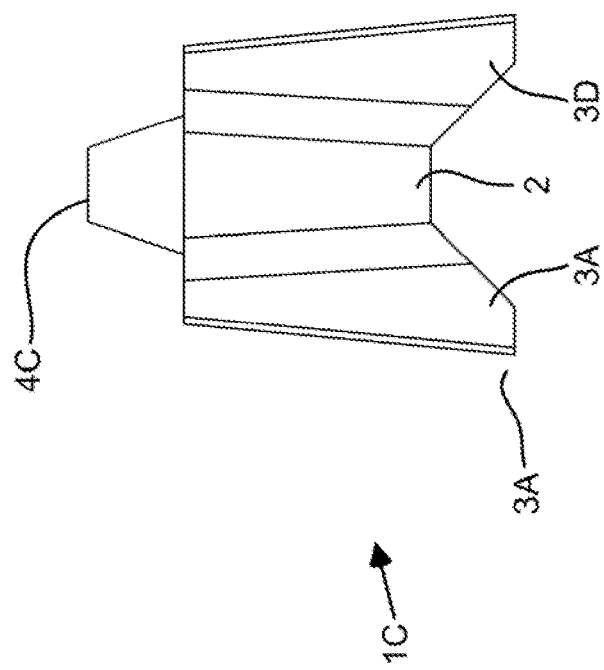
FIG. 11E is an elevated side view of the first illustrative embodiment of the improved breakwater construction block shown in FIGS. 11A, 11B and 11C.
Figure 12B:
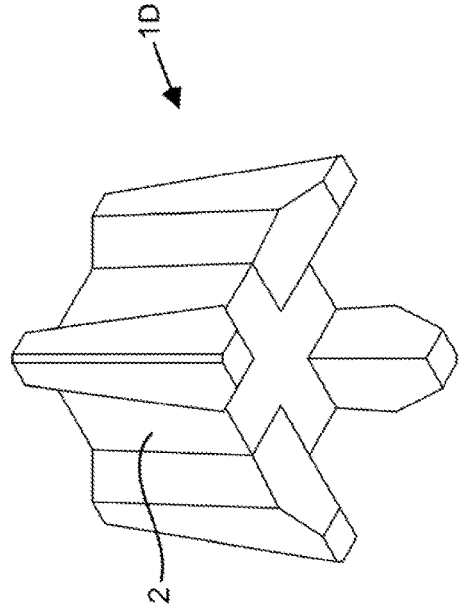
FIG. 12B is a bottom perspective view of the breakwater construction block shown in FIG. 12A.
Figure 12A:
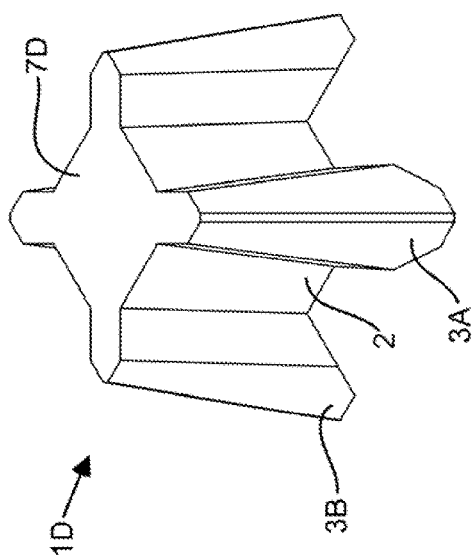
FIG. 12A is a top perspective view of a fourth illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, and a substantially flat top portion extending axially from the central trapezoidal core portion for allowing water to over the central trapezoidal core portion of the breakwater construction block and allowing suspended sand to settle within the breakwater construction.
Figure 12E:
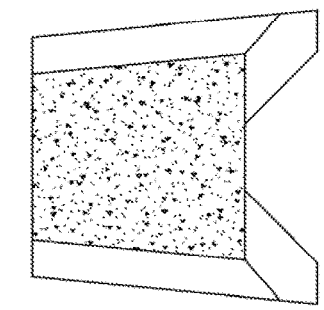
FIG. 12E is a side cross-sectional side view of the breakwater construction block shown in FIGS. 12A through 12D, taken along its axial center.
Figure 12D:
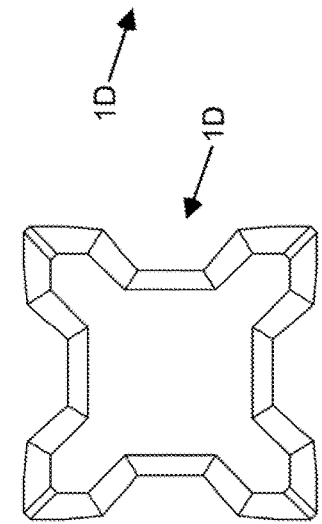
FIG. 12D is a plan view of the breakwater construction block shown in FIGS. 12A, 12B and 12C.
Figure 12C:
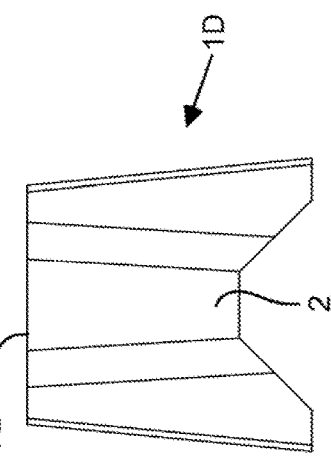
FIG. 12C is an elevated side view of the breakwater construction block shown in FIGS. 12A and 12B.
Figure 13A:
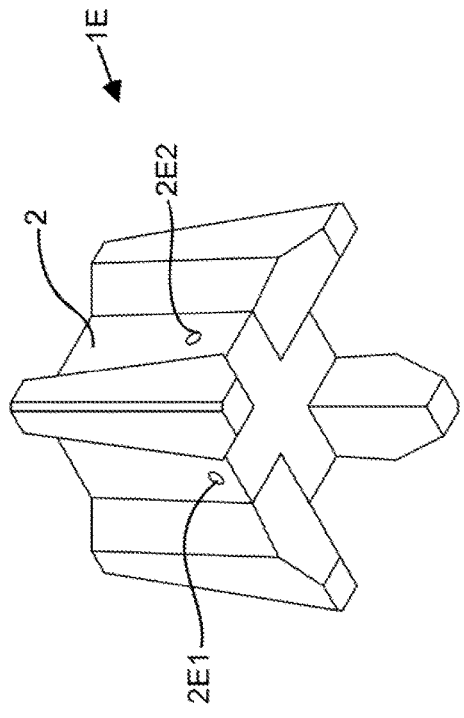
FIG. 13A is a top perspective view of a fifth illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, a substantially flat top portion extending axially from the central trapezoidal core portion for allowing water to over the central trapezoidal core portion of the breakwater construction block, and a pair of transverse bores passing through the central axis of the central trapezoidal core portion, at orthogonal directions so as to allow the passage of cable or tie rods to pass through each breakwater construction block and interconnect a group of breakwater construction blocks.
Figure 13B:
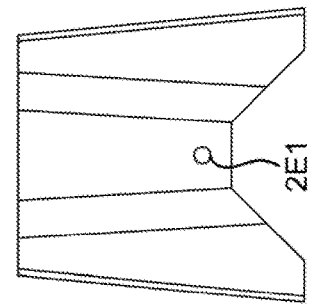
FIG. 13B is a bottom perspective view of the breakwater construction block shown in FIG. 12A.
Figure 13C:
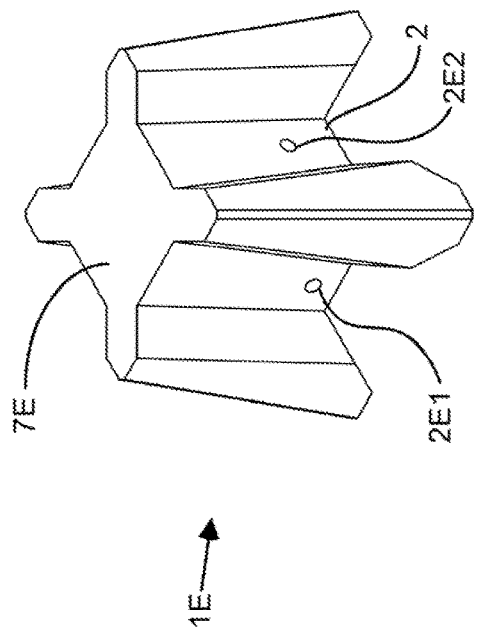
FIG. 13C is an elevated side view of the breakwater construction block shown in FIGS. 13A and 13B.
Figure 13D:
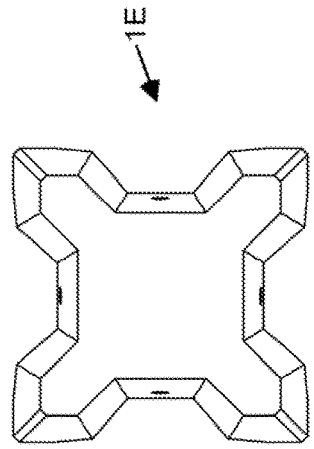
FIG. 13D is a plan view of the breakwater construction block shown in FIGS. 13A, 13B and 13C.
Figure 15B:
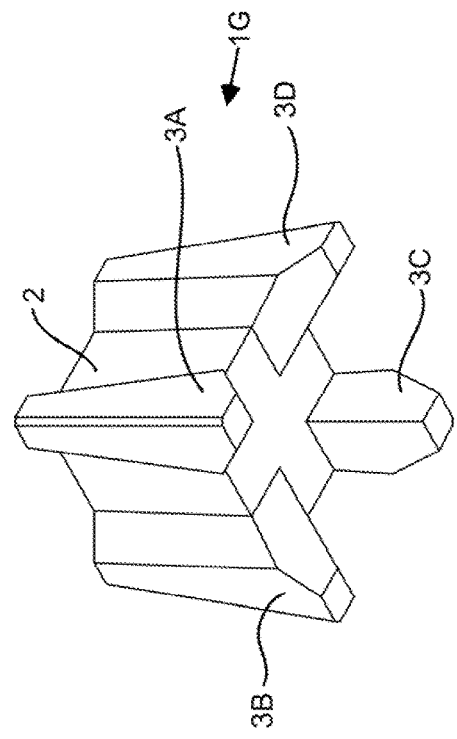
FIG. 15B is a bottom perspective view of the breakwater construction block shown in FIG. 15A.
Figure 15D:
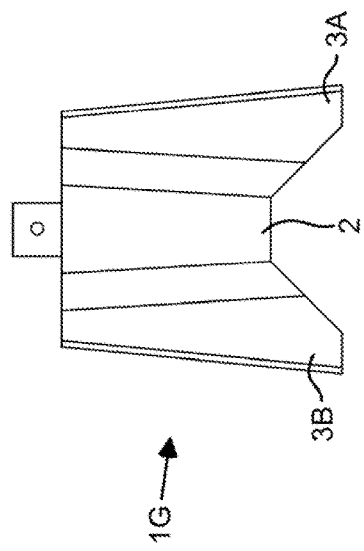
FIG. 15D is a side view of the breakwater construction block shown in FIGS. 15A, 15B and 15C.
Figure 15A:
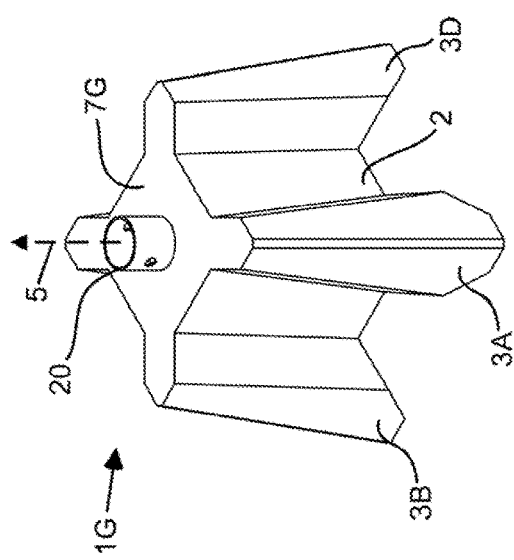
FIG. 15A is a top perspective view of a seventh illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, a substantially flat top portion extending axially from the central trapezoidal core portion for allowing water to over the central trapezoidal core portion of the breakwater construction block, and an axially-disposed shaft projecting along the central axis of the central trapezoidal core portion, and capable of supporting a device (e.g. instrument) while the breakwater construction block is mounted on the bottom of a streambed, riverbed or coastal shore or region, as the application may require.
Figure 15C:
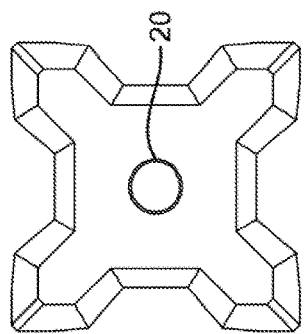
FIG. 15C is a top plan view of the breakwater construction block shown in FIGS. 15A and 13B.
Figure 16A:
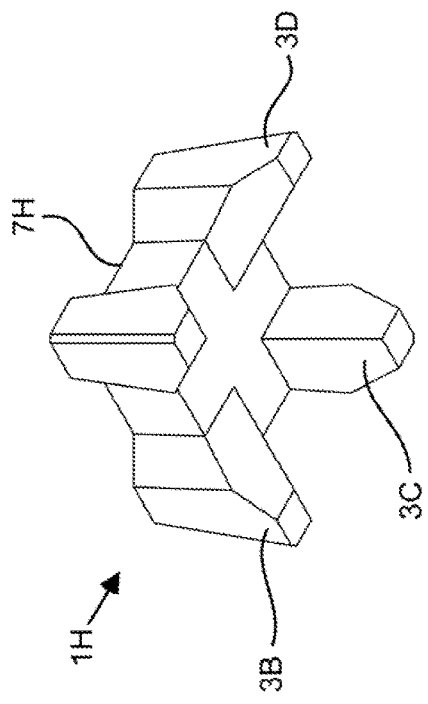
FIG. 16A is a top perspective view of an eighth illustrative embodiment of the improved breakwater construction block of the present invention shown having a short central trapezoidal core portion of substantially trapezoidal cross-sectional dimensions, a set of four trapezoidal support legs, each extending from one corner of the central trapezoidal core portion in a radially-extending manner, a substantially flat top portion extending axially from the central trapezoidal core portion for allowing water to over the central trapezoidal core portion of the breakwater construction block and allowing suspended sand to settle within the breakwater construction.
Figure 16B:
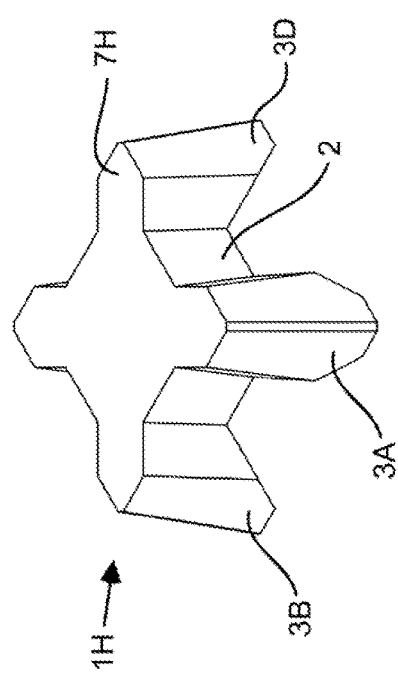
FIG. 16B is a bottom perspective view of the breakwater construction block shown in FIG. 16A.
Figure 16D:
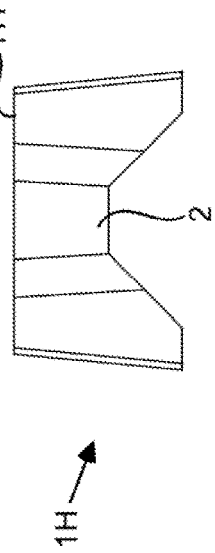
FIG. 16D is a side view of the breakwater construction block shown in FIGS. 16A, 16B and 16C.
Figure 16C:
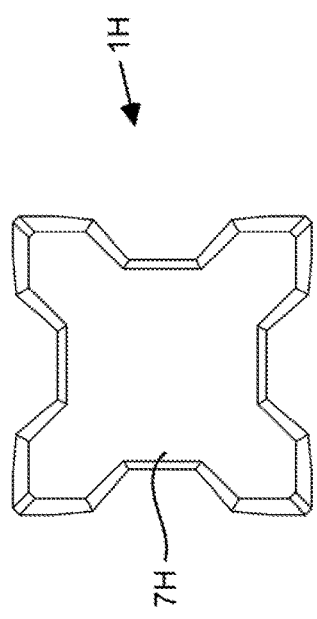
FIG. 16C is a top plan view of the breakwater construction block shown in FIGS. 16A and 16B.

Specification of the Breakwater Construction Block of the Third Illustrative Embodiment of the Present Invention FIG. 11A shows a third illustrative embodiment of the improved breakwater construction block of the present invention 1C comprising: a central trapezoidal core portion 2 of substantially trapezoidal cross-sectional dimensions; a set of four trapezoidal support legs 3A through 3D, each extending from one corner of the central trapezoidal core portion in a radially-extending manner; and a short "mini-tower" top portion 4C (e.g. ¼ height of central trapezoidal core portion) formed on top surface 7 and extending axially from the central trapezoidal core portion 2, for breaking up and slowing down the flow of water passing over the central trapezoidal core portion of the breakwater construction block 1C. This breakwater construction block design can be used in combination with any of the interlocking shear key blocks 10A illustrated in FIGS. 28A through 29B. To mold the mini-tower top portion of the breakwater construction block 1C, a different top mold portion 41C' would be used that conforms to the geometry of the mini-tower top portion 4C of the block 1C.

Specification of the Breakwater Construction Block of the Fourth Illustrative Embodiment of the Present Invention FIGS. 12A through 12E show a fourth illustrative embodiment of the construction block of the present invention 1D comprising: a central trapezoidal core portion 2 of substantially trapezoidal cross-sectional dimensions; a set of four trapezoidal support legs 3A through 3D, each extending from one corner of the central trapezoidal core portion 2 in a radially-extending manner; and a substantially flat top portion 7D extending axially from the central trapezoidal core portion for allowing water to over the central trapezoidal core portion of the breakwater construction block.

Figure 27B:
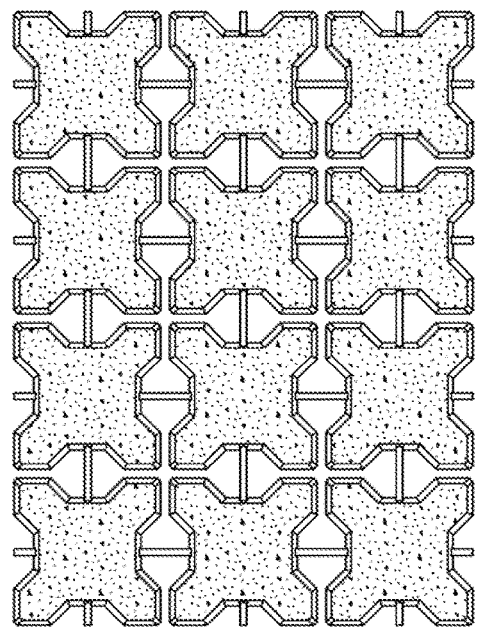
FIG. 27B is plan view of the breakwater construction block system shown in FIG. 26A taken along line FIG. 27B-FIG. 27B in FIG. 27C.
Figure 27A:
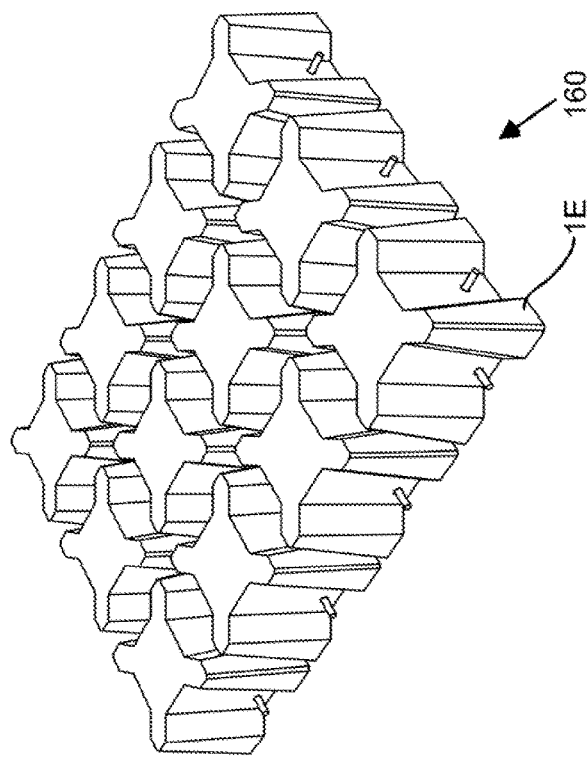
FIG. 27A is perspective view of a new and improved breakwater construction block system configured in a first arrangement for protection against erosion along beaches, streambeds and riverbeds, and constructed using a fifth arrangement of the breakwater construction blocks shown in FIGS. 13A through 13D, wherein each breakwater construction block has a flat top portion allowing water to freely pass thereacross.
Figure 27C:
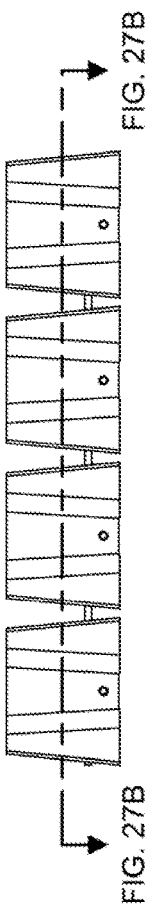
FIG. 27C is an elevated side view of the breakwater construction block system shown in FIGS. 26A and 26B.

Specification of the Breakwater Construction Block of the Fifth Illustrative Embodiment of the Present Invention FIGS. 13A through 13E show a fifth illustrative embodiment of the construction block 1E comprising: a central trapezoidal core portion 2 of substantially trapezoidal cross-sectional dimensions; a set of four trapezoidal support legs 3a through 3D, each extending from one corner of the central trapezoidal core portion 2 in a radially-extending manner; a substantially flat top portion 7E extending axially from the central trapezoidal core portion for allowing water to over the central trapezoidal core portion of the breakwater construction block; and a pair of transverse bores 2E1 and 2E2 passing through the central axis of the central trapezoidal core portion 2, at orthogonal directions so as to allow the passage of cable or tie rods to pass through each breakwater construction block 1E and interconnect a group of breakwater construction blocks, as shown in FIGS. 27A through 27C. This breakwater construction block design can be used in combination with any of the interlocking shear key blocks 10A, 10B illustrated in FIGS. 28A through 29B.

Specification of the Breakwater Construction Block of the Sixth Illustrative Embodiment of the Present Invention FIGS. 14A through 14E show a sixth illustrative embodiment of the construction block of the present invention 1F comprising: a central trapezoidal core portion 2 of substantially trapezoidal cross-sectional dimensions; a set of four trapezoidal support legs 3A' through 3D', each extending from one corner of the central trapezoidal core portion in a radially-extending manner; and a rear pair of the trapezoidal support legs 3A' and 3D' being truncated at its bottom end; and a substantially flat top portion 7F extending axially from the central trapezoidal core portion 2 for allowing water to flow over the central trapezoidal core portion of the breakwater construction block, as shown in FIGS. 40A through 40C. This breakwater construction block design can be used in combination with any of the interlocking shear key blocks of the present invention 10A, 10B illustrated in FIGS. 28A through 29B and FIG. 30A.

The shape factor of the battered breakwater construction block 1F in FIGS. 14A through 14E is achieved by removing the tower top mold/form portion 41C, and inserting a sloped filler section 41G at the bottom of the base mold portion 41A, conform to slope angle requirements for a specific project, as illustrated in FIG. 10A. The sloped filler section 41G also truncates leg portions 3A' and 3D', and also removes a portion of the bottom of the central core portion 2 of the breakwater construction block 1F. Depending on the application and engineering requirements, the slope of the filler section 41G could be as large as 60 or so degrees, to allow the resulting breakwater construction block 1F to be erected or mounted on an inclined surface of 60 or so degrees, so that the central axis 5 of the block is normal to the Earth's surface (i.e. gravitational forces) and the top surface 7F of the block is parallel with the level of the sea.

Specification of the Breakwater Construction Block of the Seventh Illustrative Embodiment of the Present Invention FIGS. 15A through 15D show a seventh illustrative embodiment of the construction block of the present invention 1G comprising: a central trapezoidal core portion 2 of substantially trapezoidal cross-sectional dimensions; a set of four trapezoidal support legs 3A through 3D, each extending from one corner of the central trapezoidal core portion in a radially-extending manner; a substantially flat top portion 7G extending axially from the central trapezoidal core portion for allowing water to over the central trapezoidal core portion 2 of the breakwater construction block; and an axially-disposed shaft 20 projecting along the central axis 5 of the central trapezoidal core portion, and capable of supporting a device (e.g. tide-gauge instrument, solar-panel driven instrument, etc.) while the breakwater construction block 1G is mounted on the bottom of a streambed, riverbed or coastal shore or region, as the application may require. This breakwater construction block design can be used in combination with any of the interlocking shear key blocks of the present invention illustrated in FIGS. 28A through 29B and FIG. 30A.

After concrete has been poured into the assembled molding system, through the top opening of the side mold portion 41B, the axially-disposed shaft 20 is inserted into the concrete. A shaft holding/alignment bracket (not shown) that straddles across the top of the side mold portion 41D is used to hold the shaft 20 axially in place, until the concrete cures, and then it can be removed.

Specification of the Breakwater Construction Block of the Eighth Illustrative Embodiment of the Present Invention FIGS. 16A through 16D show an eighth illustrative embodiment of the construction block of the present invention 1H comprising: a short central trapezoidal core portion 2 of substantially trapezoidal cross-sectional dimensions; a set of four trapezoidal support legs 3A through 3B, each extending from one corner of the central trapezoidal core portion 2 in a radially-extending manner; a substantially flat top portion 7H extending axially from the central trapezoidal core portion 2 for allowing water to over the central trapezoidal core portion of the breakwater construction block 1H. This breakwater construction block design can be used in combination with any of the interlocking shear key blocks of the present invention illustrated in FIGS. 28A through 29B.

After concrete has been poured into the top opening of mold portion 41B, axially-disposed shaft 20 is inserted into the wet concrete and held axially in placed by an shaft holding/alignment bracket (not shown) that holds the shaft 20 and straddles across the top of the side mold portion 41D to hold t he shaft axially in place, until the concrete cures, and then it can be removed.

Specification of the Breakwater Construction Block of the Ninth Illustrative Embodiment of the Present Invention FIGS. 17A through 17E shows a ninth illustrative embodiment of the construction block of the present invention 1I shown having a central trapezoidal core portion 2 of substantially trapezoidal cross-sectional dimensions; a set of four trapezoidal support legs 3A through 3D, each extending from one corner of the central trapezoidal core portion 2 in a radially-extending manner; a tower-type portion 4 (e.g. at least ⅓ of the central trapezoidal core portion) extending axially from the central trapezoidal core portion 2 for slowing down the flow of water over the central trapezoidal core portion of the breakwater construction block; and an axially-disposed borehole 19 extending along the central axis of the central trapezoidal core portion 2, and for clear passage of water energy therethrough to provide additional permeability to the overall system. This breakwater construction block design can be used alone or in combination with any of the interlocking shear key blocks of the present invention illustrated in FIGS. 28A through 29B and FIG. 30A.

Before cement has been poured into the top opening of the side mold portion 41B, axially-disposed (metal) tapered shaft mold portion 41H is inserted into the assembled mold, down into a centrally located aperture formed in the bottom mold portion 41A. The larger diameter of the until the concrete cures, and then it can be removed. The tapered shaft mold portion 41H can be removed from the bottom side of the concrete block 1I after the block has cured (and the block has been stripped of its tower, side and bottom mold portions, to provide an axially-located borehole 19 through the entire tower portion and central core portion of the block 1I. The upper and lower diameter of this axially-located borehole 19 will depend on the application and engineering requirements of the construction project.

Alternatively, a uniform diameter plastic tube can be held in position along the central axis of the block during concrete pouring and molding operations, and left in place after curing to provide an axially-disposed shaft in the block for clear passage of water energy through the block and thus increase the permeability of the overall system in which the block is used.

Specification of the Breakwater Construction Block of the Tenth Illustrative Embodiment of the Present Invention FIGS. 18A through 18E shows a tenth illustrative embodiment of the construction block of the present invention 1J comprising: a central trapezoidal core portion 2 of substantially trapezoidal cross-sectional dimensions, a set of four trapezoidal support legs 3A through 3D, each extending from one corner of the central trapezoidal core portion in a radially-extending manner; a tower-type portion 4 (e.g. at least ⅓ of the central trapezoidal core portion) extending axially from the central trapezoidal core portion 2 for slowing down the flow of water over the central trapezoidal core portion of the breakwater construction block 1J; and a water flow channel (e.g. flow hole) 14 transversely extending through the entire cross-section of the central trapezoidal core portion 2, for allowing water to flow therethrough and slow down in velocity to precipitate sand and prevent erosion of streams, rivers and coastal regions. This breakwater construction block design can be used in combination with any of the interlocking shear key blocks 10A, 10B illustrated in FIGS. 28A through 29B and FIG. 30A.

The manufacture of this breakwater construction block 1J is carried out using the molding system described in FIGS. 9D1 through 9D8 described above.

Applications for this breakwater construction block 1J include the building of off-shore berms (e.g. dikes) for controlling wave energy by dissipating hydraulic forces that can cause severe beach erosion during storms. The breakwater construction block 1J has a reduced void ratio when compared to a similar installations with void regions. The selection of the varied units will depend on wave energy at the site, material in suspension, littoral drift at a specific location, construction equipment available, method of placement, and outcome desired by the design engineer. This breakwater construction block 1J can be also utilized to protect from washout, roadway embankments along coastal highways.

Specification of the Breakwater Construction Block of the Eleventh Illustrative Embodiment of the Present Invention FIGS. 19A through 19E show an eleventh illustrative embodiment of the construction block of the present invention 1K comprising: a central trapezoidal core portion 2 of substantially trapezoidal cross-sectional dimensions; a set of four trapezoidal support legs 3A through 3D, each extending from one corner of the central trapezoidal core portion 2 in a radially-extending manner; a medium-height tower portion 4K (e.g. at least ¼ of the central trapezoidal core portion) extending axially from the central trapezoidal core portion 2 for slowing down the flow of water over the central trapezoidal core portion of the breakwater construction block. This breakwater construction block design can be used in combination with any of the interlocking shear key blocks of the present invention illustrated in FIGS. 28A through 29B and FIG. 30.

This breakwater construction block design is molded (i.e. formed) using the molding configuration shown in FIGS. 9A1 through 9B3, with the tall tower mold portion 41C is replaced with a mini-tower mold portion 41C', having shorter height dimensions.

Specification of the Breakwater Construction Block of the Twelfth Illustrative Embodiment of the Present Invention, Having Different Specific-Density Concrete Regions Exceptional benefits are derived by increasing the specific gravity, and thus the armor protection/stability capacity, of the breakwater construction blocks of the present invention. As an example, in order to obtain equal protection from stone having a specific gravity of 2.3, as compared to a specific gravity of 2.7, it would be necessary to increase the weight of stone 100% and increase the thickness of protection 25%. To achieve such specific density requirements in a breakwater construction block, different specific density concrete regions are provided in the improved breakwater construction block shown in FIGS. 20A and 20B, using the molding technology and techniques illustrated in FIGS. 21A through 22E.

Figure 20A:
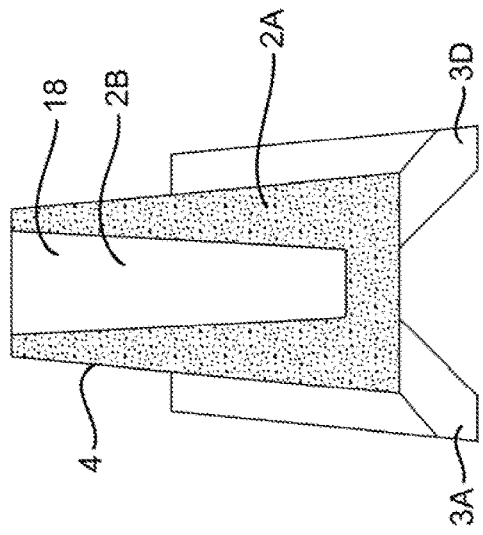
FIG. 20A is a top perspective view of a tenth illustrative embodiment of the improved breakwater construction block of the present invention shown having a central trapezoidal core portion of substantially trapezoidal cross-sectional dimensions, a set of four trapezoidal support legs, each extending from one corner of the central trapezoidal core portion in a radially-extending manner, a tower-type portion (i.e. at least ½ of the height of the central trapezoidal core portion) extending axially from the central trapezoidal core portion for slowing down the flow of water over the central trapezoidal core portion of the breakwater construction block and allowing suspended sand to settle within the breakwater construction.
Figure 20B:
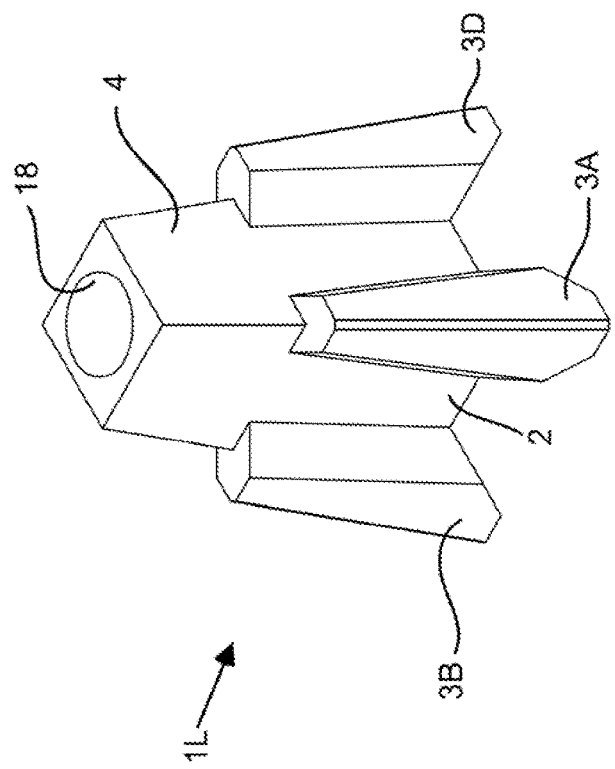
FIG. 20B is an elevated side view of the breakwater construction block shown in FIG. 20A.

FIGS. 20A and 20B show a breakwater construction block 1L having multiple specific density concrete characteristics, comprising: a central trapezoidal core portion 2 of substantially trapezoidal cross-sectional dimensions having a first concrete region 2A with a first specific density, and a second concrete region 2B having a second specific density which is greater than the first specific density; a set of four trapezoidal support leg portions 3A through 3D (each having notched region on the outer surface for banding operations); wherein each leg portion extends from one corner of the central trapezoidal core portion in a radially-extending manner; and a tower-type portion 4 (i.e. at least ½ of the central trapezoidal core portion) extending axially from the central trapezoidal core portion 2 for slowing down the flow of water over the central trapezoidal core portion of the breakwater construction block. This breakwater construction block design can be used in combination with any of the trapezoidal interlocking shear key blocks 10A, 10A' and 10B illustrated in FIGS. 28A through 29B and FIG. 30A.

Figure 21C:
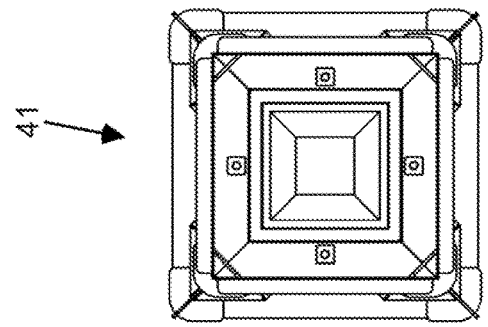
FIG. 21C is a bottom view of the breakwater construction block molding system shown in FIG. 21A.
Figure 21B:
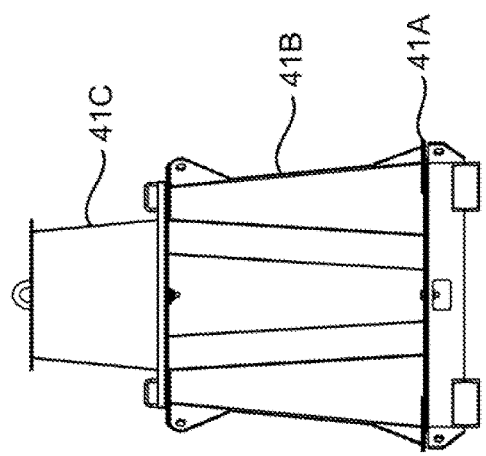
FIG. 21B is an elevated side view of the breakwater construction block molding system, shown in FIG. 21A.
Figure 21A:
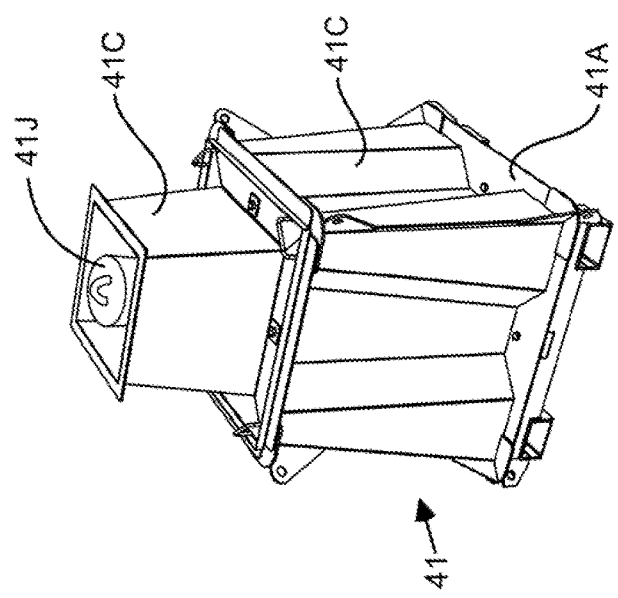
FIG. 21A is perspective view of a breakwater construction block molding system, for manufacturing the breakwater construction block shown in FIGS. 20A and 20B.
Figure 22C:
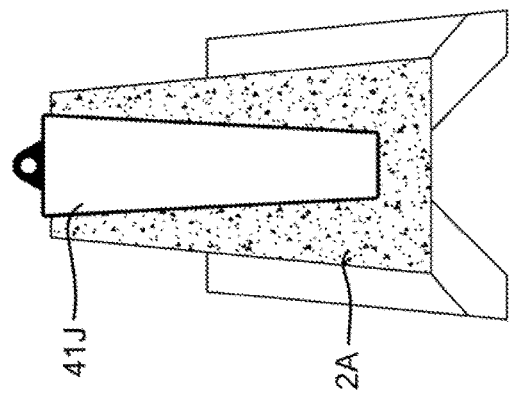
FIG. 22C is an elevated cross-sectional view of the breakwater construction block shown in FIG. 22A.

Specification of the Method of Molding Breakwater Construction Blocks having Different Specific Density Regions FIGS. 21A through 22E shows a method of molding a breakwater construction block design, having multiple regions of different specific densities. In the illustrative embodiment, this is achieved by creating a void zone 17 along the central axis of each breakwater construction block using tapered form insert 41J, as shown in FIGS. 21A, 21B and 21C. After the concrete has set or cured (e.g. after five-six hours), the top mold portion 41C is first removed from the molded concrete block, and then side mold portion 41B is removed from the molded concrete block. Then, the tapered form insert 41J within the molded concrete block, shown in FIGS. 22A through 22D, is removed as shown in FIG. 22E, to create a void zone along the central axis of the central core portion of the block. The central void zone 17 is then filled with heavy weight (e.g. high specific gravity) concrete to produce the breakwater construction block shown in FIGS. 20A and 20B. This illustration provides a simple method to increase specific gravity of any breakwater construction block design, and will provide a beneficial effect on the stability of such breakwater (armor) construction blocks of the present invention.

Specification of Four Illustrative Embodiments of the Erosion-Protection System of the Present Invention Constructed from the Arrangement of the Breakwater Construction Block Shown in FIGS. 11A through 11F

FIGS. 23A through 26C shows a breakwater construction block system 120 configured for protection against erosion along beaches, streambeds and riverbeds, and constructed using a first arrangement of the breakwater construction blocks shown in FIGS. 11A through 11F. As shown, each breakwater construction block has a short tower portion for slowing down the flow of water passing thereacross.

Figure 24B:
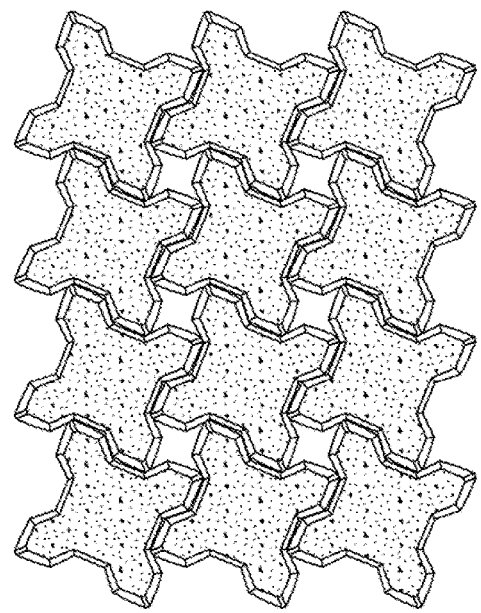
FIG. 24B is plan view of the breakwater construction block system shown in FIG. 24A taken along line FIG. 24B-FIG. 24B in FIG. 24C.
Figure 24C:
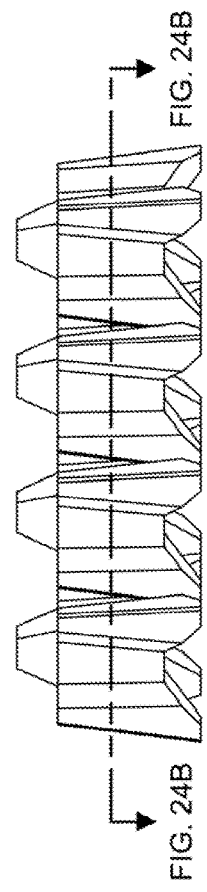
FIG. 24C is an elevated side view of the breakwater construction block system shown in FIGS. 24A and 24B.
Figure 24A:
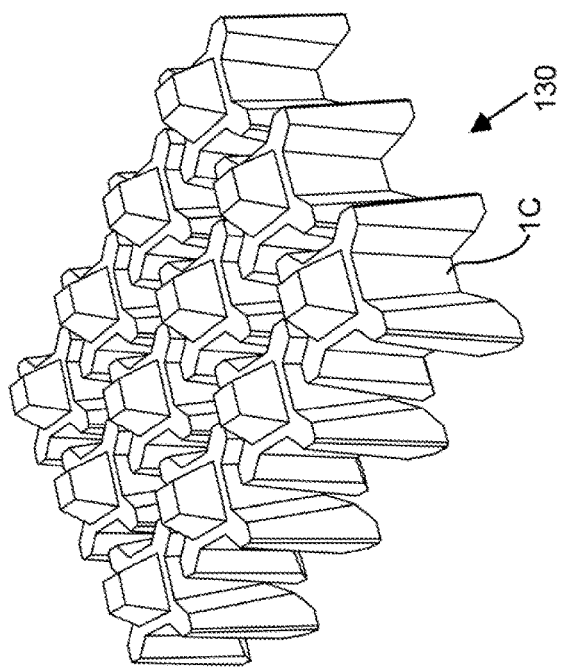
FIG. 24A is perspective view of a new and improved breakwater construction block system configured in a first arrangement for protection against erosion along beaches, streambeds and riverbeds, and constructed using a second arrangement of the breakwater construction blocks shown in FIGS. 11A through 11F, wherein each breakwater construction block has a short tower portion for slowing down the flow of water passing thereacross and allowing suspended sand to settle within the breakwater construction.

FIGS. 24A through 24C shows a breakwater construction block system 130 configured for protection against erosion along beaches, streambeds and riverbeds, and constructed using a second arrangement of the breakwater construction blocks shown in FIGS. 11A through 11F. As shown, each breakwater construction block has a short tower portion for slowing down the flow of water passing thereacross.

Figure 25B:
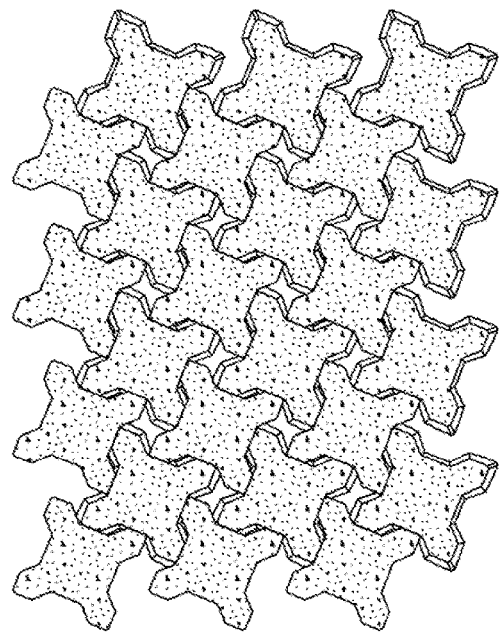
FIG. 25B is plan view of the breakwater construction block system shown in FIG. 23A taken along line FIG. 25B-FIG. 25B in FIG. 25C.
Figure 25C:
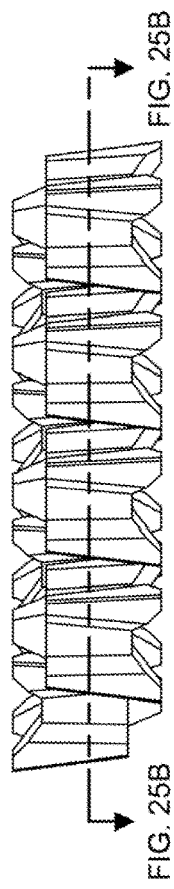
FIG. 25C is an elevated side view of the breakwater construction block system shown in FIGS. 25A and 25B.
Figure 25A:
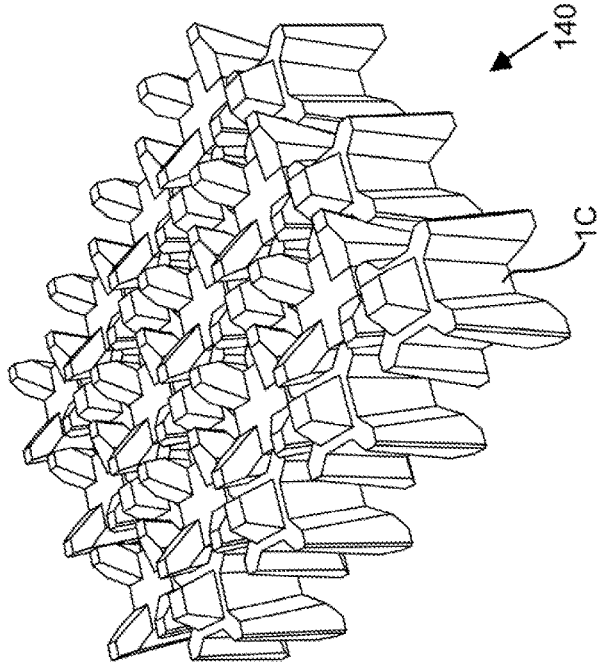
FIG. 25A is perspective view of a new and improved breakwater construction block system configured in a first arrangement for protection against erosion along beaches, streambeds and riverbeds, and constructed using a third arrangement of the breakwater construction blocks shown in FIGS. 11A through 11F, wherein each breakwater construction block has a short tower portion for slowing down the flow of water passing thereacross and allowing suspended sand to settle within the breakwater construction.

FIGS. 25A through 25C shows a breakwater construction block system 140 configured for protection against erosion along beaches, streambeds and riverbeds, and constructed using a third arrangement of the breakwater construction blocks shown in FIGS. 11A through 11F. As shown, each breakwater construction block has a short tower portion for slowing down the flow of water passing thereacross.

Figure 26A:
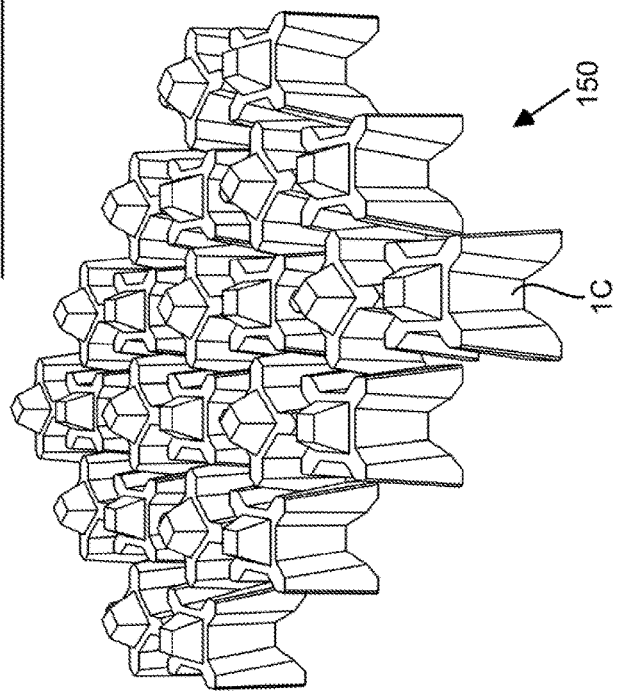
FIG. 26A is perspective view of a new and improved breakwater construction block system configured in a first arrangement for protection against erosion along beaches, streambeds and riverbeds, and constructed using a fourth arrangement of the breakwater construction blocks shown in FIGS. 11A through 11F, wherein each breakwater construction block has a short tower portion for slowing down the flow of water passing thereacross and allowing suspended sand to settle within the breakwater construction.
Figure 26B:
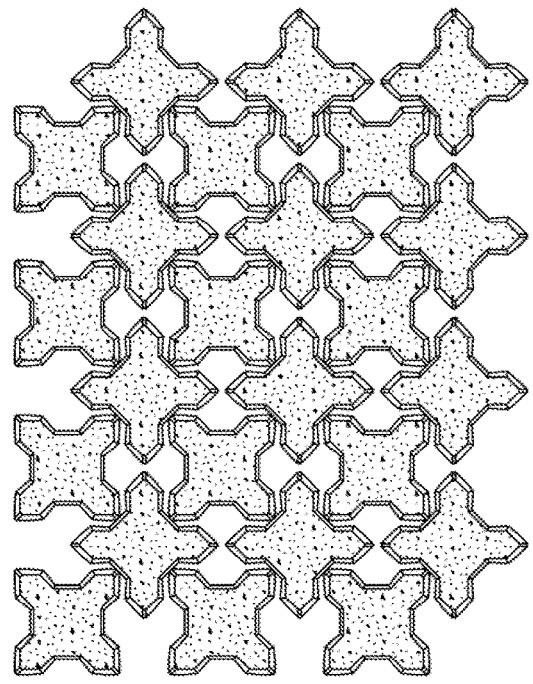
FIG. 26B is plan view of the breakwater construction block system shown in FIG. 26A taken along line FIG. 26B-FIG. 26B in FIG. 26C.
Figure 26C:
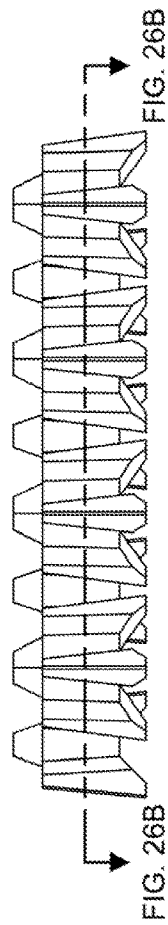
FIG. 26C is an elevated side view of the breakwater construction block system shown in FIGS. 26A and 26B.

FIGS. 26A through 26C shows a breakwater construction block system 150 configured for protection against erosion along beaches, streambeds and riverbeds, and constructed using a fourth arrangement of the breakwater construction blocks shown in FIGS. 11A through 11F. As shown, each breakwater construction block has a short tower portion for slowing down the flow of water passing thereacross.

FIGS. 27A through 27C show a breakwater construction block system 160 configured in a first arrangement for protection against erosion along beaches, streambeds and riverbeds, and constructed using a fifth arrangement of the breakwater construction blocks shown in FIGS. 13A through 13D. As shown, each breakwater construction block has a short tower portion for slowing down the flow of water passing thereacross, wherein the X and Y cross-sectional dimensions of the interlocking shear key block are substantially equal.

Figure 22B:
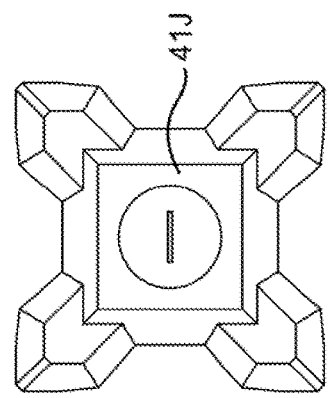
FIG. 22B is a plan view of the breakwater construction block shown in FIGS. 22A.
Figure 22A:
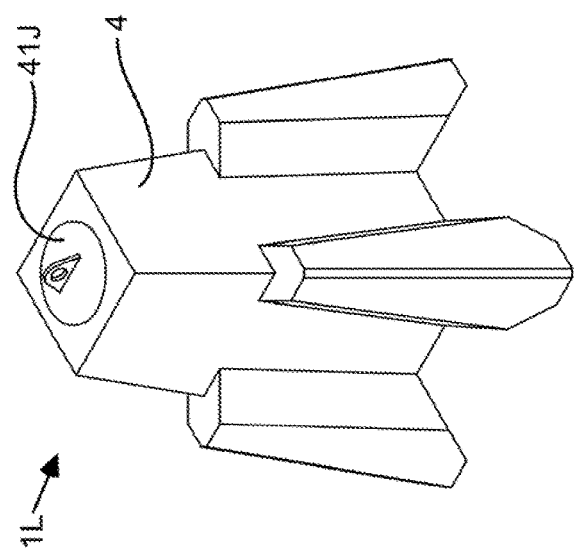
FIG. 22A is a perspective view of a perspective view of the breakwater construction block shown in FIGS. 20A and 20B, after being removed from the breakwater construction block molding system of FIG. 21A.
Figure 23B:
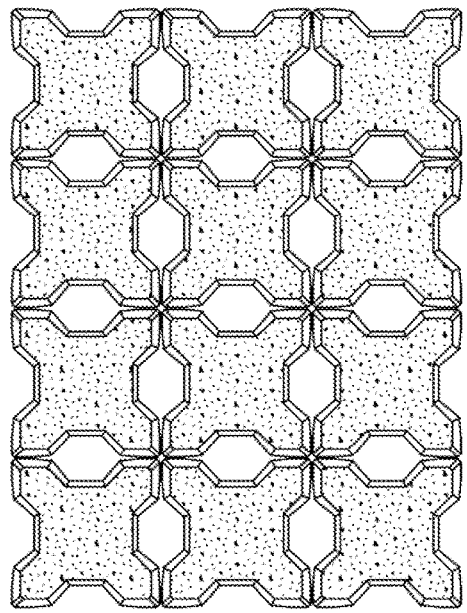
FIG. 23B is plan view of the breakwater construction block system shown in FIG. 23A 24A taken along line FIG. 23B-FIG. 23B in FIG. 23C.
Figure 23A:
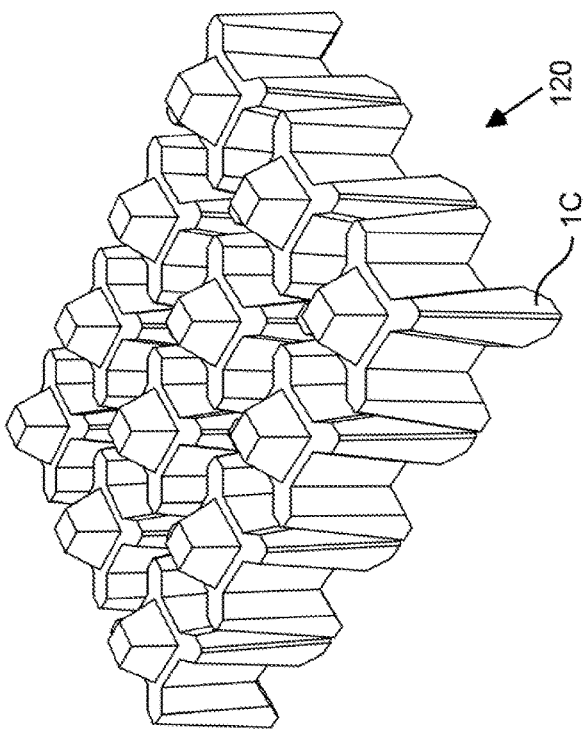
FIG. 23A is perspective view of an improved breakwater construction block system configured in a first arrangement for protection against erosion along beaches, streambeds and riverbeds, and constructed using a first arrangement of the breakwater construction blocks shown in FIGS. 11A through 11F, wherein each breakwater construction block has a short tower portion for slowing down the flow of water passing thereacross and allowing suspended sand to settle within the breakwater construction.
Figure 23C:
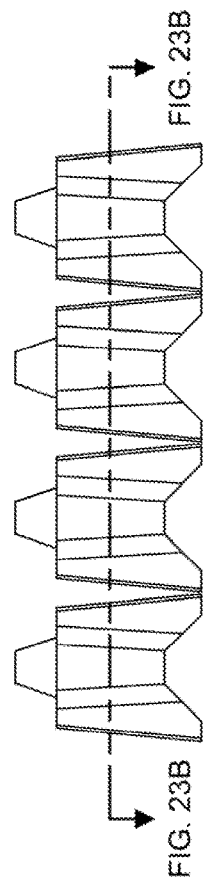
FIG. 23C is an elevated side view of the breakwater construction block system shown in FIGS. 23A and 23B.

Specification of the Interlocking Shear Key Block for Interconnecting the Breakwater Construction Blocks of the Present Invention To construct water impermeable dams and seawalls, Applicant has developed interlocking shear key blocks 10A and 10B shown in FIGS. 22A through 22B for use with all of the different breakwater construction block designs of the present invention. As will be described in great detail hereinbelow, these interlocking shear key blocks 10A, 10A', 10B, 10B' can be made to having different lengths and widths provided they have trapezoidal surface characteristics that are designed to match up with the trapezoidal surface characteristics of the breakwater construction blocks under various block placement conditions involving the inter-spacing of the breakwater construction blocks. These interlocking shear key blocks, having integrated pick-up hooks 10A1, 10B1, can be picked up, transported and lowered into place between the breakwater construction blocks, to build overall structures that resolve many pressing engineering problems facing our world, in a simple and cost effective manner.

Figure 29B:
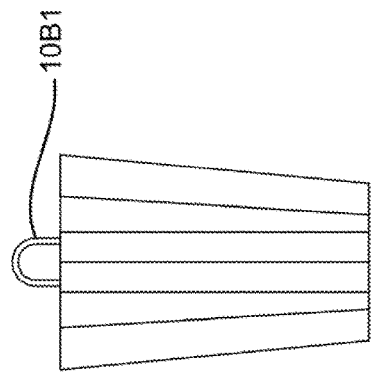
FIG. 29B is a plan view of the second illustrative embodiment of an interlocking shear key block shown in FIG. 29A.
Figure 29A:
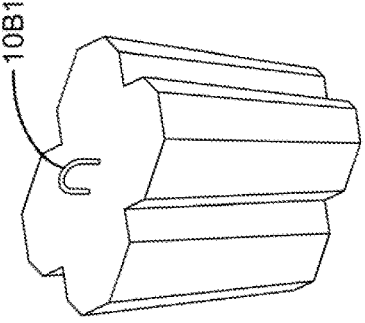
FIG. 29A is a perspective view of the second illustrative embodiment of an interlocking shear key block for use in connection with the breakwater construction blocks of the present invention, wherein the X and Y cross-sectional dimensions of the interlocking shear key block are substantially un-equal.

FIGS. 28A and 28B show a first illustrative embodiment of an interlocking shear key block for use in connection with the breakwater construction blocks of the present invention, wherein the X and Y cross-sectional dimensions of the interlocking shear key block are substantially equal. FIG. 30A shows a modification of the design illustrated in FIGS. 28A through 28B. FIGS. 29A and 29B show a second illustrative embodiment of an interlocking shear key block for use in connection with the breakwater construction blocks of the present invention, wherein the X and Y cross-sectional dimensions of the interlocking shear key block are substantially un-equal. In other alternative embodiments the X, Y characteristics may be substantially equal at certain cross-sections of the shear key block, and substantially un-equal at other cross-sections thereof. Notably, the trapezoidal surfaces of the shear key block and its corresponding trapezoidal surfaces on the breakwater construction block are important by virtue of the fact that it is the mated planar surfaces of the blocks that achieves the interlocking action described above.

The interlocking shear key blocks play an important role in the design of the various marine structures that can be erected with the breakwater construction block system of the present invention. As shown, the interlocking shear key blocks 10A, 10B can be reduced in height for specific engineering applications, such as a release zone in a dam structure during flood stage. Interlocking shear key blocks 10A, 10B can be produced with various degrees of permeability to suit design criteria, or can be made impermeable. In a single line of units, the shear key only locks the blocks together, so they are resistant to movement from horizontally-directed forces as well as uplifting (vertically-directed) forces. The manner in which the interlocking is achieved is as follows. An interlocking shear key block does not lock a zone of neighboring breakwater blocks together unless forced are exerted on the breakwater blocks to lift them up, roll them over, or tilt them in some way, in which case, the interlocking shear key blocks generate sufficient shear forces to locking the breakwater construction blocks together at the interlocking shear key block zone, to prevent failure of the system when the blocks are properly sized. It is understood that the spacing of the breakwater construction blocks, and height of the shear key blocks will depend on the application. Many different sizes and configurations are illustrated in FIGS. 30A, 30B, 30C and 30D, and described below.

FIG. 30A shows a series of tower-type breakwater construction blocks shown in FIGS. 7A through 7E, assembled together along a single tier, in a side by side relationship, and interconnected by an interlocking shear key block design 10A' slightly modified from the design shown in FIGS. 28A and 28B, and inserted between each adjacent breakwater construction blocks, to create an semi-permeable barrier to water and soil flow.

FIG. 30B shows a pair of tower-type breakwater construction blocks shown in FIGS. 7A through 7E, assembled together along a single tier, in a side by side relationship, with spacing between the trapezoidal leg portions as shown, and interconnected by interlocking shear key design 10A' shown in FIG. 30A, having a length shorter than the shear key block 10A' shown in FIG. 30A, and inserted between the adjacent breakwater construction blocks, to create an erosion-protection barrier.

FIG. 30C shows a pair of flat-top type breakwater construction blocks shown in FIGS. 12A through 12E, assembled together along a single tier, in a side by side relationship, with spacing between the trapezoidal leg portions as shown, and interconnected by an interlocking shear key design 10A' slightly modified from the design shown in FIG. 30A, and inserted between each adjacent breakwater construction blocks, to create an erosion-protection barrier.

FIG. 30D shows a pair of low-profile type breakwater construction blocks shown in FIGS. 16A through 16D, assembled together along a single tier, in a side by side relationship, with spacing between the trapezoidal leg portions as shown, and interconnected by an interlocking shear key design 10A' slightly modified from the design shown in FIGS. 28A and 28B, and inserted between each adjacent breakwater construction blocks, to create slow down the velocity of water flowing over the blocks and cause suspended sand to collect about the block structures.

Specification of Earth-Surface Erosion-Protection Barrier System Employing a First Arrangement of Breakwater Construction Blocks FIGS. 31A through 31C show an earth-surface erosion-protection barrier system 170 employing a first arrangement of mini-tower breakwater construction blocks shown in FIGS. 11A through 11D, connected together by interlocking shear key blocks shown in FIGS. 28A and 28B. As shown, the bottom edges of the leg portions on one side of each breakwater construction block is aligned close to against the bottom edges of the leg portions of one side of a neighboring breakwater construction block, and the interconnecting shear key block is inserted between each such neighboring block to form a tight water seal. In this embodiment, the length of each interlocking shear key block is substantially equal to the length of the central portion of the neighboring mini-tower breakwater construction blocks. Also, each breakwater construction block has a short tower portion for slowing down the flow of water passing thereacross. As can be seen from FIG. 31B, this earth-surface erosion protection barrier system offers great protection from the scouring or erosion of the earth surface (e.g. ocean bottom, stream bottom, river bottom) due to the flow and impact of water.

FIGS. 32A through 32C show a breakwater construction block system 180 for protection against erosion along beaches, streambeds and riverbeds, and constructed using a second arrangement of the mini-tower breakwater construction blocks 1C shown in FIGS. 11A through 11F. As shown, the bottom edges of the leg portions on one side of each breakwater construction block 1C is aligned in a spaced apart relationship to against the bottom edges of the leg portions of one side of a neighboring breakwater construction block 1C, and the interconnecting shear key block 10B of the type shown in FIGS. 29A and 29B is inserted between each such neighboring block 1C to form a tight water seal. In this embodiment, the length of each interlocking shear key block 10B is substantially equal to the length of the central portion of the neighboring mini-tower breakwater construction blocks. Also, the interlocking shear key block is disposed between the sidewall surfaces of adjacent breakwater construction blocks, so that longer dimension of adjacent interlocking shear key blocks 10B are aligned in orthogonal cross-sectional directions within the breakwater construction block system. Also, each breakwater construction block 1C has a short tower portion for slowing down the flow of water passing thereacross. As can be seen from FIG. 32B, this earth-surface erosion protection barrier system offers great protection from the scouring or erosion of the earth surface (e.g. ocean bottom, stream bottom, river bottom) due to the flow and impact of water. Also, this structure enables the collection of sand on ocean-fronts to control beach erosion.

FIGS. 33A through 33C show a breakwater construction block system 190 for protection against erosion along beaches, streambeds and riverbeds, and constructed using a third arrangement of the mini-tower breakwater construction blocks shown in FIGS. 11A through 11F, aligned along their leg portions, rather than their sides, as shown in FIGS. 31A through 32C. As shown in FIGS. 33A through 33C, an interlocking shear key block 10B of the type shown in FIGS. 29A and 29B is disposed between the sidewall surfaces of a first set of opposing break water construction blocks 1C and also between the leg portions of a second set of opposing breakwater construction blocks, so that the longer dimension of each interlocking shear key block 10B extends between the side wall surface of the first set of opposing breakwater construction blocks, whereas the shorter dimension of each interlocking shear key block extends between the leg portions of the second set of opposing breakwater construction blocks. As shown, each breakwater construction block 1C has a short tower portion for slowing down the flow of water passing thereacross. As can be seen from FIG. 33B, this earth-surface erosion protection barrier system offers great protection from the scouring or erosion of the earth surface (e.g. ocean bottom, stream bottom, river bottom) due to the flow and impact of water.

Specification of Erosion-Prevention Systems Installed at the Bottom of Riverbeds and Streambeds FIGS. 34A and 34B show a riverbed erosion-prevention system 200 installed at the bottom of a riverbed, constructed as an arrangement of breakwater construction blocks connected together by interlocking shear key blocks 10A, 10B, as shown in FIG. 31A, 32A or 33A. When installed, water is allowed to flow over the installed riverbed erosion-prevention system, while preventing erosion and/or scouring of the riverbed (i.e. bottom surface) and thus uphold the sidewalls of the river. Such systems will be placed at strategic locations where the flow of water has a tendency to scour and erode the river bottom, and maintenance of the river sidewalls is of critical importance.

FIGS. 35A and 35B shows a streambed erosion-prevention system 205 installed at the bottom of a streambed, constructed as an arrangement of breakwater construction blocks connected together by interlocking shear key blocks, as shown in FIG. 31A, 32A or 33A. When installed, water is allowed to flow over the installed streambed erosion-prevention system, while preventing erosion and/or scouring of the streambed (i.e. bottom surface) and thus uphold the sidewalls of the stream. Such systems will be placed at strategic locations where the flow of water has a tendency to scour and erode the stream bottom, and maintenance of the stream sidewalls is of critical importance.

Specification of a Groin-Type Beach Erosion-Prevention Barrier System Constructed from Multiple Tiers of Breakwater Construction Blocks and Interlocking Shear Key Blocks of the Present Invention FIGS. 36A through 36F show a groin-type beach erosion-prevention barrier system 210 that has been constructed from multiple tiers of mini-tower breakwater construction blocks shown in FIGS. 18A through 18E having flow through water channels 217, and interlocking shear key blocks shown in FIGS. 28A and 28B which are used to interconnect the breakwater blocks along a given row 211, 212, 213, 214 in the groin-type system 210. As shown in FIGS. 36A and 36E, each breakwater construction block in the system has a pass through water flow channel 14 (i.e. a positive void ratio) passing through one side of the block to the other side, that allows water passage through the structure when erected in the permeable groin-type system. In general, the groin-type system 210 will be erected perpendicular to the shoreline, but this may vary from application to application.

Conventional ocean-type groins have usually been built with stone and have allowed no or little permeability, causing severe erosion down drift of such structures. Unlike the conventional ocean-groin systems, the ocean-groin of the present invention 210 permits sand and water to pass through the structure, thereby allowing material held in suspension to pass through the structure and assisting a more nature method in maintaining an even beach profile on each side of the structure. While passing through the ocean-groin work of the present invention, water energy is dissipated, water velocity is slowed down, and the large amounts of sand suspended in the ocean water are allowed to deposit on both sides of the work, thereby preserving the beach front on the oceanfront.

FIGS. 36A through 36C show the groin-type beach erosion-prevention barrier system 210 as employing an arrangement of four tiered rows 211, 212, 213 and 214 of interconnected breakwater construction blocks 1J shown in FIGS. 18A through 18E, assembled symmetrically about of linear mound of 216 on a beach shore as shown in FIG. 36F. The mound of sand must be protected from washout by installing filter-fabric over the sand mound in a conventional manner. As shown, each row of breakwater construction blocks 211, 212, 213, 214 is constructed by a series of breakwater construction blocks 1J shown in FIGS. 18A through 18E connected together by interlocking shear key blocks 10A shown in FIGS. 28A and 28B. As shown, these interlocking shear key blocks 10A have a height less than the central trapezoidal core portion of the breakwater construction blocks, to facilitate the reduction of water speed across the breakwater construction blocks and cause sand to collect and settle around and on both sides of groin structure as water flows through the flow through channels in each breakwater construction block, thereby preventing beach erosion.

Energy Dissipating Revetment System Using a Single Course of Breakwater Construction Blocks FIGS. 37 and 37A show a single-tier seawall erosion-protection system 220 constructed along a section of coastal shoreline using breakwater construction blocks shown in FIGS. 8A through 8E, interconnected using interlocking shear key blocks shown in FIGS. 28A and 28B. The single-tier seawall erosion-protection system 220 comprises a seawall subsystem constructed from a continuous row of breakwater construction blocks 1A shown in FIGS. 8A through 8E arranged leg portion to leg portion and connected together by interlocking shear key blocks 10A' shown in FIG. 30A. In the illustrative embodiment, each shear key block has a height substantially equal to the height of the tower-type breakwater construction block (e.g. 5' or so).

Energy Dissipating Revetment System Using a Double Course of Breakwater Construction Blocks FIGS. 38 through 38B show a double-course seawall erosion-protection system 230 constructed along a section of coastal shoreline, comprising (i) a single-tier seawall subsystem 231 constructed from a continuous row of breakwater construction blocks 1A shown in FIGS. 8A through 8E arranged leg portion to leg portion and connected together by interlocking shear key blocks 10A' shown in FIG. 30A having a height substantially equal to the height of the breakwater construction block (e.g. 5' or so), and (ii) a scour-protection subsystem 232 disposed in front of the seawall subsystem, and constructed from at least first and second continuous rows of 2-ton breakwater construction blocks 1E shown in FIGS. 13A through 13D, interconnected by cable or rods as shown in FIGS. 27A through 27D, to protect against erosion (i.e. scouring) of shoreline along which the seawall subsystem is installed.

Alternatively, this single-tier system 230 can be constructed by placing breakwater construction blocks 1A at 8 feet apart from each other, measured from the center of each block, attaching timber or like sheeting to the rear of the blocks, then nailing filter-fabric to the sheeting, and then backfilling the wall structure with sand or crushed stone.

Specification of an Interlocking Rock-Shelf Seawall System of the Present Invention FIGS. 39 and 39A show a battered rock-shelf seawall system of the present invention 250, created using 15% battered tower-type breakwater construction blocks 1B with their rear legs removed, offering increased stability against overturning, when mounted on a horizontal bed on land or in the sea. This option provides a contractor an opportunity to erect a battered seawall on level bed.

As shown in FIG. 39A, the single-tier rock-shelf seawall (erosion-protection) system 250 comprises: a seawall subsystem constructed from a continuous row of tower-type breakwater construction blocks 1B of the type shown in FIGS. 10B1 through 10B4, arranged front leg portion to front leg portion, and having truncated rear leg portions; interlocking shear key blocks 10A shown in FIGS. 28A and 28B having a height substantially equal to the height of the breakwater construction block (e.g. 5' or so) and interconnecting neighboring breakwater construction blocks; and a rock shelf 251 disposed behind the row of tower-type breakwater construction blocks 1B, and interlocking and wedging with the rock recess 15 formed in the rear of the core portion of the breakwater construction blocks 1B and forming an integral part of the overall structure, for increased stability. The increased stability of the overall work is achieved by the wedging and interlocking of stones and/or crushed gravel into recessed voids formed in the concrete breakwater construction block becomes an integral part of the overall structure.

Specification of Stepped-Type Erosion Protection System Erected on a Coastal Incline FIGS. 40 and 40A show is a multi-tiered seawall erosion-protection system of the present invention 260, constructed along a section of coastal shoreline. As shown, the multi-tiered seawall erosion-protection system 260 comprises: (i) a seawall subsystem 261 installed at the top elevation of a coastal incline upon a bed of crushed rock and/or stone 263, and constructed from a continuous row of breakwater construction blocks 1B shown in FIGS. 10B1A through 10B4 arranged leg portion to leg portion and connected together by interlocking shear key blocks 10A shown in FIGS. 28A and 28B having a height substantially equal to the height of the breakwater construction block (e.g. 5' or so); and (ii) a scour-protection subsystem 262 installed on the inclined surface 263 of the coastal region, disposed in front of the seawall subsystem 261, and constructed from (a) multiple (e.g. 4) continuous rows of 2-ton low-front-file flat-top breakwater construction blocks 1F shown in FIGS. 14A through 14E with truncated leg portions tailored to the incline surface, and interconnected by interlocking shear key blocks 10A shown in FIGS. 28A through 28D, and (b) a continuous row of 2-ton flat top breakwater construction blocks 1D shown in FIGS. 12A through 12E, interconnected by interlocking shear key blocks 10A shown in FIGS. 28A through 28D. The purpose of the scour-protection subsystem 262 is to protect against erosion (i.e. scouring) of shoreline, along which the multi-tiered seawall subsystem 260 is erected, and maintain the ground under which the seawall 261 is supported.

FIG. 40B shows a second embodiment of the multi-tiered seawall erosion-protection system 260' depicted in FIG. 40, installed upon a bed or crushed rock or stone 263 on the inclined surface of the coastal region, constructed from multiple continuous rows of 2-ton flat-top breakwater construction blocks 1F shown in FIGS. 14A through 14E with truncated leg portions tailored to the incline surface, and interconnected by interlocking shear key blocks 10A shown in FIGS. 28A through 28D, the purpose of which is to protect against erosion (i.e. scouring) of shoreline along which the multi-tiered seawall subsystem is installed.

FIG. 40C is a side view of a third embodiment of the multi-tiered seawall erosion-protection system 260" depicted in FIG. 40, comprising (i) a seawall subsystem 261 installed at the top elevation of a coastal incline upon a bed of crushed rock and/or stone 263 and constructed from a continuous row of breakwater construction blocks 1B shown in FIGS. 10B1A through 10B4 arranged leg portion to leg portion and connected together by interlocking shear key blocks 10A shown in FIGS. 28A and 28B having a height substantially equal to the height of the breakwater construction block (e.g. 5' or so), and (ii) a scour-protection subsystem 262' installed upon a bed or crushed rock or stone on the inclined surface 263 of the coastal region, disposed in front of the seawall subsystem 261, and constructed from multiple continuous rows of 2-ton flat-top breakwater construction blocks 1F shown in FIGS. 14A through 14E with truncated leg portions tailored to the incline surface, and interconnected by interlocking shear key blocks 10A shown in FIGS. 28A through 28D. The purpose of the scour-protection subsystem 262' is to protect against erosion (i.e. scouring) of shoreline, along which the multi-tiered seawall subsystem is erected, and maintain the ground under which the seawall 261 is supported.

Energy Dissipating Revetment System Employing Multiple Rows of Breakwater Construction Blocks FIGS. 41 and 41A show a multi-tiered seawall erosion-protection system 270 constructed upon a bed of crushed rock or stone 271 on the flat and also inclined surface of a coastal region or coastal shoreline. As shown, the system comprises: (i) a front row of flat-top battered breakwater construction blocks 1F shown in FIGS. 14A through 14E, having truncated leg portions and bottom surface trimmed to slope of coastal edge surface, and interconnected using interlocking shear key blocks 10A shown in FIGS. 28A and 28B having a height substantially equal to the central trapezoidal core portion of the flat-top breakwater construction blocks; (ii) a second continuous row of 2-ton battered tower-type (5' high) breakwater construction blocks 1B shown in FIGS. 10B1 through 10B4 with truncated leg portions tailored to the incline surface 271, and interconnected by interlocking shear key blocks 10A shown in FIGS. 28A through 28D, having a height substantially equal to the height of the breakwater construction block 1B (e.g. 5' or so); and (iii) multiple continuous rows of 2-ton battered tower-type (5' high) breakwater construction blocks 1B shown in FIGS. 10B1 through 10B4 with truncated leg portions tailored to the incline surface 271, and interconnected by interlocking shear key blocks 10A shown in FIGS. 28A through 28D, having a height substantially equal to the height of the breakwater construction block 1B (e.g. 5' or so). The purpose of this multi-tiered seawall system 270 is to dissipate wave energy, entrap sand suspended in ocean waters, and protect against the erosion (i.e. scouring) of the shoreline, along which the multi-tiered seawall erosion-protection system is erected.

Specification of Waterway Dam System Installed Along a River or Stream, and Constructed from a Discontinuous Row of High-Profile Tall Top Breakwater Construction Blocks FIGS. 42 and 42A show a waterway dam system 280 installed along a river or stream where control or regulation of water flow is required. As shown in FIG. 42A, the waterway dam system 280 is constructed along a river or stream, comprising the following components: a discontinuous row of battered tower-type breakwater construction blocks 1B shown in FIGS. 10B1 through 10B4, having truncated leg portions 3A', 3D' to facilitate battered installation on the riverbed for stability. The breakwater construction blocks 1B are interconnected by interlocking shear key blocks 10A' shown in FIG. 30A. Each shear key block 1B has a height substantially equal to the central trapezoidal core portion 2 of its neighboring tower-type breakwater construction blocks 1B. The discontinuity in the waterway dam system 280, indicated by 281 allows for the control of water flow along the river or stream. As shown, each battered breakwater construction block 1B, having truncated leg portions 3A', 3D', is installed at an angle inclined into the body of water being dammed up by the waterway dam system 280.

Alternatively, it is understood that the waterway dam system 280 can be constructed using tall tower-type breakwater construction blocks to form the full height section of the dam structure, and reduced-height tower-type (or flat-top type) breakwater construction blocks to form a specified zone in the dam structure having a reduced height to permit the controlled release of water to control flooding on the river, stream or waterway. In this alternative embodiment, the height of the interlocking shear key blocks 10A' in the full height section of the dam (where water is normally not allowed to flow) will match the height of the breakwater construction blocks 1B used to construct this full height section of the dam structure. Also, the height of the interlocking shear key blocks in the reduced height section of the dam (where water is normally allowed to flow) will match the height of the breakwater construction blocks used to construct this reduced section of the dam structure. Typically, the breakwater construction blocks 1B will be set upon a solid bed of crushed stone or rock.

Specification of Water Permeable Wall System Installed Along Both Sides of a River, Stream or Waterway FIGS. 43 and 43A show a water permeable wall system 290 installed along both sides of a river, stream or waterway. As shown, the system 290 comprises: a continuous row low-profile (flat-top) breakwater construction blocks 1D shown in FIGS. 12A through 12E, installed upon a bed of crushed stone or rock 291, beneath which is a layer of HS® filter fabric 292. The breakwater construction blocks 1D are interconnected by interlocking shear key blocks 10A shown in FIGS. 28A and 28B, and each have a height substantially equal to the central trapezoidal core portion of its neighboring flat top breakwater construction blocks, creating a water permeable wall structure for controlling and restraining flow of water when the water level increases on the river or stream (i.e. from low water level LW to high water level HHW) during storm surges and the like.

In an alternative embodiment, the wall system 290 can be constructed as a water impermeable system by using tightly-fitted interlocking shear key blocks 10A, and a layer of water impermeable fabric in lieu of HS® filter fabric 292.

Specification of Scour-Protection System Installed Before a Seawall or Bulkhead Alone a River, Stream or Waterway FIGS. 44 and 44A show a scour-protection system 300 installed before a seawall or bulkhead 301 along a river, stream or waterway. As shown, the system 300 comprises: a multiple continuous rows low-profile breakwater construction blocks 1C shown in FIGS. 11A through 11D or 1D shown in FIGS. 12A through 12E, installed on a bed of crushed stone or rock 302 resting on a layer of HS filter fabric 303. The blocks 1C are interconnected by interlocking shear key blocks 10A' shown in FIG. 30A or 10A or 10B shown in FIGS. 28A through 28B, and arranged as 170, 180 as shown in FIGS. 31A through 31C to form a scour-protection barrier before the seawall or bulkhead 301. Each breakwater construction block has a height substantially equal to the central trapezoidal core portion of its neighboring flat top breakwater construction block, and creating a scour-protection structure for preventing the scouring of the riverbed or oceanfront bed before the seawall or bulkhead 301.

Specification of Scour-Protection System Installed about the Piers Supporting a Roadway Bridge System Across a River or Waterway FIGS. 45 and 45A show a scour-protection system 310 installed about the piers 311 supporting a roadway bridge system 312 across a river or waterway 313. As shown, each system 310 comprises: multiple continuous rows low-profile breakwater construction blocks 1D shown in FIGS. 12A through 12E, being interconnected by interlocking shear key blocks 10A' shown in FIG. 30A, or 10A or 10B shown in FIGS. 28A and 28B, and arranged as shown in FIGS. 31A through 31C. Each breakwater construction block 1D has a height substantially equal to the central trapezoidal core portion of its neighboring flat-top breakwater construction block 1D, and creating a scour-protection structure for preventing the scouring of the riverbed or oceanfront bed before the seawall or bulkhead. FIG. 45A illustrates the interconnection of neighboring rows of breakwater construction blocks and neighboring breakwater construction blocks along each row, by way of interlocking shear keys of the present invention applied as shown in FIGS. 28A through 28B. In this system, the river bottom should be located at the top of the stone fill so to avoid turbulence and attracting flood debris.

Specification of Impermeable Water Control System Installed Along Both Sides of a River, Stream or Waterway FIGS. 46 and 46A show an impermeable water control system 320 installed along both sides of a river, stream or waterway 321. As shown, each impermeable water control system 320 comprises one or more continuous rows of low-profile breakwater construction blocks 1D shown in FIGS. 12A through 12E, being interconnected by interlocking shear key blocks 10A' shown in FIG. 30A, or 10A shown in FIGS. 28A and 28B. Each interlocking shear key block 10A has a height substantially equal to the central trapezoidal core portion of its neighboring flat top breakwater construction blocks, and creating a water impermeable structure for controlling and restraining flow of water when the water level increases on a river or stream during storm surges and the like. FIG. 46A shows a cross-sectional view of impermeable water control system 320 shown in FIG. 46, and illustrates that one or more rows of continuous flat-top breakwater construction blocks 1D are installed on each side of the river, stream or waterway, upon a bed of crushed stone or rock 322, beneath which a layer of HS® filter fabric 323 is installed.

Specification of a Barrier System for a Coastal Region Constructed on a Beach, Comprising a Single Row of Breakwater Construction Blocks of the Present Invention FIG. 47 shows an exemplary barrier system 330 for a coastal region, constructed on a beach before a collection of large rocks 331. As shown, the barrier system comprises: tower-type breakwater construction blocks 1A shown in FIGS. 7A through 7E, spaced apart by different spacings, and interconnected by interlocking shear key blocks 10A' shown in FIGS. 30A and 10B' which is a modification of the design shown in 29A and 29B.

FIG. 48 shows an exemplary barrier system 340 for a coastal region, constructed on a beach before a collection of large rocks 341. As shown, the barrier system 340 comprises: breakwater construction blocks 1C shown in FIGS. 11A through 11F, spaced apart by different spacings, and interconnected by interlocking shear key blocks 10A' and 10B'.

Specification of a Coastal Region Barrier System for Construction on a Beach, Comprising Multiple Different Rows of Breakwater Construction Blocks of the Present Invention FIGS. 49 and 50 show an exemplary coastal region barrier system 350 for construction on a beach 351 comprising five different rows of armor protection provided by the different breakwater construction blocks of the present invention disclosed herein. The first row closest to the ocean front 352 is formed from the low-profile breakwater construction blocks 1H shown in FIGS. 16A through 16D. The second row 353 is formed from the flat-top breakwater construction blocks 1E shown in FIGS. 13A through 13D and interconnected by tie rods. The third row 354 is formed from flat-top breakwater construction blocks 1D shown in FIGS. 12A through 12E and interconnected by shear key blocks 10A' shown in FIG. 30A. The fourth row 355 is formed from mini-tower breakwater construction blocks 1C shown in FIGS. 11A through 11F and interconnected by shear key blocks 10A and 10B'. The fifth row 356 is formed from tower-type breakwater construction blocks 1A arranged together with or without shear key blocks 10A, 10B, as the application may require. This system 350 provides an excellent solution to serious beach erosion and water control problems, using diverse types of technologies of the present invention working in a concerted manner, each performing a different function, at which each block has been engineered for the required advantage to challenge the enormous forces and energy generated by an ocean front during normal weather as well as during a storm.

Method of Constructing Erosion-Protection Systems Using Preassembled Subsystems, Banding Techniques and Interlocking Shear Key Blocks of the Present Invention Many different marine engineering systems have been disclosed in great technical detail. Some of these system will be constructed above land, some under the ocean waters, and some along the beach or oceanfront or at a waterway-land interface. In nearly all instances, construction of marine systems underwater always presents challenges when assembling components requiring alignment, underwater cameras, etc well known in the art. To lessen the technical challenges associated with underwater construction, and construction along any land-water interface, it is another object of the present invention to provide an improved method of constructing erosion-protection systems using preassembled subsystems, banding techniques, and interlocking shear key blocks.

According to this improved method of construction, the breakwater construction block are pre-assembled together on land into subsystems, then interlocked using interlocking shear key blocks, banded together, and then transported to the designated construction site location for installation in the work under construction, using a crane system or the like. These method steps are repeated as many times as required to build resultant system designs, underwater, above land, and/or along the coast line, with greater efficiency and safety. The details of this method will now be described in detail below.

As indicated at Step A in FIG. 51, the first step in the method of constructing erosion-protection systems involves forming breakwater construction blocks with notches on the outer surface of the leg portions (i.e. which can be achieved by forming notches in the block molds).

As indicated at Step B in FIG. 51, the second step in the method involves assembling multiple breakwater construction blocks 1A through 1L on land, and using interlocking shear key blocks 10A, 10A', and/or 10B, 10B' to interlock the blocks to form a subsystem 30.

As indicated at Step C in FIG. 51, the third step in the method involves banding together the assembly of breakwater construction blocks 30 using a banding structure 400 under tension. The banding structure 400 can be a steel band, a wire cable or other harnessing structure with sufficient flexibility. Notably, each block will be provided with notches 9 which the banding structure 400 can reliably grip.

As indicated at Step D in FIG. 51, the fourth step in the method involves transporting the assembly 30 to site where the system is to be constructed, as illustrated in FIG. 52. A crane or lift 500 with suitable cables 410 can be used for such lifting and transporting operations shown in FIG. 52.

As indicated at Step E in FIG. 51, the fifth step in the method involves removing bands 400 from the preassembled subsystem 30 of breakwater construction blocks.

As indicated at Step F in FIG. 51, the sixth step in the method involves repeating Steps A through E above, at least one or more times, so as to place multiple assemblies 30 in their designated locations at the work site to form a resultant system 450 which is created by interconnecting these subsystems 30 using interlocking shear key blocks 10A, 10B, as illustrated in FIG. 53.

Using the method illustrated in FIGS. 51 through 53, civil and marine engineers can now more easily and economically construct marine structures that are submerged underwater, or partially underwater because the greater part of subassembly can take place on dry land. The interconnection of preassembled subsystems is achieved by lowering interlocking shear key blocks 10A, 10B and/or 10A', 10B' into place between neighboring breakwater construction blocks 1A and 1L using a crane or winch system 500, well known in the art. The banding apparatus 400 used to band together the preassembled blocks on land, can be made from steel, fiberglass or any other material that is flexible and has sufficient strength to support the load of the block subassembly during lifting, transport and placement operations during construction work at the site. While the notches formed in the leg portions of the blocks is a preferred method of gripping and grapping each block in an subassembly of interlocked blocks, alternative methods of banding may be used including passing cable through preformed holes in the blocks for the specific purpose of subassembly, or otherwise provided and available for block banding purposes.

Modifications that Come to Mind:

The breakwater construction blocks of the present invention are provided with a rugged top portion that can have several design shapes as shown in the drawings, and when combined with other construction blocks and interlocking shear key blocks disclosed herein, will serve an important function, namely total water energy control and its reaction to wave attack, changing flow velocities through a composite structure which can allow sand, shell or stone particles in suspension more time to settle. In order to control severe problems along our shorelines including rivers, streams and bluffs, improved breakwater construction block should be ideal block for rapid construction of off-shore berms which are effective in controlling shoreline erosion.

The present invention provides a new system for molding the various block designs of the present invention using attachments that provide engineering solutions never before available from a single-type molding system. As an example, a breakwater construction unit that provides a superior foundation block for all classes of highway and railroad signals, marine-type projects as well as foundation pads for wind power installations. The breakwater construction block of the present invention provides a significantly higher stability factor against over-turning, or pullout, when compared against the cylinder and upright rectangular blocks now in conventional use. During severe hurricane winds and heavy rain, numerous pole failures have occurred which can be eliminated using the construction block system of the present invention. The basic shape factor of the improved construction block provides the highest degree of soil-friction against overturning and pullout, and provides a structural element that becomes attached to a large soil-mass, which resists removal by natural forces.

The wall systems described above can also be used to control snow avalanches by building walls using breakwater construction blocks and interlocking shear key blocks as taught herein. Such avalanche control structures can replace conventional stones used throughout Europe for such kinds of engineering.

It is understood, that numerous other modifications will readily occur to those with ordinary skill in the art having had the benefit of reading the present disclosure.

These and all other such modifications and variations are deemed to be within the scope and spirit of the present invention as defined by the accompanying Claims to Invention.

The invention claimed is:

1. A breakwater construction block system for constructing diverse kinds of erosion-protection structures designed to break water waves impacting said erosion-protection structures and providing protection against erosion along bodies of water, said breakwater construction block system comprising:

a plurality of breakwater construction blocks closely arranged together with a selected inter-spacing between said neighboring breakwater construction blocks so as to provide multiple sets of neighboring breakwater construction blocks; and a plurality of trapezoidal-shaped interlocking shear key blocks for linking said multiple sets of neighboring breakwater construction blocks loosely together;

wherein each said set of neighboring breakwater construction blocks includes first and second neighboring breakwater construction blocks;

wherein each said breakwater construction block is formed from molded concrete material and includes (i) a central trapezoidal core portion of substantially trapezoidal cross-sectional dimensions and having a height-wise dimension and a set of four trapezoidal sidewall surfaces arranged about a central axis extending along said central trapezoidal core portion of said breakwater construction block, (ii) a top portion axially extending from said central trapezoidal core portion of said breakwater construction block, and (iii) a set of four trapezoidal support legs, each said trapezoidal support leg extending from one corner of said central trapezoidal core portion in a radially-extending manner and having a set of trapezoidal leg surfaces, and wherein said plurality of breakwater construction blocks are arranged closely together, forming trapezoidal interstices between adjacent sets of trapezoidal support legs associated with neighboring sets of said breakwater construction blocks, wherein each said trapezoidal interstice is bounded by the trapezoidal surfaces of said first and second neighboring breakwater construction blocks, and wherein each said trapezoidal-shaped interlocking shear key block is formed from molded concrete material, has trapezoidal wall surfaces, a volume defined by X and Y cross-sectional dimensions and a length dimension along which said trapezoidal-shaped interlocking shear key block extends;

wherein each said trapezoidal-shaped interlocking shear key block has an integrated pick-up device for picking up, transporting and lowering said trapezoidal-shaped interlocking shear key block along a path parallel to the central axis of the central trapezoidal core portion of each said set of neighboring breakwater construction blocks, and into place within one said trapezoidal interstice formed between one said neighboring set of said breakwater construction blocks;

wherein the elongated length dimension of each said trapezoidal-shaped interlocking shear key block extends substantially parallel to the central axis of each said neighboring breakwater construction block and the trapezoidal wall surfaces of each said trapezoidal-shaped interlocking shear key block extend substantially along said length dimension and match up with mated trapezoidal side wall surfaces on said neighboring set of breakwater construction blocks so that the trapezoidal wall surfaces of said trapezoidal-shaped shear key block engage with the trapezoidal side wall surfaces of said neighboring set of said breakwater construction blocks, and together said plurality of breakwater construction blocks and said plurality of trapezoidal-shaped interlocking shear key blocks are linked together to form an erosion-protection structure having a structural interface between each said trapezoidal-shaped interlocking shear key block and said neighboring set of breakwater construction blocks employed in said breakwater construction block system; and wherein, sufficient flexibility is provided at the structural interface of each said neighboring set of breakwater construction blocks and said trapezoidal-shaped interlocking shear key block so that when said erosion-protection structure is struck, hit and/or hammered by water waves in a body of water, said water waves exert forces on said breakwater construction blocks causing said breakwater construction blocks to lift up, roll and/or tilt in some way, and in response to the impact of said water waves and associated breakwater construction block movement, said trapezoidal-shaped interlocking shear key blocks generate sufficient shear forces between the mated trapezoidal side wall surfaces at said structural interface so as to (i) interlock together said closely arranged breakwater construction blocks, and (ii) allow said closely arranged breakwater construction blocks and said trapezoidal-shaped interlocking shear key blocks to respond to said water waves without breakage, while (iii) maintaining the structural integrity of said erosion-protection structure, and (iv) allowing said erosion-protection structure to continue performing as intended.

2. The breakwater construction block system of claim 1, wherein along at least one said structural interface, the length dimension of said trapezoidal-shaped interlocking shear key block is substantially equal to one of (i) the total length of the central trapezoidal core portion of said breakwater construction block, (ii) half the length of the central trapezoidal core portion of said breakwater construction block, and (iii) twice the total length of the central trapezoidal core portion of said breakwater construction block.

3. The breakwater construction block system of claim claim 1, wherein said integrated pick-up device comprises a pick-up hook integrated into the top portion of said trapezoidal-shaped interlocking shear key block.

4. The breakwater construction block system of claim 1, wherein the X and Y cross-sectional dimensions of said trapezoidal-shaped interlocking shear key block are substantially equal; and wherein the X cross-sectional dimension of each said trapezoidal-shaped interlocking shear key block extends between the leg portions of said neighboring set of breakwater construction blocks.

5. The breakwater construction block system of claim 1, wherein the X and Y cross-sectional dimensions of said trapezoidal-shaped interlocking shear key blocks are substantially unequal wherein the Y cross-sectional dimension is substantially longer than the X cross-sectional dimension; and wherein the X cross-sectional dimension of each said trapezoidal-shaped interlocking shear key block extends between the leg portions of said neighboring set of breakwater construction blocks.

6. The breakwater construction block system of claim 1, wherein each said trapezoidal-shaped interlocking shear key block is placed within one said trapezoidal interstice formed in said erosion-protection structure having two or more courses of said breakwater construction blocks; wherein the X and Y cross-sectional dimensions of said trapezoidal-shaped interlocking shear key blocks are substantially equal; and wherein the X cross-sectional dimension of each said trapezoidal-shaped interlocking shear key block extends between the leg portions of said neighboring set of breakwater construction blocks.

7. The breakwater construction block system of claim claim 6, wherein at least one said structural interface, the length dimension of said trapezoidal-shaped interlocking shear key block is substantially equal to one of (i) the total length of the central trapezoidal core portion of said breakwater construction block, (ii) half the length of the central trapezoidal core portion of said breakwater construction block, and (iii) twice the total length of the central trapezoidal core portion of said breakwater construction block.

8. The breakwater construction block system of claim claim 1, wherein each said trapezoidal-shaped interlocking shear key block is placed within one said trapezoidal interstice formed in said erosion-protection structure having along two or more courses of said breakwater construction blocks has X and Y cross-sectional dimensions; wherein the X and Y cross-sectional dimensions of two or more of said trapezoidal-shaped interlocking shear key blocks are substantially unequal; wherein the Y cross-sectional dimension is substantially longer than the X cross-sectional dimension; and wherein the X cross-sectional dimension of each said trapezoidal-shaped interlocking shear key block extends between the leg portions of said neighboring set of breakwater construction blocks.

9. The breakwater construction block system of claim 4, wherein at least one said structural interface, the length dimension of said trapezoidal-shaped interlocking shear key block is equal to the total length of the central trapezoidal core portion of said breakwater construction block.

10. The breakwater construction block system of claim 1, wherein said trapezoidal wall surfaces on the sides of each said trapezoidal-shaped interlocking shear key block, placed along two or more courses of said breakwater construction blocks, have a groove extending along the length of each trapezoidal wall surface;
wherein the X and Y cross-sectional dimensions of two or more of said trapezoidal-shaped interlocking shear key blocks are substantially un-equal;
wherein the Y cross-sectional dimension is substantially longer than the X cross-sectional dimension;
wherein said closely nested arrangement of said breakwater construction blocks extend along a path defined by the width of at least first and second courses of said breakwater construction blocks;
wherein along said first course of said breakwater construction blocks, the X cross-sectional dimension of each said trapezoidal-shaped interlocking shear key block extends between the leg portions of said neighboring set of breakwater construction blocks; and
wherein along said second course of said breakwater construction blocks, the leg portions of each said breakwater construction block engages in the groove formed in the side trapezoidal wall surface of one said adjacent trapezoidal-shaped interlocking shear key block.

11. The breakwater construction block system of claim 1, wherein the length dimension of said trapezoidal-shaped interlocking shear key block is equal to the total length of the central trapezoidal core portion of said breakwater construction block.

12. The breakwater construction block system of claim 1, wherein said top portion of one or more of said breakwater construction blocks further comprises a structure selected from the group consisting of (i) a substantially flat top portion extending axially from said central trapezoidal core portion and on level with the top surface of said trapezoidal leg portions, allowing water to flow freely over the central trapezoidal core portion of said breakwater construction block, (ii) a tower-type portion extending axially from said central trapezoidal core portion and beyond the trapezoidal leg portions, increasing the overall height of said breakwater construction block, and slowing down the flow of water over the central trapezoidal core portion of said breakwater construction block and allowing suspended sand to settle within said breakwater construction block system, and (iii) a medium-height top portion extending axially from said central trapezoidal core portion and beyond said trapezoidal leg portions, for slowing down the flow of water over the central trapezoidal core portion of said breakwater construction block and allowing suspended sand to settle within said breakwater construction block system.

13. The breakwater construction block system of claim 1, wherein said erosion-protection structure providing protection against erosion along said body of water is a system selected from the group consisting of a seawall erosion-protection system installed along a section of coastal shoreline, a riverbed erosion-prevention system installed at the bottom of a riverbed, a streambed erosion-prevention system installed at the bottom of a streambed, an ocean-groin type beach erosion-prevention barrier system, a scour-protection system installed on a coastal incline, a multi-tiered seawall erosion-protection installed along a section of coastal shoreline, a waterway dam system installed along a river, a permeable protection system installed along a waterway, and a coastal erosion protection system installed along a coastal region.

14. The breakwater construction block system of claim 13, wherein said ocean-groin type beach erosion-prevention barrier system comprises:
an arrangement of at least four interconnected rows of said breakwater construction blocks assembled on a beach shore in a tiered manner;
wherein each said interconnected row of breakwater construction blocks is constructed by a series of said breakwater construction blocks connected together by said trapezoidal-shaped interlocking shear key blocks having a height less than said central trapezoidal core portion of said breakwater construction blocks, so as to facilitate the reduction of water speed across said breakwater construction blocks and allow sand to collect and settle around said ocean-groin structure and prevent beach erosion.

15. The breakwater construction block system of claim claim 13, wherein said seawall erosion-protection system comprises:
(i) a seawall subsystem constructed from a continuous row of said construction blocks arranged leg portion to leg portion and connected together by said trapezoidal-shaped interlocking shear key blocks having a height substantially equal to the height of said breakwater construction blocks; and
(ii) a scour-protection subsystem disposed in front of said seawall subsystem, and constructed from at least first and second continuous rows of said breakwater construction blocks interconnected by said trapezoidal-shaped interlocking shear key blocks, to protect against erosion of shoreline, along which said seawall erosion-protection system is installed.

16. The breakwater construction block system of claim claim 13, wherein said seawall erosion-protection system comprises a seawall subsystem constructed from a continuous row of said breakwater construction blocks arranged leg portion to leg portion and connected together by said trapezoidal-shaped interlocking shear key blocks having a height substantially equal to the height of said breakwater construction blocks.

17. The breakwater construction block system of claim claim 13, wherein said seawall erosion-protection system comprises:
a seawall subsystem constructed a continuous row of said breakwater construction blocks arranged leg portion to leg portion and connected together by said trapezoidal-shaped interlocking shear key blocks having a height substantially equal to the height of said breakwater construction blocks; and
a rock shelf interlocked and wedged with said breakwater construction blocks behind said seawall subsystem and forming an integrated structure for increased stability.

18. The breakwater construction block system of claim 13, wherein said scour-protection system is constructed from multiple continuous rows of said breakwater construction blocks; wherein said top portion of each said breakwater construction block has an axially extending flat-top portion, and said central trapezoidal core portion has truncated leg portions tailored to said coastline incline, and interconnected by said trapezoidal-shaped interlocking shear key blocks, so that said scour-protection system provides protection against erosion of said coastal incline.

19. The breakwater construction block system of claim claim 13, wherein said multi-tiered seawall erosion-protection system comprises a series of said breakwater construction blocks, including an upper row of said breakwater construction blocks;
wherein each said breakwater construction block in said upper row thereof has a tower-type portion and truncated leg portions and a bottom surface trimmed to the slope of said coastal shoreline; and
wherein said trapezoidal-shaped interlocking shear key blocks have a height substantially equal to said central trapezoidal core portion of said breakwater construction blocks.

20. The breakwater construction block system of claim claim 13, wherein said multi-tiered seawall erosion-protection system is installed upon a bed of crushed rock or stone on the inclined surface of a coastal region, and comprises:
multiple continuous rows of said breakwater construction blocks, wherein said top portion axially extending from said central trapezoidal core portion of each said breakwater construction block has a high tower top portion and truncated leg portions tailored to the incline surface; and
wherein said trapezoidal-shaped interlocking shear key blocks have a height substantially equal to the height of said breakwater construction block, to dissipate wave energy, entrap sand suspended in ocean waters, and protect against the erosion of said coastal region.

* * * * *